(12) United States Patent
Hattori et al.

(10) Patent No.: US 7,922,404 B2
(45) Date of Patent: Apr. 12, 2011

(54) DIAPHRAGM UNIT, LIGHT INTENSITY ADJUSTING DEVICE, LENS BARREL, AND IMAGING APPARATUS

(75) Inventors: Kazuhiro Hattori, Tokyo (JP); Ryuhei Azuma, Kanagawa (JP)

(73) Assignee: Sony Corporation (JP)

(*) Notice: Subject to any disclaimer, the term of this patent is extended or adjusted under 35 U.S.C. 154(b) by 0 days.

(21) Appl. No.: 12/653,372

(22) Filed: Dec. 11, 2009

(65) Prior Publication Data

US 2010/0158507 A1 Jun. 24, 2010

(30) Foreign Application Priority Data

Dec. 18, 2008 (JP) .................. P2008-322330

(51) Int. Cl.
*G03B 9/06* (2006.01)
(52) U.S. Cl. ..................................... 396/510
(58) Field of Classification Search .............. 396/493, 396/510
See application file for complete search history.

(56) References Cited

U.S. PATENT DOCUMENTS

| 6,533,473 | B1 | 3/2003 | Edamitsu et al. | |
| 6,817,788 | B1* | 11/2004 | Negishi et al. | 396/505 |
| 7,113,318 | B2 | 9/2006 | Onuki et al. | |
| 7,546,029 | B2* | 6/2009 | Ishizuka et al. | 396/73 |
| 2005/0226611 | A1* | 10/2005 | Kawaguchi | 396/505 |
| 2009/0116832 | A1* | 5/2009 | Azuma et al. | 396/510 |

FOREIGN PATENT DOCUMENTS

| JP | 10307313 A | 11/1998 |
| JP | 11038467 A | 2/1999 |
| JP | 2001-117133 A | 4/2001 |
| JP | 2004-333554 A | 11/2004 |
| JP | 2006178366 A | 7/2006 |
| JP | 2007114672 A | 5/2007 |
| WO | 2008117422 A1 | 10/2008 |

OTHER PUBLICATIONS

Office Action from Japanese Application No. 2008-322330, dated Sep. 2, 2010.

* cited by examiner

*Primary Examiner* — W. B. Perkey
*Assistant Examiner* — Leon W Rhodes
(74) *Attorney, Agent, or Firm* — Lerner, David, Littenberg, Krumholz & Mentlik, LLP

(57) ABSTRACT

A diaphragm unit includes: a pair of straight-moving diaphragm blades and a pair of swing diaphragm blades overlapping with each other in an optical axis direction of an optical system and forming a diaphragm opening centered on the optical axis by moving in directions in which the diaphragm blades get close to and apart from the optical axis along a plane perpendicular to the optical axis; a receiving member receiving the pair of straight-moving diaphragm blades and the pair of swing diaphragm blades; and a diaphragm driving mechanism adjusting the size of the diaphragm opening by moving the diaphragm blades. The receiving member has a pair of side surfaces facing each other in the optical axis direction. One and the other of the straight-moving diaphragm blades and one and the other of the swing diaphragm blades are disposed on one and the other of the side surfaces, respectively.

11 Claims, 39 Drawing Sheets

DIAPHRAGM UNIT, LIGHT INTENSITY ADJUSTING DEVICE, LENS BARREL, AND IMAGING APPARATUS

CROSS-REFERENCE TO RELATED APPLICATION

The present application claims priority from Japanese Patent Application No. JP 2008-322330 filed in the Japanese Patent Office on Dec. 18, 2008, the entire content of which is incorporated herein by reference.

BACKGROUND OF THE INVENTION

1. Field of the Invention

The present invention relates to a diaphragm unit, a light intensity adjusting device, a lens barrel, and an imaging apparatus.

2. Description of the Related Art

Portable imaging apparatuses such as moving image cameras and digital still cameras or projection-based optical apparatuses such as liquid crystal projectors are provided with a light intensity adjusting device.

For example, the light intensity adjusting device includes a diaphragm unit adjusting the size of a diaphragm opening centered on an optical axis of an optical system and an ND filter unit reducing the light intensity passing through the diaphragm opening.

As such a type of diaphragm unit, a diaphragm unit is known which employs an iris diaphragm adjusting the size of the diaphragm opening by swinging plural diaphragm blades arranged around the diaphragm opening in cooperation (see JP-A-2004-333554 (Patent Document 1)).

As such a type of ND filter unit, an ND filter unit is known in which an ND filter is made to protrude to and to retreat from the diaphragm opening (see JP-A-2001-117133 (Patent Document 2)).

SUMMARY OF THE INVENTION

However, in the above-mentioned light intensity adjusting device, it is difficult to reduce the size (thickness) in an optical axis direction due to its structural restriction.

Accordingly, when movable lenses such as a zoom lens and a focus lens are arranged before and after the light intensity adjusting device in the optical axis direction, the following problems are caused.

That is, when the strokes of the movable lenses are sufficiently guaranteed, the size of a lens barrel in the optical axis direction should be great, which is disadvantageous for a decrease in size of an imaging apparatus.

When the size of the lens barrel in the optical axis direction is limited, the strokes of the movable lenses may not be sufficiently guaranteed and thus a zoom ratio may be restricted, which is disadvantageous for an improvement in optical performance.

Thus, it is desirable to provide a diaphragm unit, a light intensity adjusting device, a lens barrel, and an imaging apparatus, which are advantageous for a decrease in size while guaranteeing the optical performance.

According to an embodiment of the invention, there is provided a diaphragm unit including: a pair of straight-moving diaphragm blades and a pair of swing diaphragm blades overlapping with each other in an optical axis direction of an optical system and forming a diaphragm opening centered on the optical axis by moving in directions in which the diaphragm blades get close to and apart from the optical axis along a plane perpendicular to the optical axis; a receiving member receiving the pair of straight-moving diaphragm blades and the pair of swing diaphragm blades; and a diaphragm driving mechanism adjusting the size of the diaphragm opening by moving the diaphragm blades. Here, the receiving member has a pair of side surfaces facing each other in the optical axis direction, one of the pair of straight-moving diaphragm blades and one of the pair of swing diaphragm blades are disposed on one of the pair of side surfaces, the other of the pair of straight-moving diaphragm blades and the other of the pair of swing diaphragm blades are disposed on the other of the pair of side surfaces, and a concave portion which is concave toward the other of the pair of side surfaces is disposed on one of the pair of side surfaces outside the moving locus of one of the pair of straight-moving diaphragm blades and one of the pair of swing diaphragm blades in a state where a space is secured in the optical axis direction between the other of the pair of straight-moving diaphragm blades and the other of the pair of swing diaphragm blades.

According to another embodiment of the invention, there is provided a light intensity adjusting device including: a diaphragm unit adjusting the size of a diaphragm opening centered on an optical axis of an optical system; and an ND filter unit reducing the light intensity passing through the diaphragm opening. The diaphragm unit includes a pair of straight-moving diaphragm blades and a pair of swing diaphragm blades overlapping with each other in the optical axis direction of the optical system and forming the diaphragm opening centered on the optical axis by moving in directions in which the diaphragm blades get close to and apart from the optical axis along a plane perpendicular to the optical axis, a diaphragm base member having a receiving section receiving the pair of straight-moving diaphragm blades and the pair of swing diaphragm blades, a diaphragm cover member covering the pair of straight-moving diaphragm blades and the pair of swing diaphragm blades received in the receiving section, and a diaphragm driving mechanism adjusting the size of the diaphragm opening by moving the diaphragm blades. Here, one of the pair of straight-moving diaphragm blades and one of the pair of swing diaphragm blades are disposed close to the diaphragm cover member, the other of the pair of straight-moving diaphragm blades and the other of the pair of swing diaphragm blades are disposed close to the diaphragm base member, and a concave portion which is concave toward the other of the pair of side surfaces is disposed close to the diaphragm base member outside the moving locus of one of the pair of straight-moving diaphragm blades and one of the pair of swing diaphragm blades in a state where a space is secured in the optical axis direction between the other of the pair of straight-moving diaphragm blades and the other of the pair of swing diaphragm blades. The ND filter unit includes an ND filter moving between an in-use position located inside the diaphragm opening and a retreating position located outside the diaphragm opening as viewed in the optical axis direction, and a case receiving the ND filter. Here, the case has a side surface overlapping with the diaphragm cover member, a convex portion protruding to the side surface of the diaphragm cover member and receiving the ND filter at the retreating position is formed on the side surface, and the convex portion is received in the concave portion.

According to still another embodiment of the invention, there is provided a lens barrel having a diaphragm unit, which includes: a pair of straight-moving diaphragm blades and a pair of swing diaphragm blades overlapping with each other in an optical axis direction of an optical system and forming a diaphragm opening centered on the optical axis by moving in directions in which the diaphragm blades get close to and apart from the optical axis along a plane perpendicular to the optical axis; a receiving member receiving the pair of straight-moving diaphragm blades and the pair of swing diaphragm blades; and a diaphragm driving mechanism adjusting the size of the diaphragm opening by moving the diaphragm blades. Here, the receiving member has a pair of side surfaces facing each other in the optical axis direction, one of the pair of straight-moving diaphragm blades and one of the pair of swing diaphragm blades are disposed on one of the pair of side surfaces, the other of the pair of straight-moving diaphragm blades and the other of the pair of swing diaphragm blades are disposed on the other of the pair of side surfaces, and a concave portion which is concave toward the other of the pair of side surfaces is disposed on one of the pair of side surfaces outside the moving locus of one of the pair of straight-moving diaphragm blades and one of the pair of swing diaphragm blades in a state where a space is secured in the optical axis direction between the other of the pair of straight-moving diaphragm blades and the other of the pair of swing diaphragm blades.

According to still another embodiment of the invention, there is provided a lens barrel having a light intensity adjusting device adjusting the light intensity passing through an optical system, wherein the light intensity adjusting device includes: a diaphragm unit adjusting the size of a diaphragm opening centered on an optical axis of the optical system; and an ND filter unit reducing the light intensity passing through the diaphragm opening. The diaphragm unit includes a pair of straight-moving diaphragm blades and a pair of swing diaphragm blades overlapping with each other in the optical axis direction of the optical system and forming the diaphragm opening centered on the optical axis by moving in directions in which the diaphragm blades get close to and apart from the optical axis along a plane perpendicular to the optical axis, a diaphragm base member having a receiving section receiving the pair of straight-moving diaphragm blades and the pair of swing diaphragm blades, a diaphragm cover member covering the pair of straight-moving diaphragm blades and the pair of swing diaphragm blades received in the receiving section, and a diaphragm driving mechanism adjusting the size of the diaphragm opening by moving the diaphragm blades. Here, one of the pair of straight-moving diaphragm blades and one of the pair of swing diaphragm blades are disposed close to the diaphragm cover member, the other of the pair of straight-moving diaphragm blades and the other of the pair of swing diaphragm blades are disposed close to the diaphragm base member, and a concave portion which is concave toward the other of the pair of side surfaces is disposed close to the diaphragm base member outside the moving locus of one of the pair of straight-moving diaphragm blades and one of the pair of swing diaphragm blades in a state where a space is secured in the optical axis direction between the other of the pair of straight-moving diaphragm blades and the other of the pair of swing diaphragm blades. The ND filter unit includes an ND filter moving between an in-use position located inside the diaphragm opening and a retreating position located outside the diaphragm opening as viewed in the optical axis direction, and a case receiving the ND filter. Here, the case has a side surface overlapping with the diaphragm cover member, a convex portion protruding to the side surface of the diaphragm cover member and receiving the ND filter at the retreating position is formed on the side surface, and the convex portion is received in the concave portion.

According to yet another embodiment of the invention, there is provided an imaging apparatus having a lens barrel mounted with a diaphragm unit which includes: a pair of straight-moving diaphragm blades and a pair of swing diaphragm blades overlapping with each other in an optical axis direction of an optical system and forming a diaphragm opening centered on the optical axis by moving in directions in which the diaphragm blades get close to and apart from the optical axis along a plane perpendicular to the optical axis; a receiving member receiving the pair of straight-moving diaphragm blades and the pair of swing diaphragm blades; and a diaphragm driving mechanism adjusting the size of the diaphragm opening by moving the diaphragm blades. Here, the receiving member has a pair of side surfaces facing each other in the optical axis direction, one of the pair of straight-moving diaphragm blades and one of the pair of swing diaphragm blades are disposed on one of the pair of side surfaces, the other of the pair of straight-moving diaphragm blades and the other of the pair of swing diaphragm blades are disposed on the other of the pair of side surfaces, and a concave portion which is concave toward the other of the pair of side surfaces is disposed on one of the pair of side surfaces outside the moving locus of one of the pair of straight-moving diaphragm blades and one of the pair of swing diaphragm blades in a state where a space is secured in the optical axis direction between the other of the pair of straight-moving diaphragm blades and the other of the pair of swing diaphragm blades.

According to further another embodiment of the invention, there is provided an imaging apparatus having a lens barrel mounted with a light intensity adjusting device, wherein the light intensity adjusting device includes: a diaphragm unit adjusting the size of a diaphragm opening centered on an optical axis of the optical system; and an ND filter unit reducing the light intensity passing through the diaphragm opening. The diaphragm unit includes a pair of straight-moving diaphragm blades and a pair of swing diaphragm blades overlapping with each other in the optical axis direction of the optical system and forming the diaphragm opening centered on the optical axis by moving in directions in which the diaphragm blades get close to and apart from the optical axis along a plane perpendicular to the optical axis, a diaphragm base member having a receiving section receiving the pair of straight-moving diaphragm blades and the pair of swing diaphragm blades, a diaphragm cover member covering the pair of straight-moving diaphragm blades and the pair of swing diaphragm blades received in the receiving section, and a diaphragm driving mechanism adjusting the size of the diaphragm opening by moving the diaphragm blades. Here, one of the pair of straight-moving diaphragm blades and one of the pair of swing diaphragm blades are disposed close to the diaphragm cover member, the other of the pair of straight-moving diaphragm blades and the other of the pair of swing diaphragm blades are disposed close to the diaphragm base member, and a concave portion which is concave toward the other of the pair of side surfaces is disposed close to the diaphragm base member outside the moving locus of one of the pair of straight-moving diaphragm blades and one of the pair of swing diaphragm blades in a state where a space is secured in the optical axis direction between the other of the pair of straight-moving diaphragm blades and the other of the pair of swing diaphragm blades. The ND filter unit includes an ND filter moving between an in-use position located inside the diaphragm opening and a retreating position located outside the diaphragm opening as viewed in the optical axis direction, and a case receiving the ND filter. Here, the case has a side surface overlapping with the diaphragm cover member, a convex portion protruding to the side surface of the diaphragm cover member and receiving the ND filter at the retreating position is formed on the side surface, and the convex portion is received in the concave portion.

According to the above-mentioned embodiments of the invention, since the concave portion is disposed in one side surface of the receiving member receiving the diaphragm unit, it is possible to reduce the size of the lens barrel in the optical axis direction by receiving and arranging another optical device or a part thereof, or an optical member or a part thereof in the concave portion. Therefore, it is advantageous for the decrease in size of the imaging apparatus.

Alternatively, it is possible to guarantee the strokes of the movable lenses such as a zoom lens and a focus lens great without an increase in length of the lens barrel. Therefore, it is possible to guarantee the zoom ratio and to guarantee a focus adjusting range great, which is advantageous for the improvement in optical performance of the lens barrel.

Since an inexpensive lens with a relatively small refractive index and a large thickness can be used as the movable lens, it is advantageous for the decrease in cost of the imaging apparatus.

DESCRIPTION OF THE PREFERRED EMBODIMENTS

First Embodiment

Hereinafter, an embodiment of the invention will be described with reference to the accompanying drawings.

Figure 1:
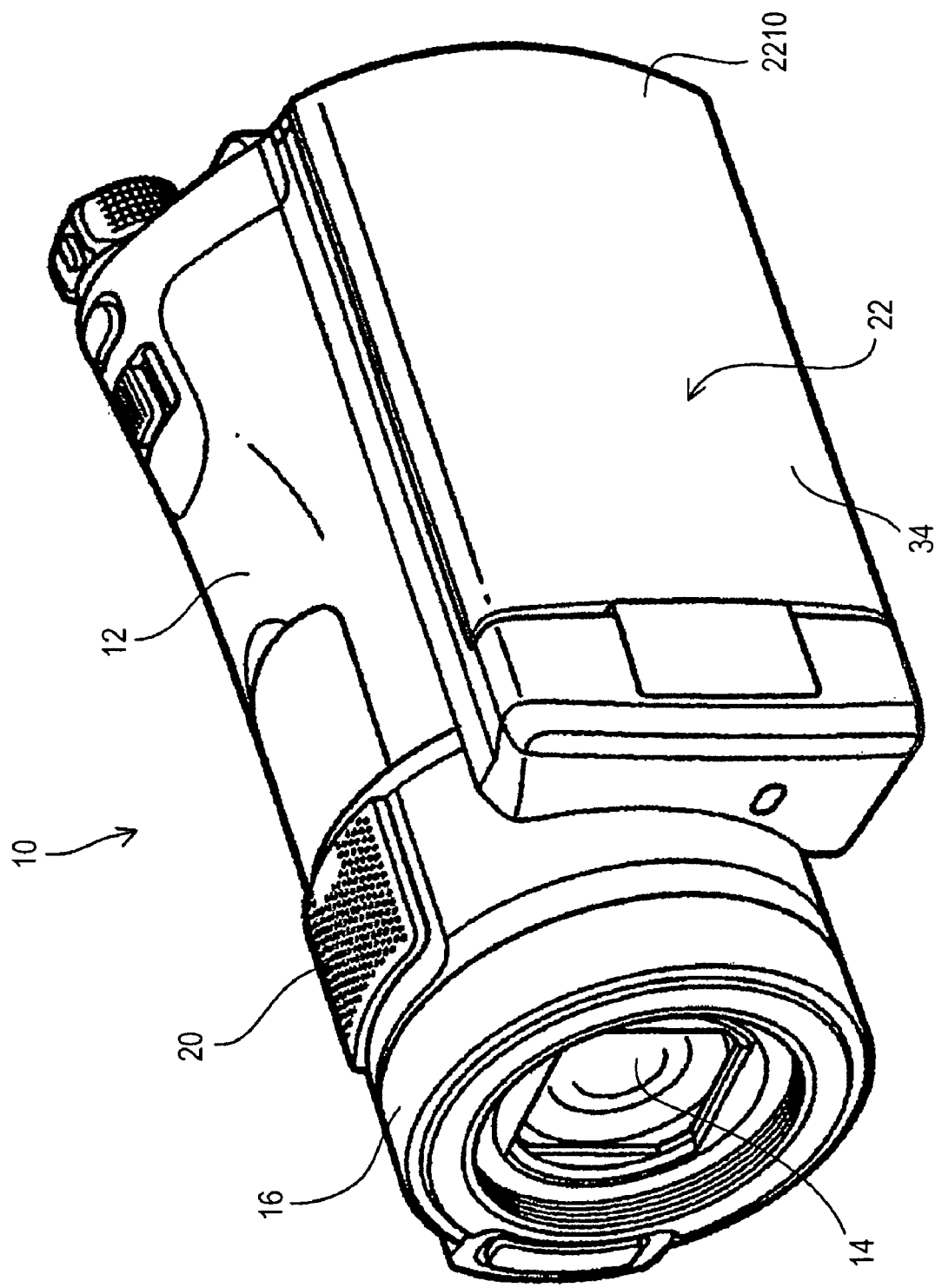
FIG. 1 is a perspective view of an imaging apparatus according to an embodiment of the invention.
Figure 2:
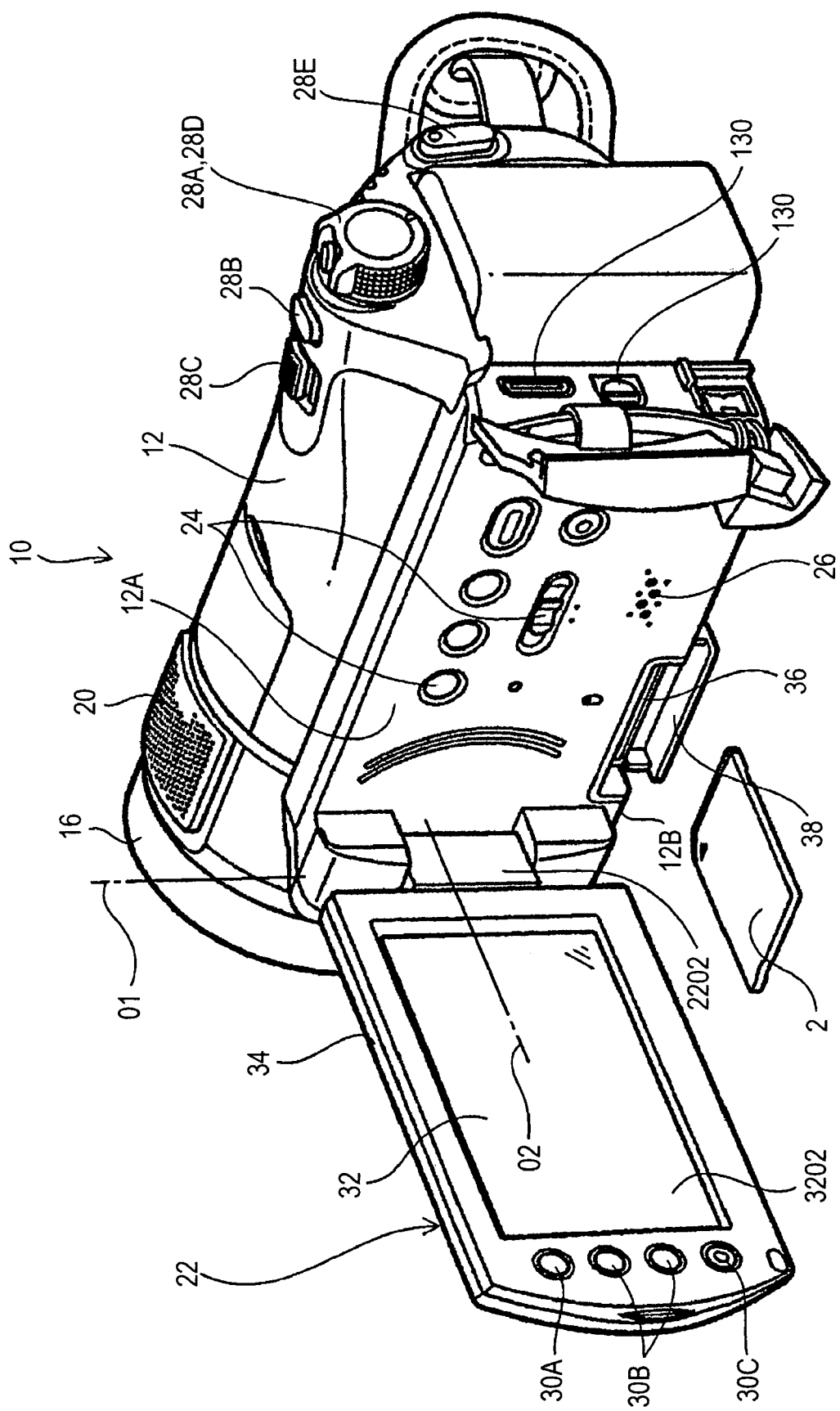
FIG. 2 is a perspective view illustrating a state where a display panel of the imaging apparatus is located at an open position.

FIG. 1 is a perspective view of an imaging apparatus 10 according to an embodiment of the invention. FIG. 2 is a perspective view illustrating a state where a display panel 22 of the imaging apparatus 10 is located at an open position.

Figure 3:
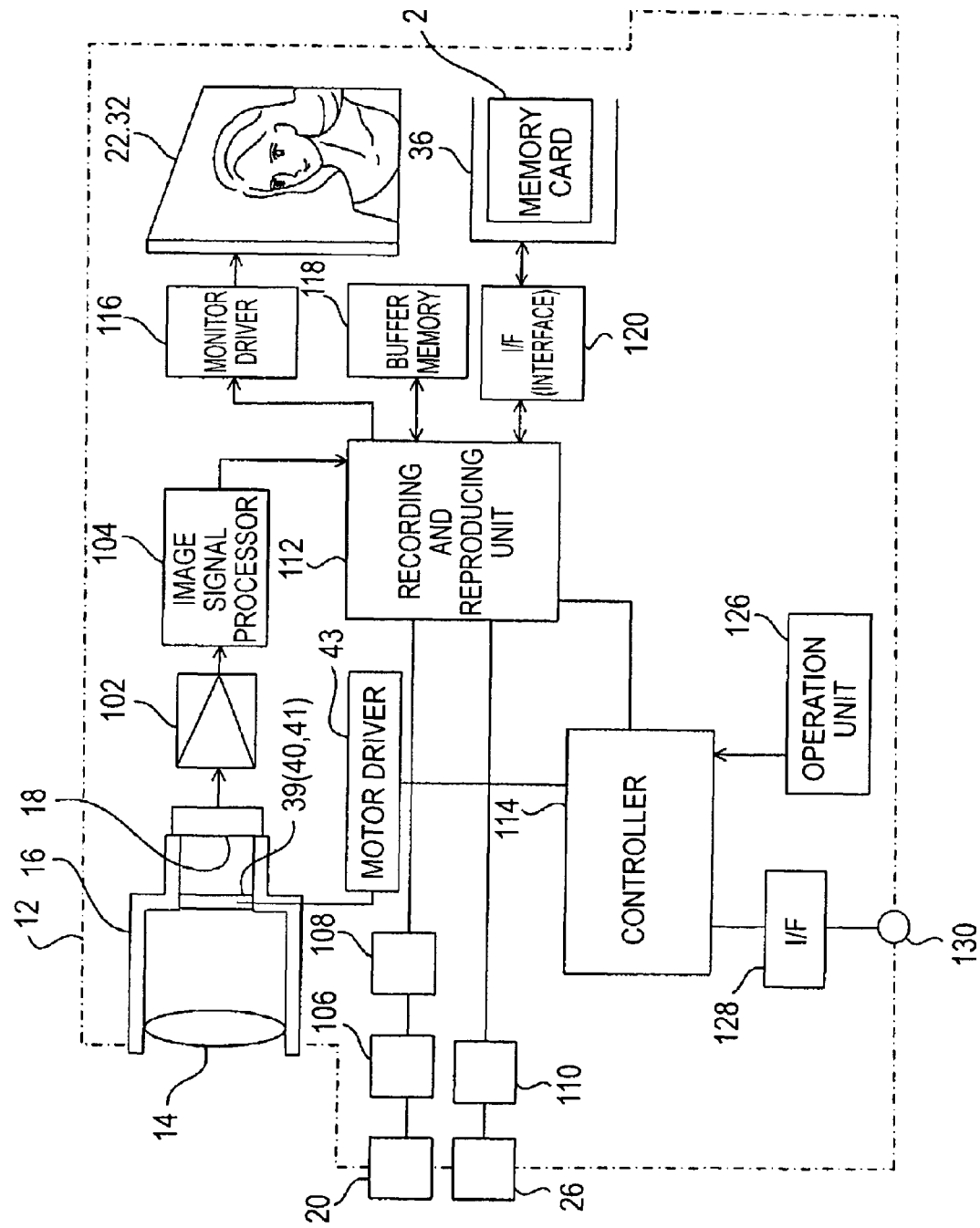
FIG. 3 is a block diagram illustrating the configuration of a control system of the imaging apparatus.

FIG. 3 is a block diagram illustrating the configuration of a control system of the imaging apparatus 10.

The configuration of a control system of an imaging apparatus 10 will be described now with reference to FIG. 3.

In this embodiment, the imaging apparatus 10 is a moving image camera and serves to record data of taken moving images, still images, and sounds in a recording medium and to reproduce the data from the recording medium.

In this embodiment, a memory card 2 which is a plate-like or rod-like recording medium is used as the recording medium. However, a magnetic recording tape, an optical disk, a hard disk may be used as the recording medium, and the recording medium is not particularly limited.

The imaging apparatus 10 has a chassis 12 forming the outer shape and a lens barrel 16 mounted with a photographing optical system 14 is disposed in the chassis 12.

The rear end of the lens barrel 16 is provided with an imaging device 18 imaging a subject image guided by the photographing optical system 14. The lens barrel 16 is mounted with a light intensity adjusting device 39 to be described later. The light intensity adjusting device 39 serves to adjust the light intensity passing through the photographing optical system 14. The light intensity adjusting device 39 includes a diaphragm unit 40 and an ND filter unit 41.

The imaging apparatus 10 includes a microphone 20, a display panel 22, a speaker 26, an image signal amplifier 102, an image signal processor 104, a microphone amplifier 106, an audio signal processor 108, an output amplifier 110, a recording and reproducing unit 112, and a controller 114.

The imaging apparatus 10 further includes a display panel driver 116, a buffer memory 118, a memory card interface 120, an operation unit 126, an external input and output interface 128, an external input and output terminal 130, and a motor driver 43.

An imaging signal generated from the imaging device 18 is amplified by the image signal amplifier 102 and is then supplied to the image signal processor 104.

The image signal processor 104 performs a predetermined signal process on the imaging signal to generate moving image data and still image data and supplies the generated data to the recording and reproducing unit 112.

An audio signal received by the microphone 20 is amplified by the microphone amplifier 106, is subjected to a predetermined signal process by the audio signal processor 108, and is then supplied as audio data to the recording and reproducing unit 112.

The recording and reproducing unit 112 records the moving image data and the still image data supplied from the image signal processor 104 and the audio data supplied from the audio signal processor 108 on a memory card 2 via the memory card interface 120 under the control of the controller 114.

The recording of data in the memory card 2 by the recording and reproducing unit 112 is carried out, for example, by temporarily storing the data to be recorded in the memory card 2 in the buffer memory 118 and then writing the data read from the buffer memory 118 to the memory card 2.

The recording and reproducing unit 112 supplies the moving image data and the still image data supplied from the image signal processor 104 to the display panel 22 via the display panel driver 116 so as to display an image.

The recording and reproducing unit 112 supplies the moving image data and the still image data, which are supplied from the memory card 2 via the memory card interface 120, to the display panel 22 via the display panel driver 116 so as to display an image.

The recording and reproducing unit 112 supplies the audio signal, which is supplied from the memory card 2 via the memory card interface 120, to the speaker 26 via the output amplifier 110 so as to output a sound.

The external input and output interface 128 serves to convert the audio data and the image data reproduced by the recording and reproducing unit 112 into a predetermined signal format and to output the converted data to an external device such as a television set, an HDD recorder, and a personal computer via the external input and output terminal 130.

The operation unit 126 includes plural operation switches 24, a power switch 28A, a still image photographing switch 28B, a zoom switch 28C, a mode switching switch 28D, and a moving image photographing switch 28E as shown in FIG. 2.

The switches 24 and 28A to 28E constitute operation switches for carrying out various functions relating to the photographing operation.

The controller 114 turns on and off the imaging apparatus 10 on the basis of the operation on the power switch 28A.

The controller 114 gives an instruction to the image signal processor 104 and the recording and reproducing unit 112 on the basis of the operation on the still image photographing switch 28B. Accordingly, the controller 114 records the still image data in the memory card 2 by supplying the still image data supplied from the image signal processor 104 to the memory card interface 120 via the recording and reproducing unit 112.

In other words, the still image photographing switch 28B serves as a so-called shutter button.

The controller 114 changes the zoom ratio of the photographing optical system 14 by giving an instruction to a zoom driver (not shown) on the basis of the operation on the zoom switch 28C to cause the movable lens of the photographing optical system 14 to move.

The controller 114 gives an instruction to the image signal processor 104 on the basis of the operation on the mode switching switch 28D. Accordingly, the controller 114 switches the operation mode between a video photographing mode for allowing the image signal processor 104 to generate the moving image data and a still image photographing mode for allowing the image signal processor 104 to generate the still image data.

In the moving image photographing mode, the moving image data generated by the image signal processor 104 is recorded in the memory card 2 by the recording and reproducing unit 112. In the still image photographing mode, the still image data generated by the image signal processor 104 is recorded in the memory card 2 by the recording and reproducing unit 112.

The controller 114 starts or stops recording the moving image data on the basis of the operation on the moving image photographing switch 28E.

That is, the controller 114 gives an instruction to the image signal processor 104 and the recording and reproducing unit 112 on the basis of the operation on the moving image photographing switch 28E. Accordingly, the controller 114 supplies the moving image data supplied from the image signal processor 104 to the memory card interface 120 via the recording and reproducing unit 112. As a result, the controller 114 starts or stops the operation of recording the moving image data in the memory card 2.

In other words, the moving image photographing switch 28E serves as a so-called photographing start and stop operation member.

A panel-side moving image photographing switch 30A, a panel-side zoom switch 30B, and a menu operating switch 30C are connected to the controller 114.

The panel-side moving image photographing switch 30A has the same function as the moving image photographing switch 28E.

The panel-side zoom switch 30B has the same function as the zoom switch 28C.

The menu operating switch 30C is a switch operated to directly return a layer of the menu displayed on the display panel 22 to the uppermost layer.

The motor driver 43 controls the driving of a diaphragm motor 56 (see FIG. 4) of the diaphragm unit 40 and a filter motor 84 of the ND filter unit 41, which are all described later, under the control of the controller 114.

The configuration of the imaging apparatus 10 will be described now.

As shown in FIGS. 1 and 2, the chassis 12 has a length in the front and rear directions and a height in the up-down directions greater than the width in the left-right directions. In this specification, the left and right sides are determined when the imaging apparatus 10 is viewed from the rear side. The side close to a subject in the optical axis direction of the optical system is called front and the side close to the imaging device is called rear.

The lens barrel 16 extends from the front to the rear in the upper side of the chassis 12 and the front part thereof is located on the front surface of the chassis 12. Accordingly, the subject image is guided from the front part of the chassis 12 to the inside of the chassis 12.

The imaging device 18 (FIG. 3) is disposed at the rear end of the lens barrel 16.

The microphone 20 is disposed on the top surface of the lens barrel 16.

The display panel 22 is disposed on the left side of the chassis 12 so as to be opened and closed.

The display panel 22 includes a display device 32 and a panel case 34 and has a rectangular plate shape.

As shown in FIG. 2, the display device 32 serves to display the subject image imaged by the imaging device 18.

The display device 32 includes a rectangular display surface 3202 on which an image is displayed and the display surface 3202 forms the inner surface of the display panel 22.

In this embodiment, the display device 32 is formed of a liquid crystal display device, but the type of the display device 32 is not particularly limited and for example, may be an organic EL display device.

The short-side part of the display panel 22 is connected to the front position of the left-side part of the chassis 12 with a hinge 2202 interposed therebetween.

Accordingly, the display panel 22 can swing about a first axis line O1 extending in the up-down directions of the chassis 12 and can also swing about a second axis line O2 perpendicular to the first axis line O1.

In this embodiment, the display panel 22 swings between a receiving position shown in FIG. 1 and an open position shown in FIG. 2.

That is, at the receiving position shown in FIG. 1, the display surface 3202 (the inner surface of the panel 22) of the display device 32 of the display panel 22 is located to overlap with the left surface 12A of the chassis 12 around the first axis line O1.

At the open position shown in FIG. 2, the display panel 22 is opened from the receiving position by 90 degrees and the display surface 3202 of the display device 32 faces the rear side.

At the receiving position where the display surface 3202 (the inner surface of the panel 22) overlaps with the left surface 12A of the chassis 12, the outer surface 2210 of the display panel 22 (see FIG. 1) faces the outside.

At the open position, the display panel 22 swings about the second axis line O2 between a position where the display surface 3202 of the display device 32 faces the front side and a position where the display surface faces the down side in a range of 270 degrees.

As shown in FIG. 2, plural operation switches 24 for performing various operations, the speaker 26, and the like are disposed on the left surface 12A of the chassis 12.

The power switch 28A, the still image photographing switch 28B, the zoom switch 28C, and the mode switching switch 28D are disposed close to the rear end of the upper part of the chassis 12. The moving image photographing switch 28E is disposed on the rear surface of the chassis 12.

The display panel 22 is provided with the panel-side moving image photographing switch 30A, the panel-side zoom switch 30B, and the menu operating switch 30C.

As shown in FIG. 2, a slot 36 into and from which a memory card 2 is inserted and detached and a cover member 38 covering an opening 3602 of the slot 36 are disposed in the lower part of the left surface 12A of the chassis 12.

By inserting the memory card 2 into the slot 36, a connection terminal of the memory card 2 is electrically connected to a connector (not shown) in the slot 36. Accordingly, the memory card 2 transmits and receives data to and from the memory card interface 120 via the connector.

The light intensity adjusting apparatus 39 includes a diaphragm unit 40 and an ND filter unit 41. The diaphragm unit 40 and the ND filter unit 41 are mounted on a lens barrel.

The diaphragm unit 40 will be described now with reference to FIGS. 4 to 26.

Figure 4:
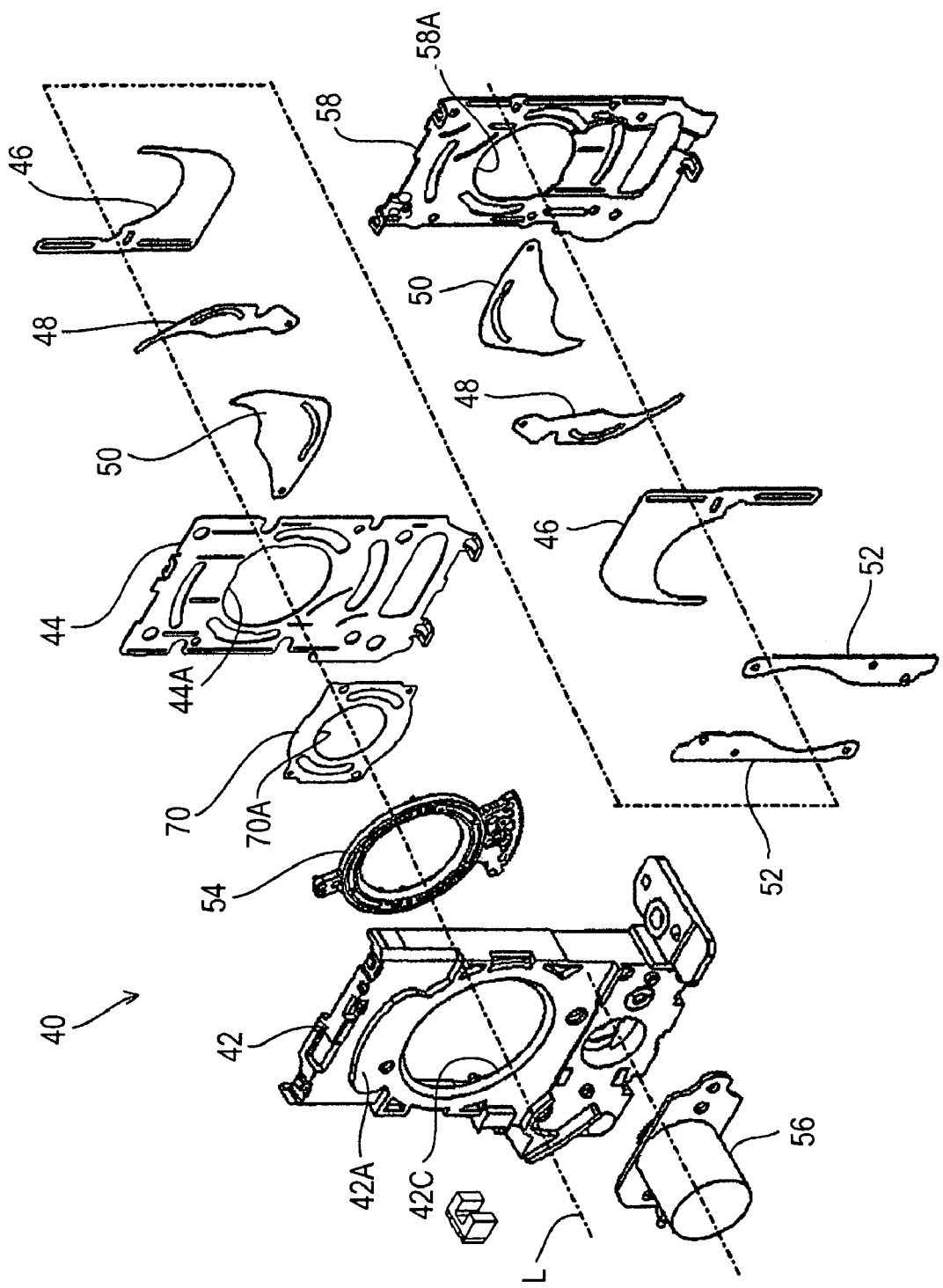
FIG. 4 is an exploded perspective view of a diaphragm unit as viewed from the front side.
Figure 5:
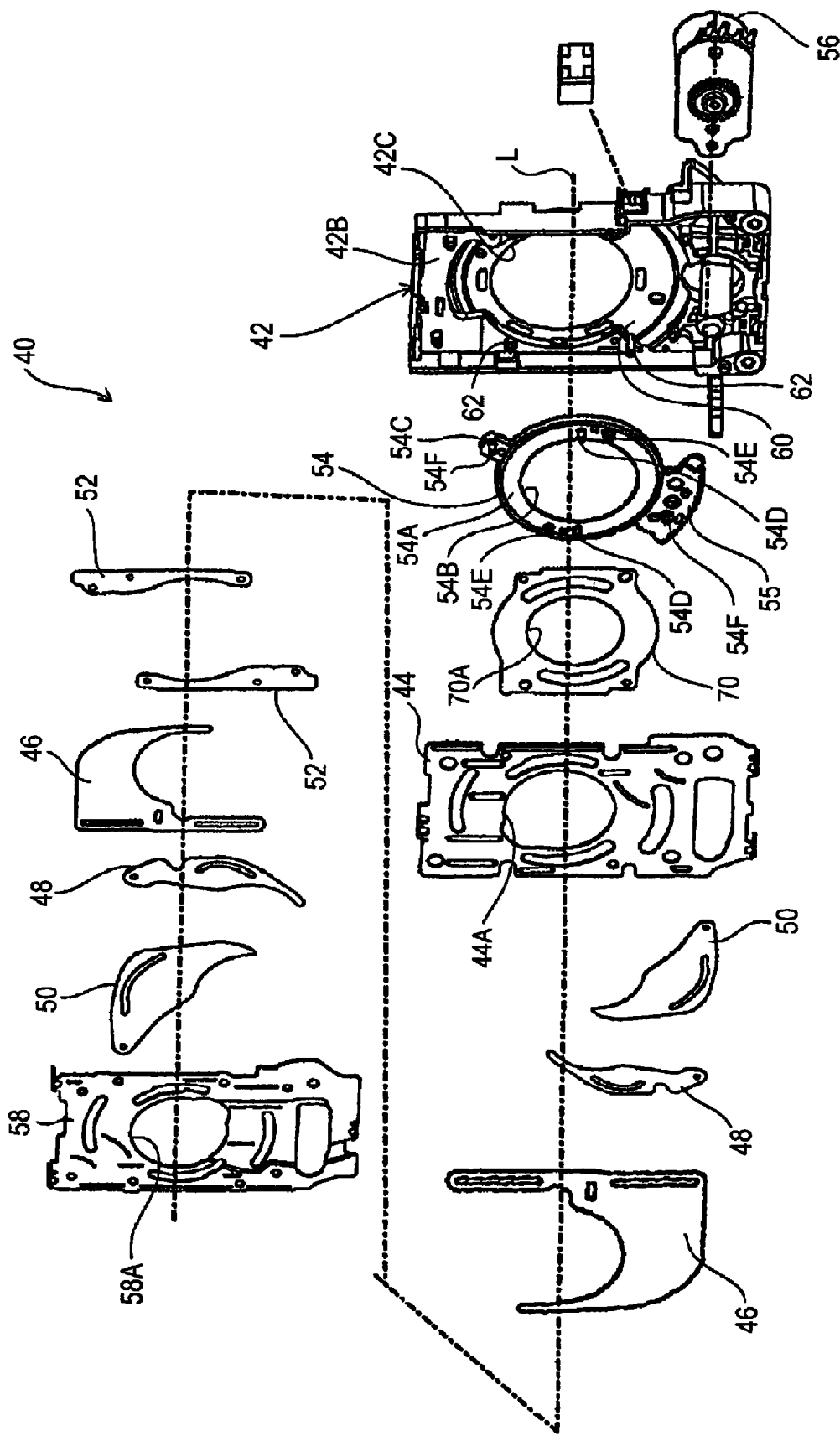
FIG. 5 is an exploded perspective view of the diaphragm unit as viewed from the rear side.

FIG. 4 is an exploded perspective view of the diaphragm unit 40 as viewed from the front side. FIG. 5 is an exploded perspective view of the diaphragm unit 40 as viewed from the rear side.

Figure 6:
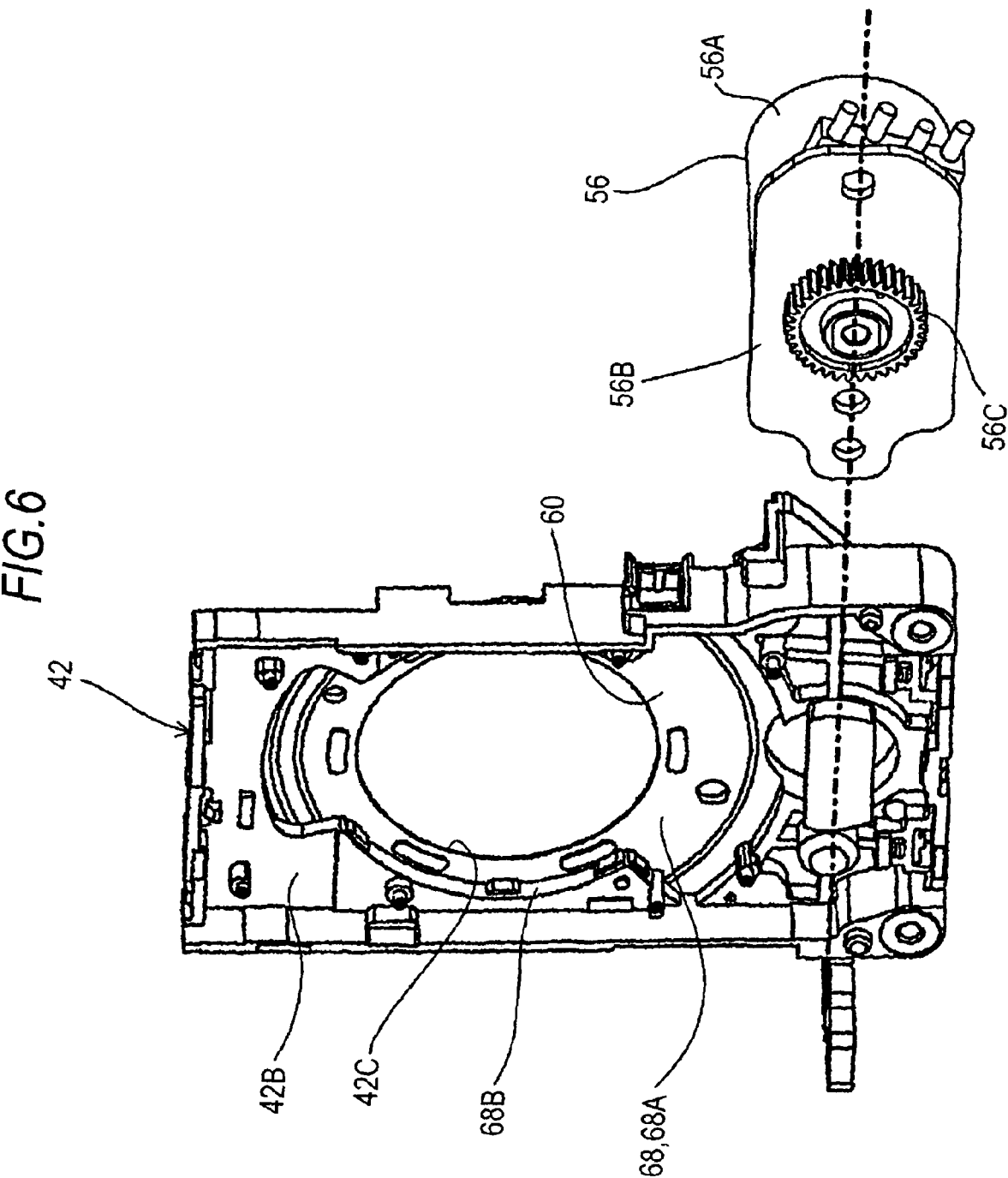
FIG. 6 is a diagram illustrating the attachment of a diaphragm motor to a diaphragm base member.
Figure 7:
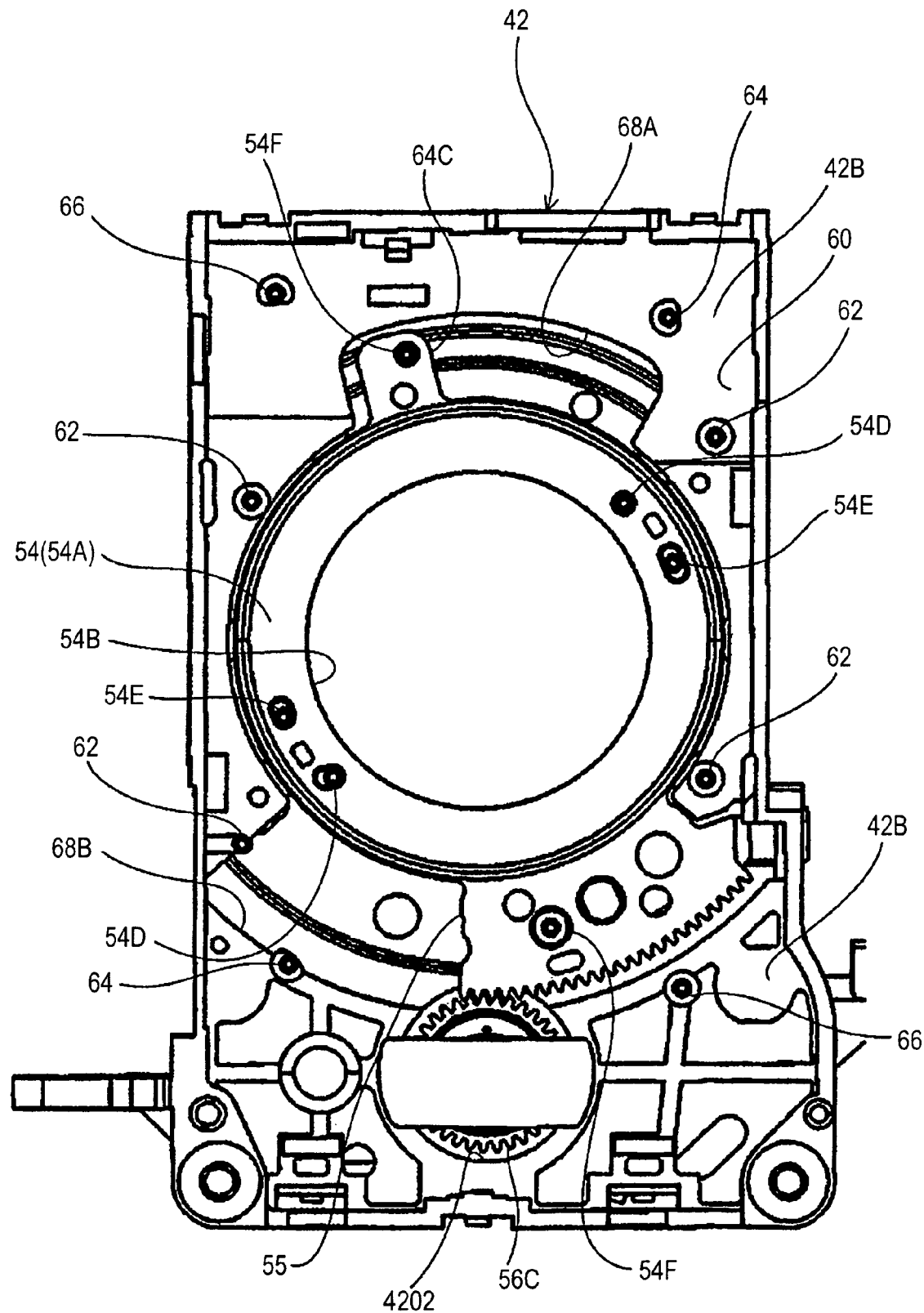
FIG. 7 is a plan view illustrating a state where the diaphragm motor and an annular plate are attached to the diaphragm base member.

FIG. 6 is a diagram illustrating the attachment of a diaphragm motor 56 to a diaphragm base member 42. FIG. 7 is a plan view illustrating a state where the diaphragm motor 56 and the annular plate 54 are attached to the diaphragm base member 42.

Figure 8:
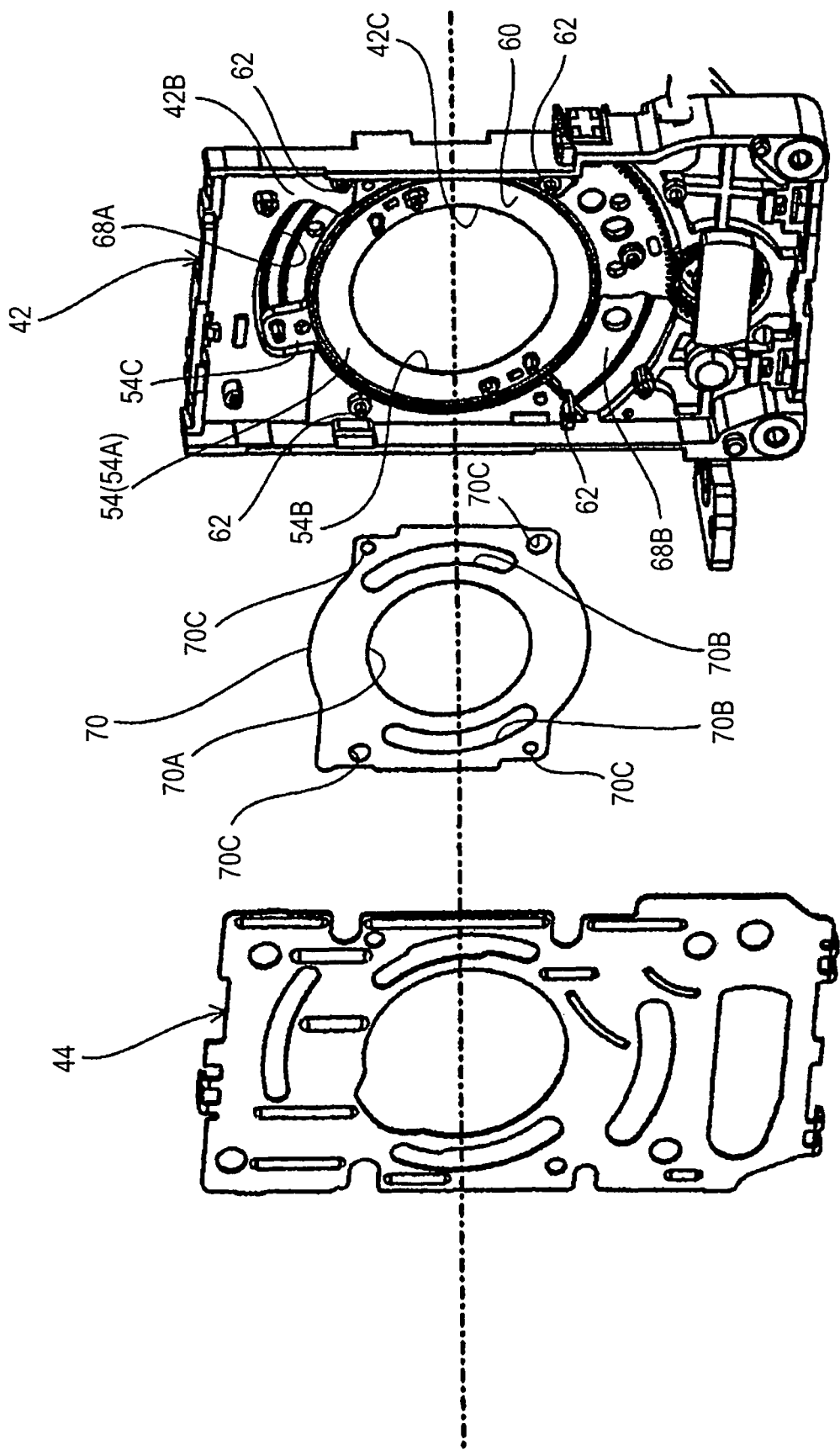
FIG. 8 is a diagram illustrating the attachment of the annular plate, a fixed diaphragm, and a partition plate to the diaphragm base member.
Figure 9:
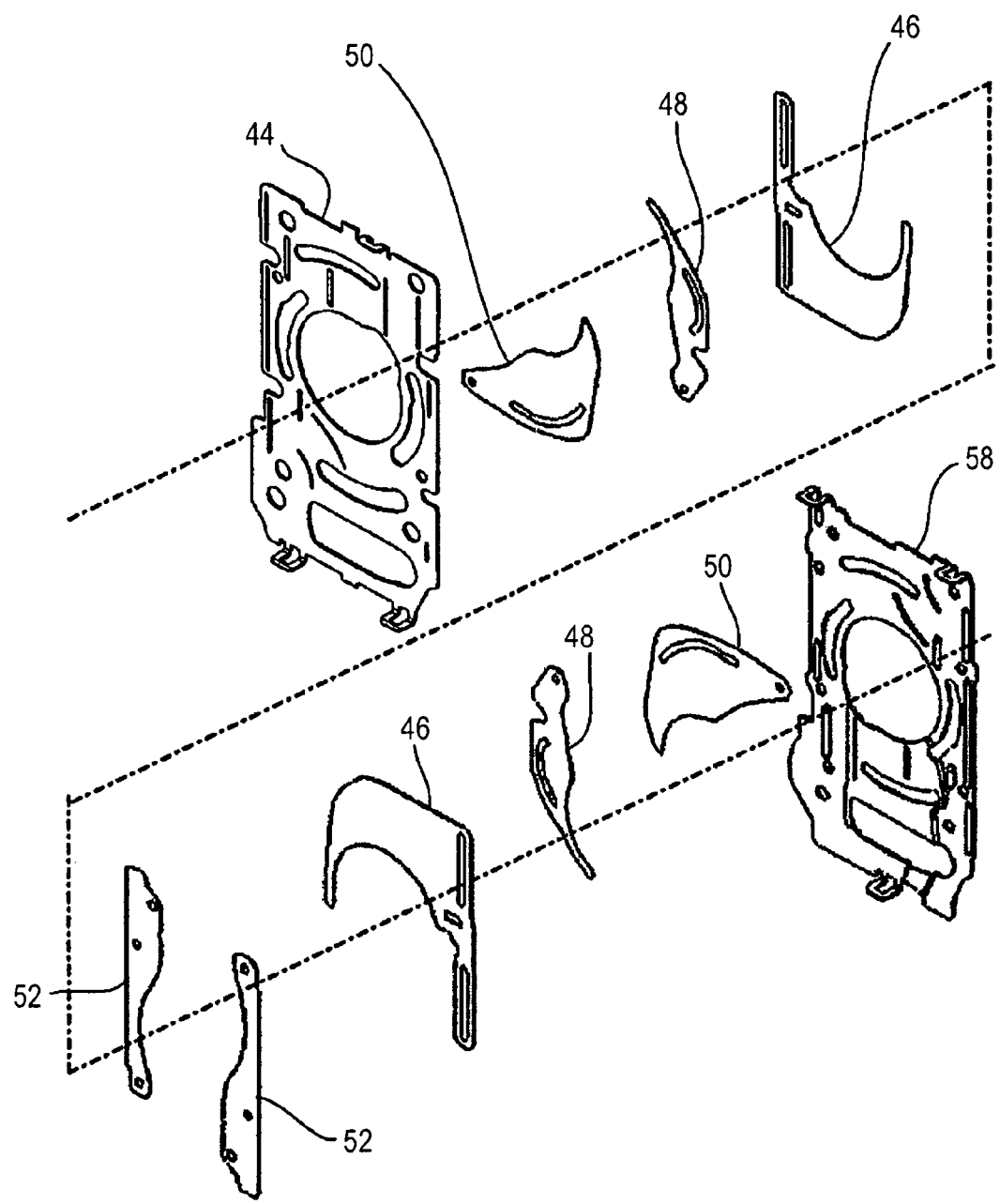
FIG. 9 is an exploded perspective view illustrating the partition plate, a diaphragm cover member, diaphragm blades, and spacers.

FIG. 8 is a diagram illustrating the attachment of the annular plate 54, a fixed diaphragm 70, and the partition plate 44 to the diaphragm base member 42. FIG. 9 is an exploded perspective view illustrating the partition plate 44, the diaphragm cover member 58, diaphragm blades 46, 48, and 50, and spacers 52.

Figure 10:
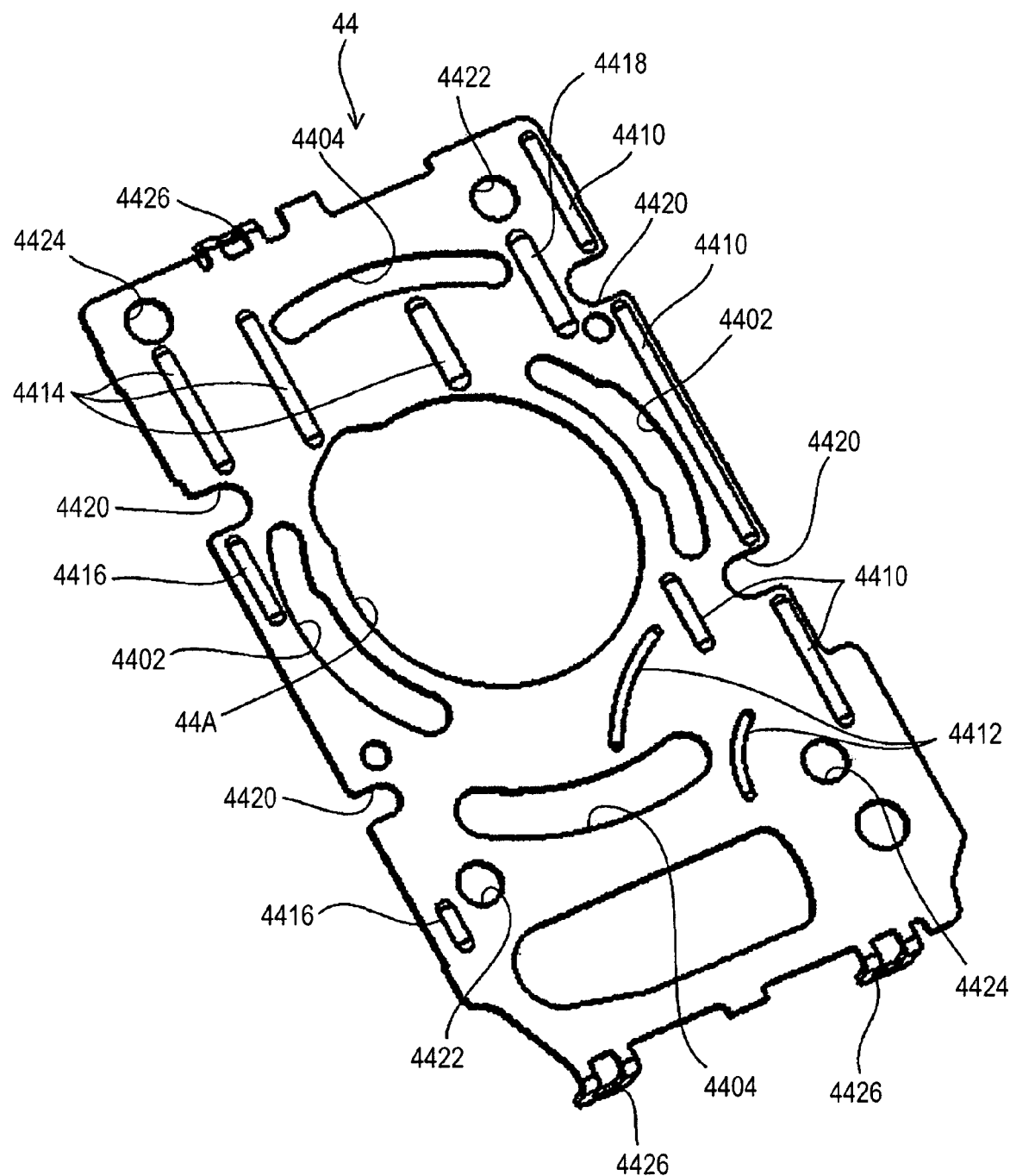
FIG. 10 is a perspective view of the partition plate as viewed from the rear side.
Figure 11:
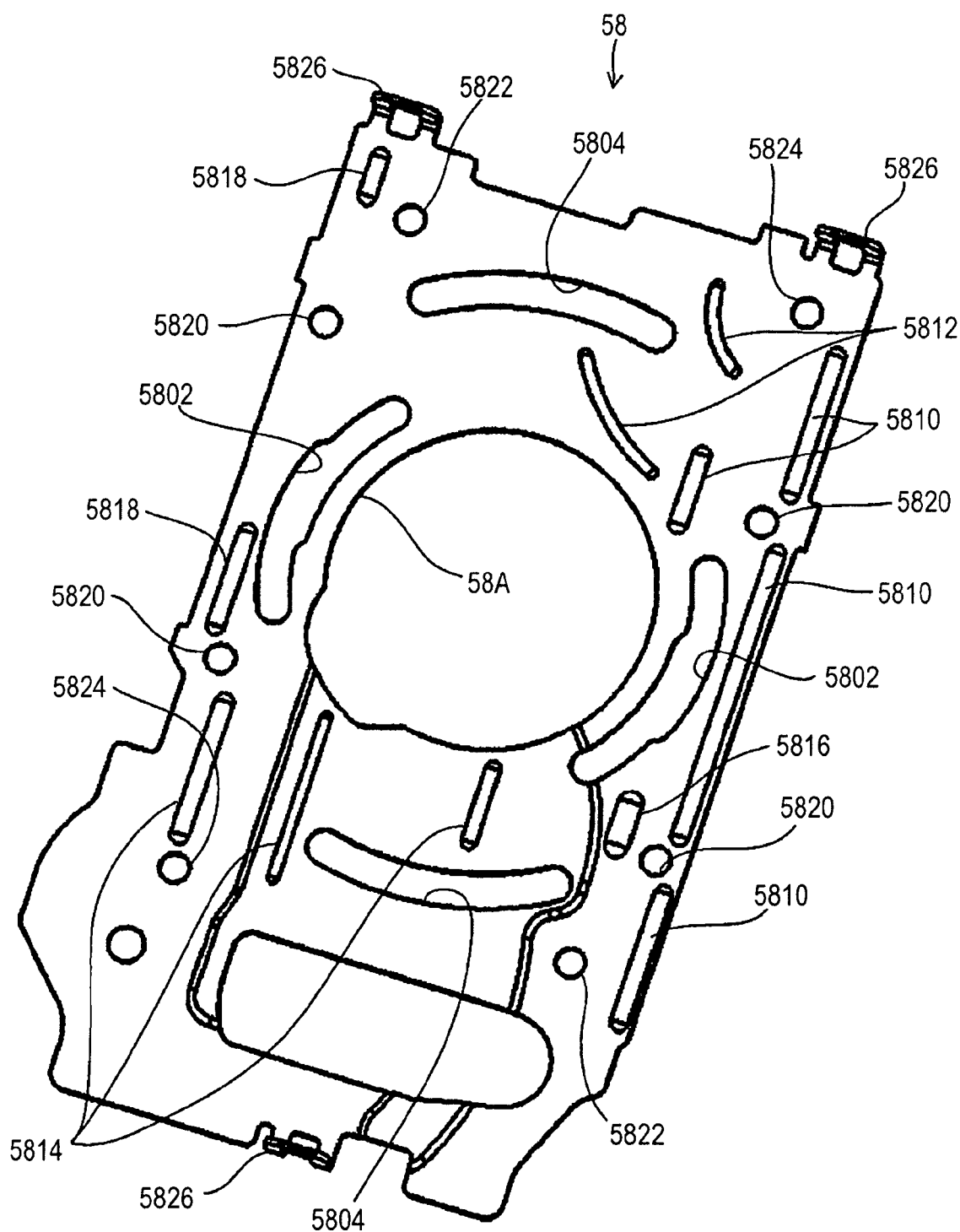
FIG. 11 is a perspective view of the diaphragm cover member as viewed from the front side.

FIG. 10 is a perspective view of the partition plate as viewed from the rear side. FIG. 11 is a perspective view of the diaphragm cover member 58 as viewed from the front side.

Figure 12:
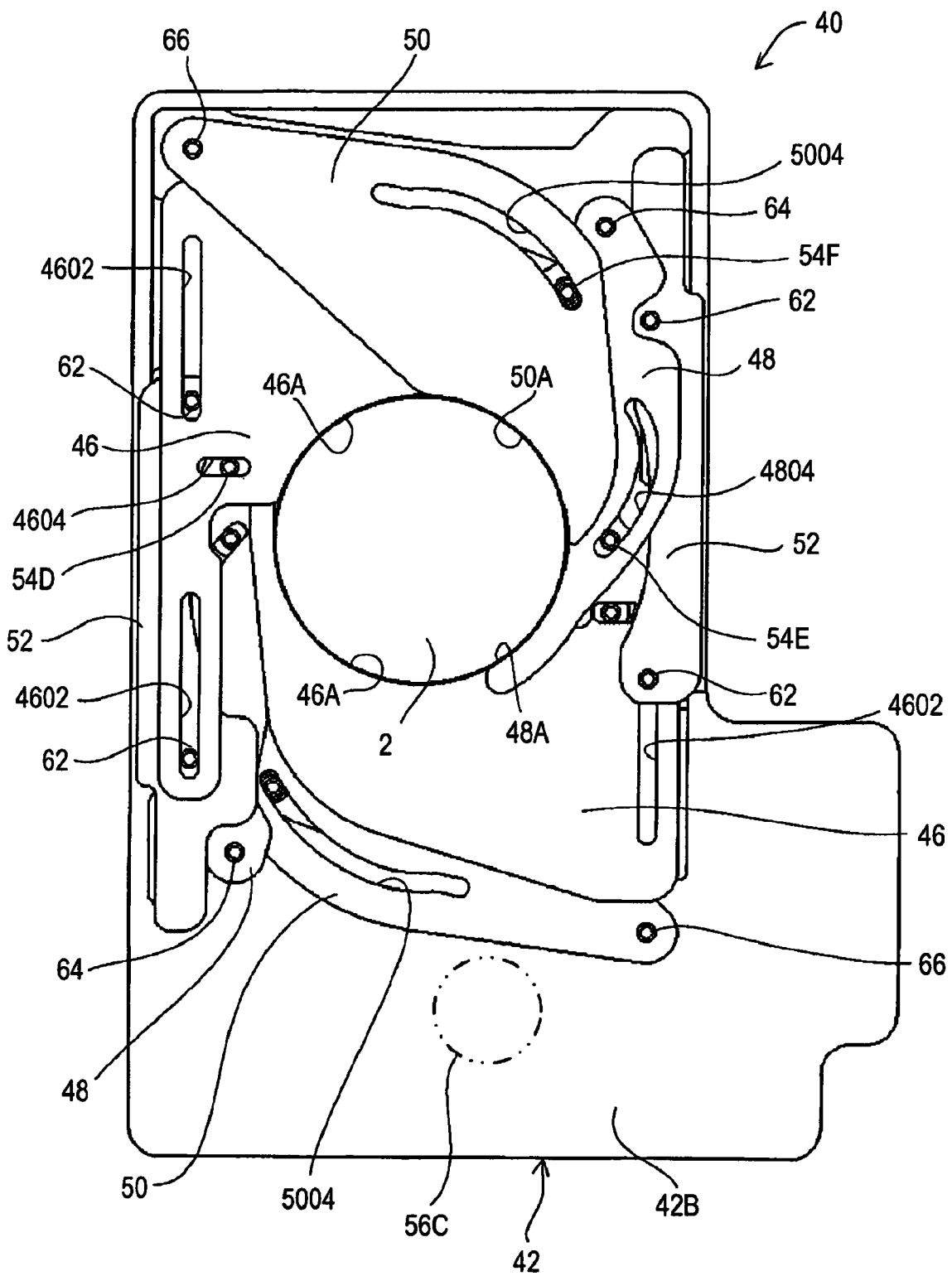
FIG. 12 is a plan view of the diaphragm unit where a diaphragm opening is open as viewed from the rear side.

FIG. 12 is a plan view of the diaphragm unit 40 where the diaphragm opening 2 is open as viewed from the rear side.

Figure 13:
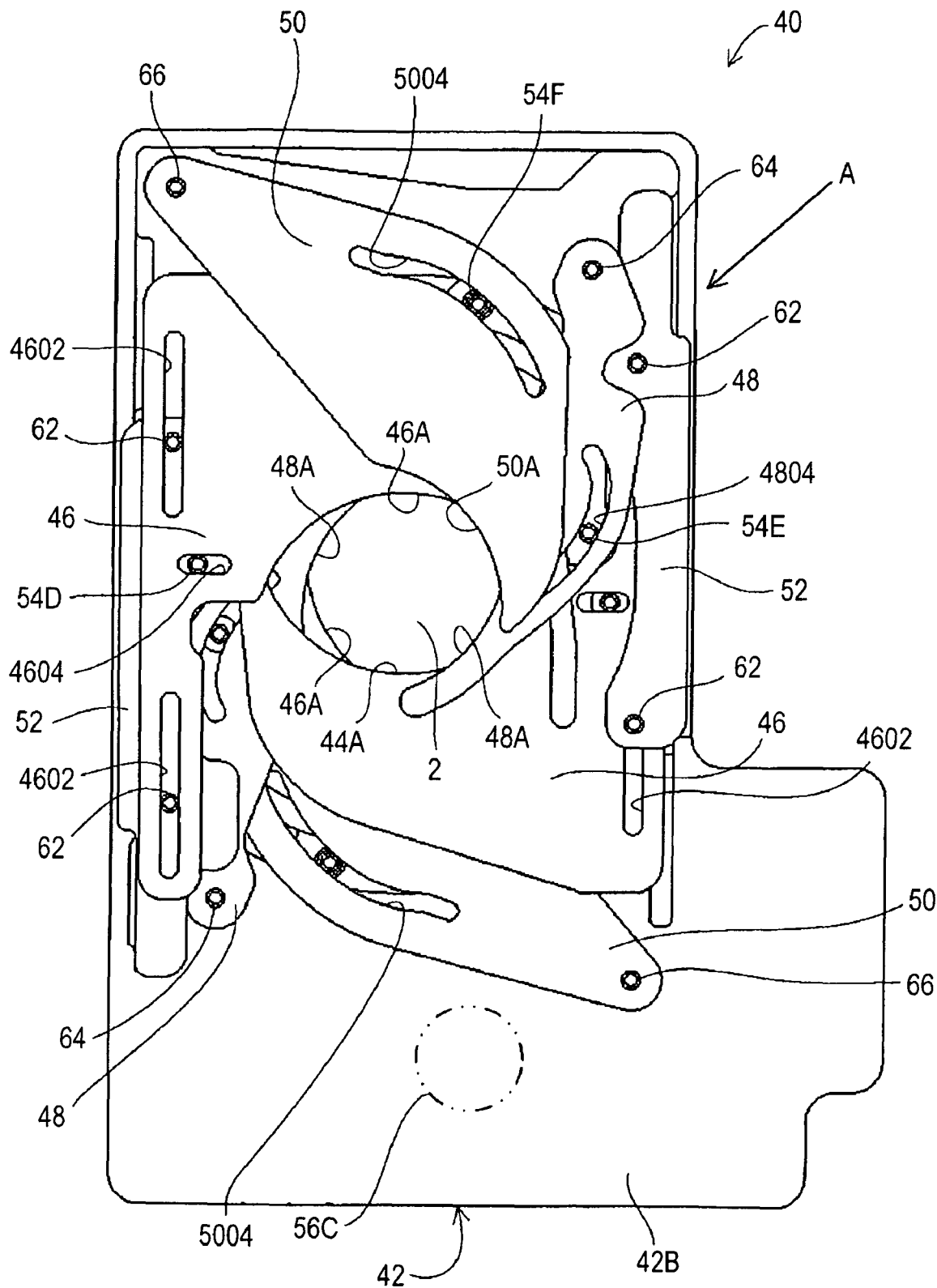
FIG. 13 is a plan view of the diaphragm unit where the diaphragm opening is narrowed by one step as viewed from the rear side.

FIG. 13 is a plan view of the diaphragm unit 40 where the diaphragm opening 2 is narrowed by one step as viewed from the rear side.

Figure 14:
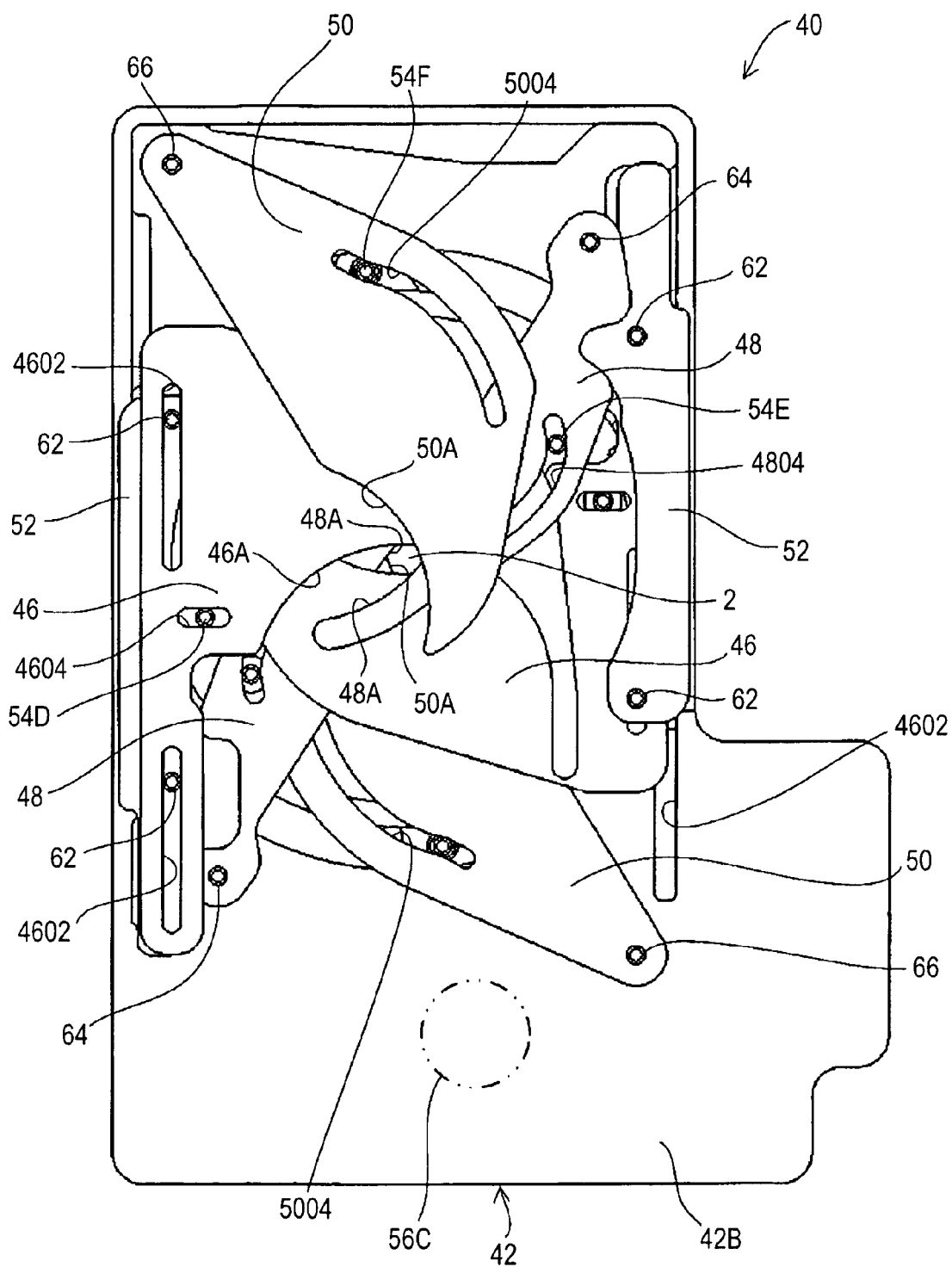
FIG. 14 is a plan view of the diaphragm unit where the diaphragm opening is narrowed by six steps as viewed from the rear side.

FIG. 14 is a plan view of the diaphragm unit 40 where the diaphragm opening 2 is narrowed by six steps as viewed from the rear side.

Figure 15:
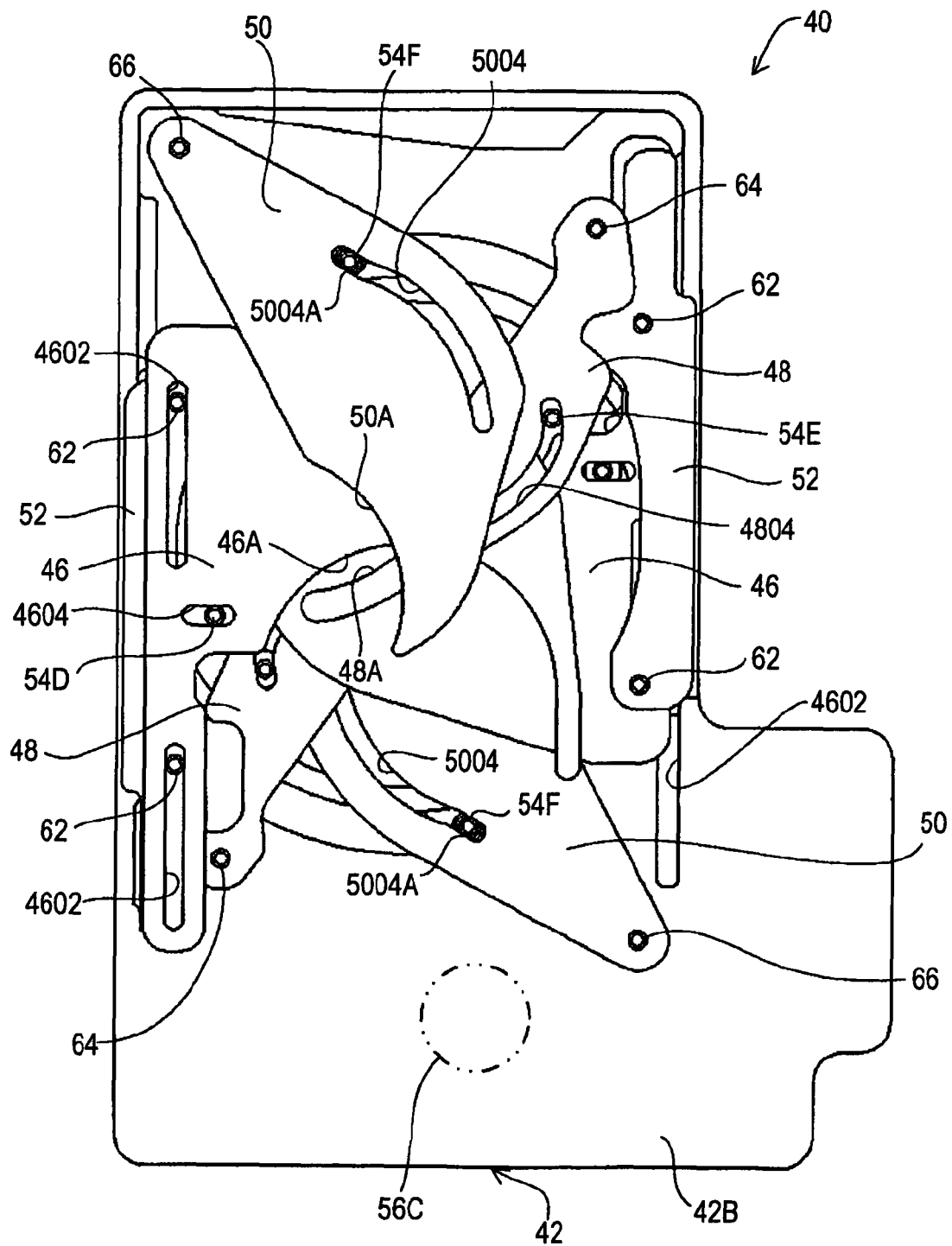
FIG. 15 is a plan view of the diaphragm unit as viewed from the rear side when the diaphragm opening is completely closed.

FIG. 15 is a plan view of the diaphragm unit 40 as viewed from the rear side when the diaphragm opening 2 is completely closed.

As shown in FIGS. 3 and 12, the diaphragm unit 40 serves to adjust the light intensity guided to the imaging device 18 by adjusting the size of the diaphragm opening 2 for limiting the beam of light guided to the imaging device 18 via the photographing optical system 14.

The diaphragm unit 40 is disposed in front of the imaging device 18.

In this embodiment, the diaphragm unit 40 includes a diaphragm base member 42, a partition plate 44, a pair of straight-moving diaphragm blades 46, a pair of first swing diaphragm blades 48, a pair of second swing diaphragm blades 50, two spacers 52, an annular plate 54, a diaphragm motor 56, and a diaphragm cover member 58.

In this embodiment, a receiving member receiving the pair of straight-moving diaphragm blades 46, the pair of first swing diaphragm blades 48, and the pair of second swing diaphragm blades 50 is constructed by the diaphragm base member 42 and the diaphragm cover member 58.

The diaphragm base member 42 is formed in a rectangular plate shape out of a synthetic resin not transmitting light and is attached to the lens barrel 16 in a state where the longitudinal side is parallel to the up-down side of the chassis 12.

As shown in FIGS. 4 and 5, the diaphragm base member 42 has a front surface 42A facing the front side and a rear surface 42B facing the rear side. A circular optical path hole 42C centered on the optical axis L of the photographing optical system 14 is formed in the diaphragm base member 42.

As shown in FIG. 5, a receiving section 60 having a concave shape to receive the partition plate 44, the pair of straight-moving diaphragm blades 46, the pair of first swing diaphragm blades 48, the pair of second swing diaphragm blades 50, two spacers 52, and the annular plate 54 are formed in the rear surface 42B of the diaphragm base member 42.

As shown in FIG. 7, two straight-moving diaphragm blade guide pins 62 slidably guiding two straight-moving diaphragm blades 46 are disposed in the rear surface 42B for each straight-moving diaphragm blade 46. The straight-moving diaphragm blade guide pins 62 are arranged around the optical path hole 42C.

As shown in FIG. 7, first swing diaphragm blade spindles 64 supporting the pair of first swing diaphragm blades 48 so as to be capable of swinging are disposed in the rear surface 42B. Second swing diaphragm blade spindles 66 supporting the pair of second swing diaphragm blades 50 so as to be capable of swinging are disposed in the rear surface 42B.

As shown in FIG. 6, a circular concave portion 68 receiving the annular plate 54 and rotatably supporting the annular plate 54 are formed around the optical path hole 42C at the bottom of the concave receiving section 60.

In the concave portion 68, as shown in FIGS. 7 and 8, fan-like concave portions 68A and 68B allowing the protrusion 54C and the gear portion 55 of the annular plate 54 to move as described later protrude to the outside in the radial direction of the concave portion 68 and extends around the concave portion 68.

As shown in FIGS. 5 and 7, the annular plate 54 has a ring-like annular plate portion 54A formed of a synthetic resin not transmitting light and an optical path hole 54B is formed at the center of the annular plate portion 54A.

The protrusion 54C is disposed in a part of the circumference of the annular plate portion 54A.

The gear portion 55 is disposed at the position of the circumference of the annular plate portion 54A separated from the protrusion 54C by 180 degrees. The gear portion 55 has a fan shape centered on the center axis of the annular plate 54.

Two straight-moving diaphragm blade driving pins 54D and two first swing diaphragm blade driving pins 54E are disposed on the surface (facing the rear side) of the annular plate portion 54A facing the other side in the thickness direction.

A second swing diaphragm blade driving pin 54F is formed to protrude from each of the surface (the surface facing the rear side) where the protrusion 54C faces the other side in the thickness direction and the surface (the surface facing the rear side) where the gear portion 55 faces the other side in the thickness direction.

Two straight-moving diaphragm blade driving pins 54D are disposed with a gap of 180 degrees about the center axis of the annular plate 54.

Two first swing diaphragm blade driving pins 54E are disposed with a gap of 180 degrees about the center axis of the annular plate 54.

Two second swing diaphragm blade driving pins 54F are disposed with a gap of 180 degrees about the center axis of the annular plate 54.

As shown in FIG. 6, the diaphragm motor 56 includes a case 56A, an attachment piece 56B, and a driving gear 56C.

The driving gear 56C is rotationally driven forwardly and backwardly on the basis of the driving current supplied from the motor driver 43 (see FIG. 3).

The case 56A is attached to the front surface 42A of the base member 42 with the attachment piece 56B interposed therebetween.

The driving gear 56C is fixed to a driving shaft protruding from one end of the case 56A.

As shown in FIG. 7, the driving gear 56C engages with the gear portion 55 of the annular plate 54 on the rear surface 42B of the base member 42 through an opening 4202 of the base member 42.

By rotationally driving the diaphragm motor 56 forwardly and backwardly, the annular plate 54 swings in the clockwise direction and the counterclockwise direction about the center axis of the annular plate 54 via the driving gear 56C and the gear portion 55.

In FIG. 5, reference numeral 70 represents a fixed diaphragm disposed between the annular plate 54 and the partition plate 44.

The fixed diaphragm 70 is formed in a thin plate shape out of a synthetic resin not transmitting light.

As shown in FIG. 8, a circular hole 70A for determining the maximum diameter of the diaphragm opening 2 is formed at the center of the fixed diaphragm 70.

Two relief grooves 70B into which two straight-moving diaphragm blade driving pins 54D and two first swing diaphragm blade driving pins 54E are inserted are disposed in the fixed diaphragm 70 so as to extend in the circumferential direction of the optical axis L.

Insertion holes 70C into which four straight-moving diaphragm blade guide pins 62 are inserted are formed in the fixed diaphragm 70.

By inserting the straight-moving diaphragm blade guide pins 62 into the insertion holes 70C, the fixed diaphragm 70 is not movable in the plane perpendicular to the optical axis L.

As shown in FIGS. 4 and 5, the partition plate 44 is interposed between the annular plate 54 and plural diaphragm blades 46, 48, and 50 and serves to separate the annular plate 54 from the plural diaphragm blades 46, 48, and 50.

The partition plate 44 is formed of a rectangular steel sheet and has an optical path hole 44A formed therein so as to expose the diaphragm opening 2 in the direction of the optical axis L in the sate where it is attached to the diaphragm base member 42.

The optical path hole 44A has a diameter equal to or greater than the hole 70A of the fixed diaphragm 70.

As shown in FIGS. 5 and 10, a first insertion portion 4402, a second insertion portion 4404, a first rail 4410, a second rail 4412, a third rail 4414, a fourth rail 4416, and a fifth rail 4418 are formed in the partition plate 44.

Two straight-moving diaphragm blade driving pins 54D and two first swing diaphragm blade driving pins 54E are loosely inserted into the first insertion portion 4402 and two first insertion portions are formed to extend in the circumferential direction of the optical axis L. Two straight-moving diaphragm blade driving pins 54D and two first swing diaphragm blade driving pins 54E swing in the first insertion portions 4402 without interfering with the partition plate 44.

Two second swing diaphragm blade driving pins 54F are loosely inserted into the second insertion portion 4404 and two second insertion portions are formed to extend in the circumferential direction of the optical axis L. Two second swing diaphragm blade driving pins 54F swing in the second insertion portions 4404 without interfering with the partition plate 44.

The first rail 4410 serves to guide the movement of the straight-moving diaphragm blade 46 disposed close to the partition plate 44 out of the pair of straight-moving diaphragm blades 46. In this embodiment, four first rails are disposed to linearly extend in the moving direction (in the up-down directions) of the straight-moving diaphragm blade 46.

The second rail 4412 serves to guide the movement of the second swing diaphragm blade 50 disposed close to the partition plate 44 out of the pair of second swing diaphragm blades 50. In this embodiment, two second rails are disposed to extend arc-like in the moving direction of the second swing diaphragm blade 50.

The third rail 4414 serves to guide the movement of the straight-moving diaphragm blade 46 disposed close to the diaphragm cover member 58 out of the pair of straight-moving diaphragm blades 46. In this embodiment, three third rails are disposed to linearly extend in the moving direction of the straight-moving diaphragm blade 46.

The fourth rail 4416 comes in contact with the spacer 52 disposed on one side in the width direction of the partition plate 44 out of the pair of spacers 52. In this embodiment, two fourth rails 4416 are disposed to linearly extend in the moving direction (in the up-down directions) of the spacer 52.

The fifth rail 4418 comes in contact with the spacer 52 disposed on the other side in the width direction of the partition plate 44 out of the pair of spacers 52. In this embodiment, one fifth rail 4418 is disposed to linearly extend in the moving direction (in the up-down directions) of the spacer 52.

In FIG. 10, reference numeral 4420 represents cutouts which are formed in the partition plate 44 and into which four straight-moving diaphragm blade guide pins 62 are loosely inserted.

Reference numeral 4422 represents insertion holes which are formed in the partition plate 44 and into which two first swing diaphragm blade spindles 64 are inserted.

Reference numeral 4424 represents insertion holes which are formed in the partition plate 44 and into which two second swing diaphragm blade spindles 66 are inserted.

By inserting two first swing diaphragm blade spindles 64 and two second swing diaphragm blade spindles 66 into the insertion holes 4422 and 4424, the partition plate 44 is not capable of moving in the plane perpendicular to the optical axis L.

Reference numeral 4426 represents engagement claws which are formed in the partition plate 44 and which allows the partition plate 44 to engage with the diaphragm base member 42. In this embodiment, one engagement claw 4426 is disposed on one (upper) edge in the longitudinal direction of the partition plate 44 and two engagement claws are disposed on the other (lower) edge.

Figure 21:
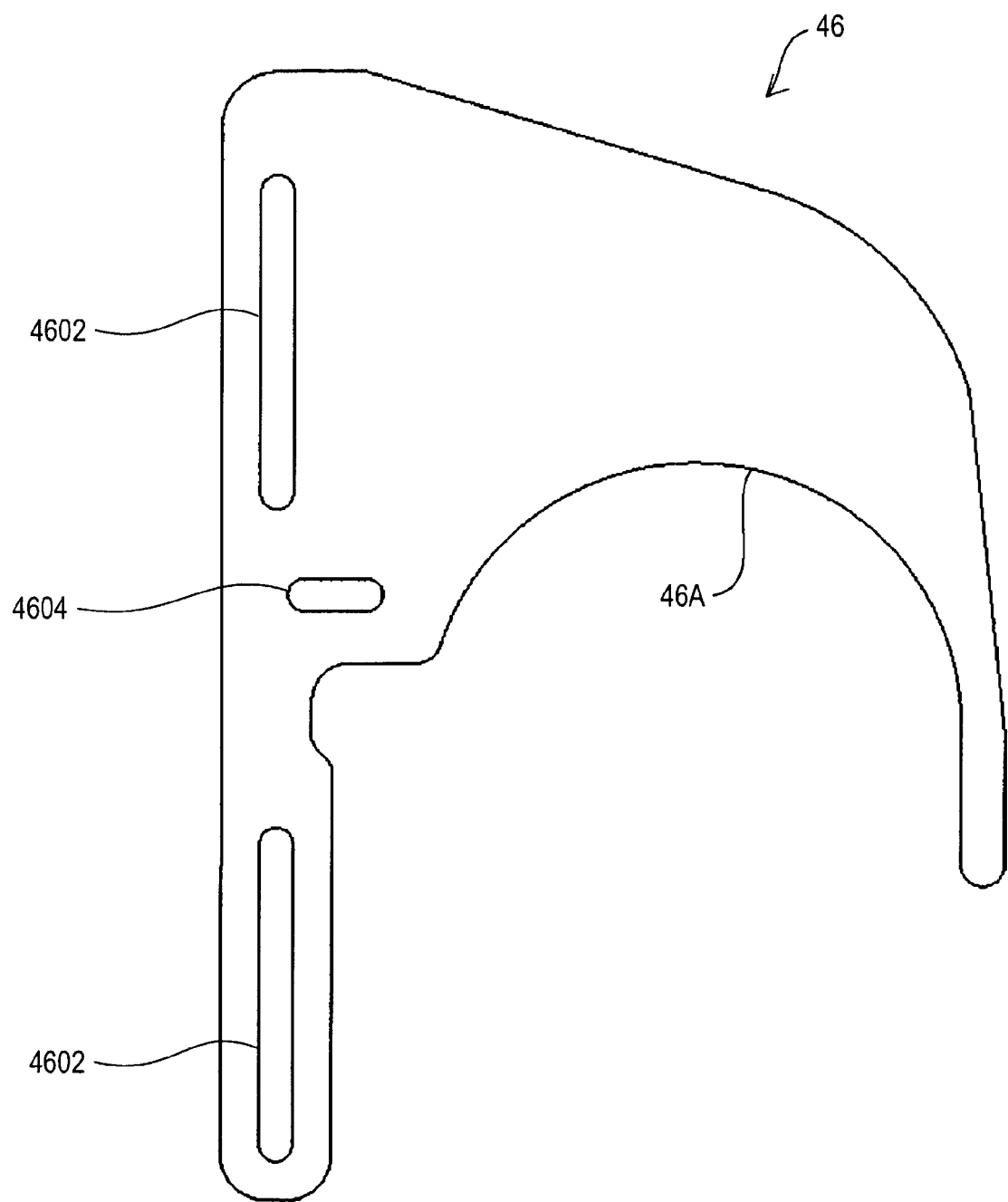
FIG. 21 is a plan view of the straight-moving diaphragm blade.

FIG. 21 is a plan view of the straight-moving diaphragm blade 46.

The straight-moving diaphragm blade 46 is formed in a thin plate shape out of a synthetic resin not transmitting light and includes a linear portion and a curved portion extending continuously from the linear portion.

Two linear guide grooves 4602 and a cam groove 4604 are formed in the linear portion and an opening forming edge portion 46A is formed in the curved portion.

Two linear guide grooves 4602 serve to straight-movably guide the straight-moving diaphragm blade 46 and extends in the straight line along the linear portion.

The cam groove 4604 extends in the direction perpendicular to the straight line between two linear guide grooves 4062.

The opening forming edge portion 46A serves to form the diaphragm opening 2 of the diaphragm unit 40 and extends in a semi-circular concave shape along the curved portion.

Figure 22:
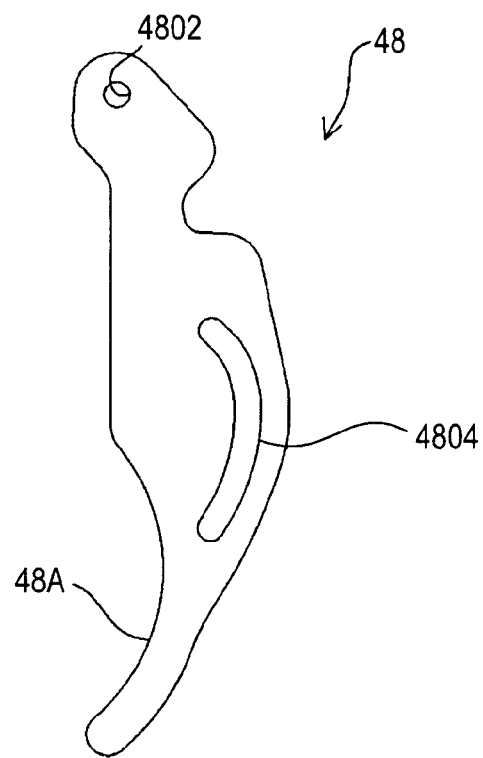
FIG. 22 is a plan view of the first swing diaphragm blade.

FIG. 22 is a plan view of the first swing diaphragm blade 48.

The first swing diaphragm blade 48 is formed in a thin plate shape out of a synthetic resin not transmitting light and has a longitudinal shape.

The first swing diaphragm blade 48 is provided with a hole 4802, a cam groove 4804, and an opening forming edge portion 48A.

The hole 4802 is formed at one end in the longitudinal direction of the first swing diaphragm blade 48.

The cam groove 4804 extends in the middle portion in the longitudinal direction of the first swing diaphragm blade 48.

The opening forming edge portion 48A serves to form the diaphragm opening 2 of the diaphragm unit 40 and extends in a circular arc-like concave shape along one side of the width direction of the other end in the longitudinal direction of the first swing diaphragm blade 48.

Figure 23:
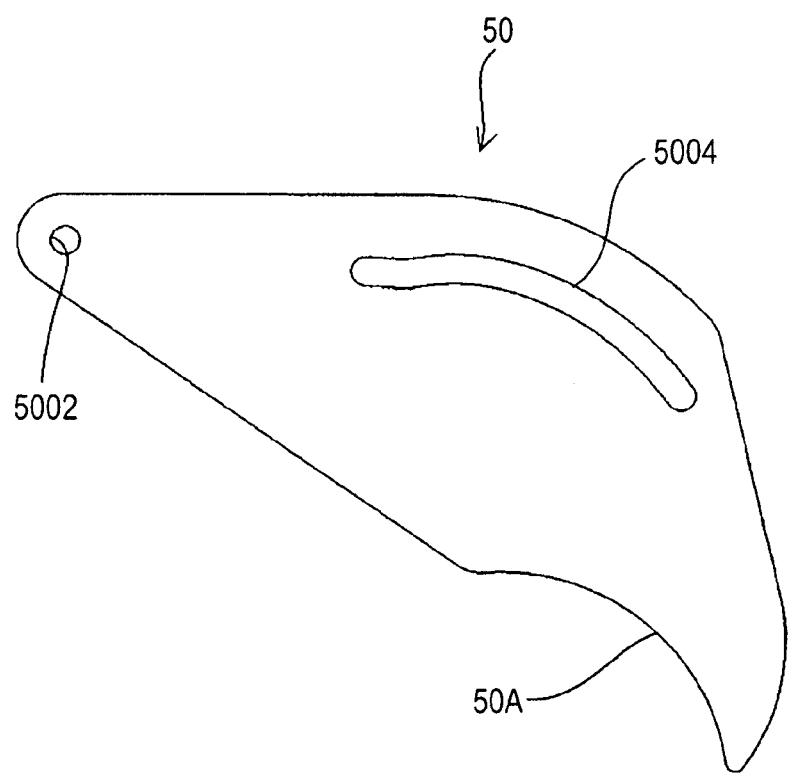
FIG. 23 is a plan view of the second swing diaphragm blade.

FIG. 23 is a plan view of the second swing diaphragm blade 50.

The second swing diaphragm blade 50 is formed in a thin plate shape out of a synthetic resin not transmitting light and has a shape of which the width decreases as it approaches to both ends in the longitudinal direction.

The second swing diaphragm blade 50 is provided with a hole 5002, a cam groove 5004, and an opening forming edge portion 50A.

The hole 5002 is formed at one end in the longitudinal direction of the second swing diaphragm blade.

The cam groove 5004 extends in the middle portion in the longitudinal direction.

The opening forming edge portion 50A serves to form the diaphragm opening 2 of the diaphragm unit 40 and extends in a circular concave shape along one side in the width direction of the other end in the longitudinal direction of the second swing diaphragm blade 50.

Figure 24:
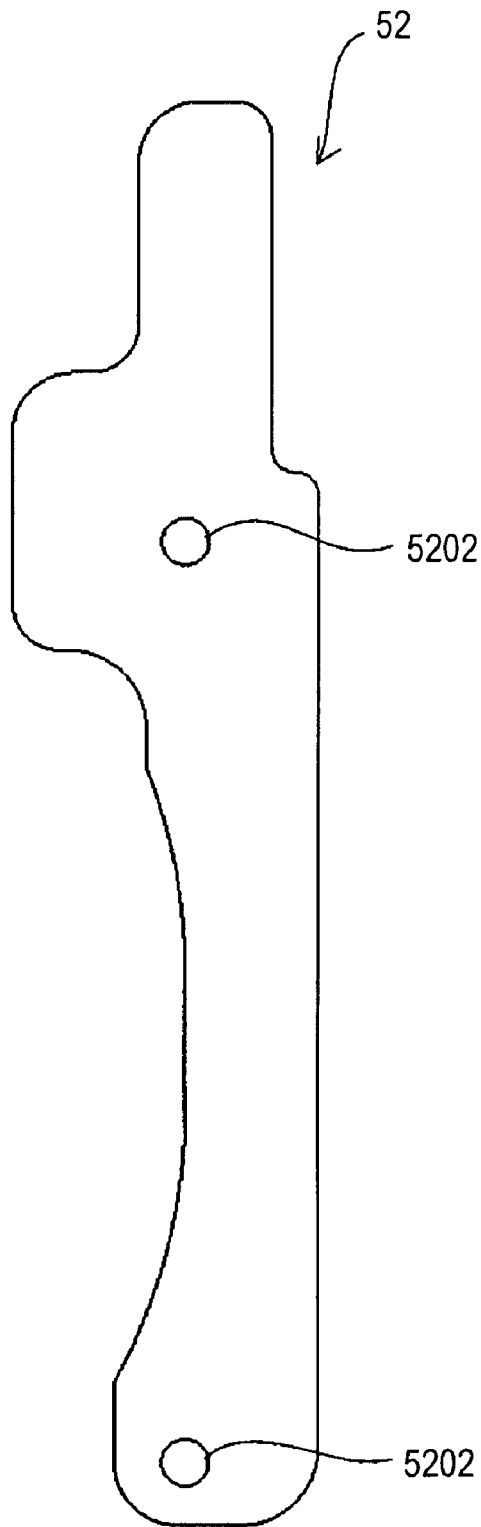
FIG. 24 is a plan view of the spacer.

FIG. 24 is a plan view of the spacer 52.

The spacer 52 is formed in a thin plate shape out of a synthetic resin not transmitting light and has a longitudinal shape.

Two attachment holes 5202 are formed in the spacer 52 with a gap in the longitudinal direction.

The diaphragm cover member 58 is attached to the diaphragm base member 42 so as to cover the plural diaphragm blades 46, 48, and 50, the spacers 52, the fixed diaphragm 70, and the annular plate 54, which are received in the receiving section 60, and holds the members such that they do not drop from the diaphragm base member 42.

The diaphragm cover member 58 is formed of a rectangular thin steel plate.

An optical path hole 58A is formed in the diaphragm cover member 58 so as to expose the diaphragm opening 2 in the direction of the optical axis L in the state where it is attached to the diaphragm base member 42.

The optical path hole 58A has a diameter equal to or greater than the hole 70A of the fixed diaphragm 70.

As shown in FIGS. 5 and 11, a third insertion portion 5802, a fourth insertion portion 5804, a sixth rail 5810, a seventh rail 5812, an eighth rail 5814, a ninth rail 5816, and a tenth rail 5818 are formed in the diaphragm cover member 58.

Two straight-moving diaphragm blade driving pins 54D and two first swing diaphragm blade driving pins 54E are loosely inserted into the third insertion portion 5802. Two third insertion portions are formed to extend in the circumferential direction of the optical axis L.

Two second swing diaphragm blade driving pins 54F are loosely inserted into the fourth insertion portion 5804.

Two insertion portions are formed to extend in the circumferential direction of the optical axis.

The sixth rail 5810 serves to guide the movement of the straight-moving diaphragm blade 46 disposed close to the diaphragm cover member 58 out of the pair of straight-moving diaphragm blades 46. In this embodiment, four sixth rails are formed to linearly extend in the moving direction (in the up-down directions) of the straight-moving diaphragm blade 46.

The seventh rail 5812 serves to guide the movement of the second swing diaphragm blade 50 disposed close to the diaphragm cover member 58 out of the pair of second swing diaphragm blades 50. In this embodiment, two seventh rails are formed to linearly extend in the moving direction of the second swing diaphragm blade 50.

The eighth rail 5814 serves to guide the movement of the straight-moving diaphragm blade 46 disposed close to the partition plate 44 out of the pair of straight-moving diaphragm blades 46. In this embodiment, three eighth rails are formed to linearly extend in the moving direction (in the up-down directions) of the straight-moving diaphragm blade 46.

The ninth rail 5816 comes in contact with the spacer disposed on one side in the width direction of the partition plate 44 out of the pair spacers 52. In this embodiment, one ninth rail 5816 is disposed to extend linearly in the extending direction (in the up-down directions) of the spacer 52.

The tenth rail 5818 comes in contact with the spacer 52 disposed on the other side in the width direction of the partition plate 44 out of the pair spacers 52. In this embodiment, two tenth rails 5818 are disposed to linearly extend in the extending direction (in the up-down directions) of the spacer 52.

Therefore, in this embodiment, the spacer 52 disposed on one side in the width direction of the partition plate 44 is interposed in the direction of the optical axis L between the fourth rail 4416 and the ninth rail 5816 and is thus positioned in the direction of the optical axis L.

In this embodiment, the spacer 52 disposed on the other side in the width direction of the partition plate 44 is interposed in the direction of the optical axis L between the fifth rail 4418 and the tenth rail 5818 and is thus positioned in the direction of the optical axis L.

In FIG. 11, reference numeral 5820 represents insertion holes into which four straight-moving diaphragm blade guide pins 62 are inserted.

Reference numeral 5822 represents insertion holes which are formed in the diaphragm cover member 58 and into which two first swing diaphragm blade spindles 64 are inserted.

Reference numeral 5824 represents insertion holes which are formed in the diaphragm cover member 58 and into which two second swing diaphragm blade spindles 66 are inserted.

By inserting two first swing diaphragm blade spindles 64 and two second swing diaphragm blade spindles 66 into the insertion holes 5822 and 5824, the diaphragm cover member 58 is not capable of moving in the plane perpendicular to the optical axis L.

Reference numeral 5826 represents engagement claws which are formed in the diaphragm cover member 58 and which allows the diaphragm cover member 58 to engage with the diaphragm base member 42. In this embodiment, two engagement claws 5826 are disposed on one (upper) edge in the longitudinal direction of the diaphragm cover member 58 and one engagement claw 5826 is disposed on the other (lower) edge.

As described later, one of the pair of straight-moving diaphragm blades 46, one of the pair of first swing diaphragm blades 48, and one of the pair of second swing diaphragm blades 50 are disposed close to the diaphragm cover member 58.

The other of the pair of straight-moving diaphragm blades 46, the other of the pair of first swing diaphragm blades 48, and the other of the pair of second swing diaphragm blades 50 are disposed close to the diaphragm base member 42.

One of the pair of straight-moving diaphragm blades 46, one of the pair of first swing diaphragm blades 48, and one of the pair of second swing diaphragm blades 50 move almost in the upper half area of the diaphragm unit 40.

The other of the pair of straight-moving diaphragm blades 46, the other of the pair of first swing diaphragm blades 48, and the other of the pair of second swing diaphragm blades 50 move almost in the lower half area of the diaphragm unit 40.

That is, when the diaphragm unit 40 is divided into two areas by the use of a virtual line perpendicular to the optical axis L, one of the pair of straight-moving diaphragm blades 46, one of the pair of first swing diaphragm blades 48, and one of the pair of second swing diaphragm blades 50 move almost in one area of two divided areas.

When the diaphragm unit 40 is divided into two areas by the use of a virtual line perpendicular to the optical axis L, the other of the pair of straight-moving diaphragm blades 46, the other of the pair of first swing diaphragm blades 48, and the other of the pair of second swing diaphragm blades 50 move almost in the other area of two divided areas.

The diaphragm cover member 58 is provided with a concave portion 5850 (see FIGS. 32 and 35) which is concave toward the diaphragm base member 42.

The diaphragm cover member 58 disposed in the concave portion 5850 is located outside the moving locus of one of the pair of straight-moving diaphragm blades 46, one of the pair of first swing diaphragm blades 48, and one of the pair of second swing diaphragm blades 50.

Figure 32:
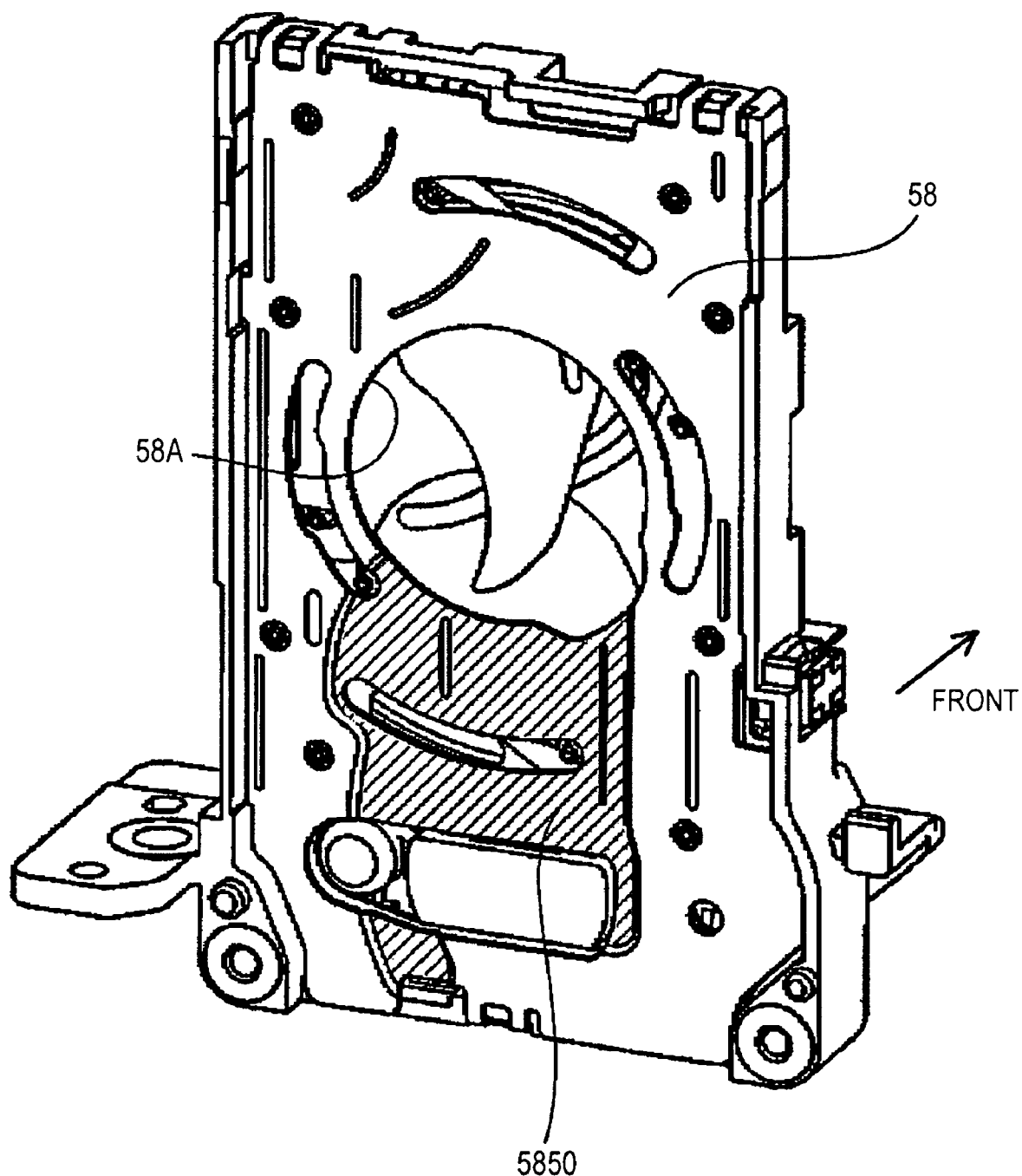
FIG. 32 is a perspective view of the diaphragm unit to which the diaphragm cover member is attached as viewed from the rear side.

In this embodiment, the concave portion 5850 is disposed in the center area in the lateral direction in the lower half of the diaphragm cover member 58, as indicated by the hatched portion in FIG. 32.

The depth of the concave portion 5850 has such a size that a gap in the direction of the optical axis can be guaranteed among the other of the pair of straight-moving diaphragm blades 46, the other of the pair of first swing diaphragm blades 48, and the other of the pair of second swing diaphragm blades 50.

In this embodiment, the receiving member including the diaphragm base member 42 and the diaphragm cover member 58 has a pair of side surfaces facing each other in the direction of the optical axis L. One of the pair of side surfaces is formed of the diaphragm cover member 58 and the other of the pair of side surfaces is formed of the diaphragm base member 42. The concave portion 5850 is formed in the diaphragm cover member 58 which is one of the pair of side surfaces.

The assembly of the diaphragm unit 40 will be described now.

As shown in FIGS. 4 and 5, the annular plate 54 is received in the concave portion 68 of the diaphragm base member 42 in the state where the straight-moving diaphragm blade driving pins 54D, the first swing diaphragm blade driving pins 54E, and the second swing diaphragm blade driving pins 54F of the annular plate 54 are made to face the rear side.

Subsequently, by inserting the driving pins 54D and 54E into the relief grooves 70B of the fixed diaphragm 70 and inserting the straight-moving diaphragm blade driving pins 62 in the insertion holes 70C, the fixed diaphragm 70 is attached to the diaphragm base member 42 with the annular plate 54 interposed therebetween.

Then, the partition plate 44 is attached to the diaphragm base member 42.

That is, the rails 4410, 4412, 4414, 4416, and 4418 of the partition plate 44 are made to face the rear side and the straight-moving diaphragm blade driving pins 54D and the first swing diaphragm blade driving pins 54E are inserted into the first insertion portions 4402. In addition, the second swing diaphragm blade driving pins 54F are inserted into the second insertion portions 4404.

In addition, the first swing diaphragm blade spindles 64 and the second swing diaphragm blade spindles 66 are inserted into the insertion holes 4422 and 4424.

By allowing the engagement claws 4426 to engage with the diaphragm base member 42, the partition plate 44 is attached to the diaphragm base member 42 with the fixed diaphragm 70 and the annular plate 54 interposed therebetween.

Then, one of the pair of straight-moving diaphragm blades 46, one of the pair of first swing diaphragm blades 48, one of the pair of second swing diaphragm blades 50, and one of the two spacers 52 are attached to the diaphragm base member 42.

That is, as shown in FIG. 5, one second swing diaphragm blade spindle 66 is inserted into the hole 5002 of the second swing diaphragm blade 50 while allowing one second swing diaphragm blade 50 of the pair of second swing diaphragm blades 50 to face the rear surface 42B of the diaphragm base member 42. In addition, one second swing diaphragm blade driving pin 54F is inserted into the cam groove 5004 of one second swing diaphragm blade 50.

Subsequently, one first swing diaphragm blade spindle 64 is inserted into the hole 4802 of one first swing diaphragm blade 48 so as to overlap one first swing diaphragm blade 48 of the pair of first swing diaphragm blades 48 with one second swing diaphragm blade 50. In addition, one first swing diaphragm blade driving pin 54E is inserted into the cam groove 4804 of one first swing diaphragm blade 48.

Then, one straight-moving diaphragm blade guide pin is inserted into two linear guide grooves 4602 of one straight-moving diaphragm blade 46 so as to overlap one straight-moving diaphragm blade 46 of the pair of straight-moving diaphragm blades 46 with the first and second swing diaphragm blades 48 and 50 on one side. In addition, one straight-moving diaphragm blade driving pin 54D is inserted into the cam groove 4604 of one straight-moving diaphragm blade 46.

Subsequently, two straight-moving diaphragm blade guide pins 62 are inserted into two attachment holes 5202 of one spacer 52 so as to overlap one spacer 52 of two spacers 52 with one straight-moving diaphragm blade 46.

Then, the other of the pair of straight-moving diaphragm blades 46, the other of the pair of first swing diaphragm blades 48, the other of the pair of second swing diaphragm blades 50, and the other of two spacers 52 are attached to the diaphragm base member 42.

That is, two straight-moving diaphragm blade guide pins 62 on the other side are inserted into two attachment holes 5202 of the other spacer 52 so as to overlap the other spacer 52 of two spacers 52 with one first swing diaphragm blade 48.

Subsequently, the other straight-moving diaphragm blade guide pins 62 are inserted into two linear guide grooves 4602 of the other straight-moving diaphragm blade 46 so as to overlap the other straight-moving diaphragm blade 46 of the pair of straight-moving diaphragm blades 46 with two spacers 52. In addition, the other straight-moving diaphragm blade driving pin 54D is inserted into the cam groove 4604 of the other straight-moving diaphragm blade 46.

Subsequently, the other first swing diaphragm blade spindle 64 is inserted into the hole 4802 of the other first swing diaphragm blade 48 so as to overlap the other first swing diaphragm blade 48 of the pair of first swing diaphragm blades 48 with the other straight-moving diaphragm blade 46. In addition, the other first swing diaphragm blade driving pin 54E is inserted into the cam groove 4804 of the other first swing diaphragm blade 48.

Subsequently, the other second swing diaphragm blade spindle 66 is inserted into the hole 5002 of the other second swing diaphragm blade 50 so as to overlap the other second swing diaphragm blade 50 of the pair of second swing diaphragm blades 50 with the other straight-moving diaphragm blade 46 and the other first swing diaphragm blade 48. In addition, the other second swing diaphragm blade driving pin 54F is inserted into the cam groove 5004 of the other second swing diaphragm blade 50.

Figure 31:
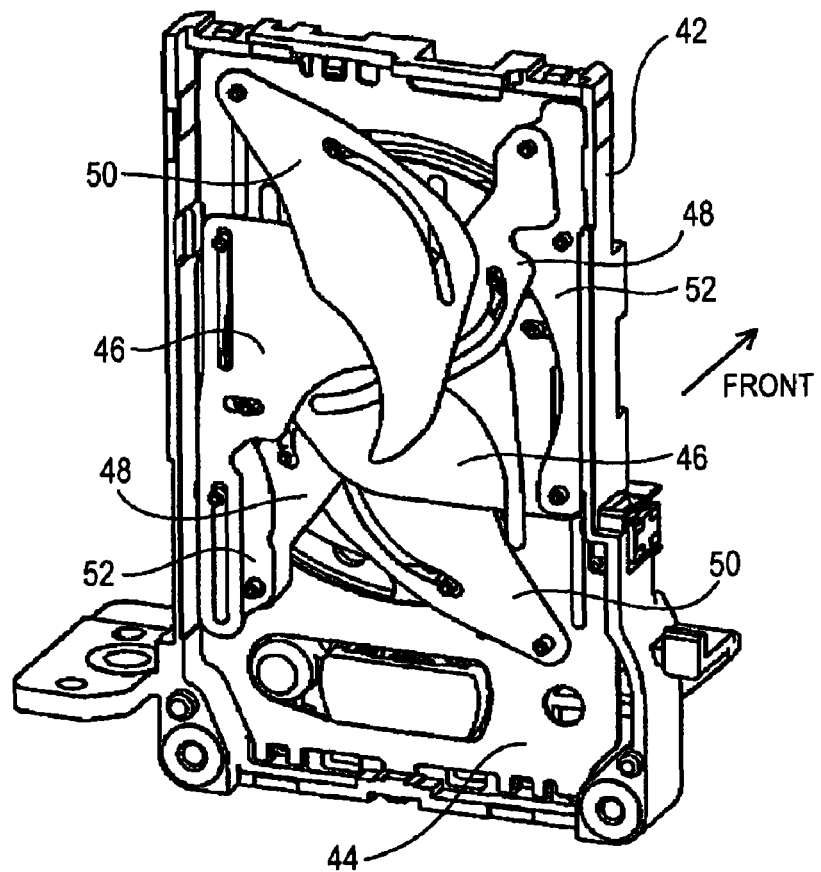
FIG. 31 is a perspective view of the diaphragm unit from which a diaphragm cover member is detached as viewed from the rear side.

In this way, as shown in FIG. 31, the pair of swing diaphragm blades 46, the pair of first straight-moving diaphragm blades 48, the pair of second straight-moving diaphragm blades 50, and two spacers 52 are arranged around the hole 42C. The partition plate 44, the fixed diaphragm 70, and the annular plate 54 are interposed among the blades 46, 48, and 50, the spacers 52, and the diaphragm base member 42.

Finally, as shown in FIGS. 4 and 5, the diaphragm cover member 58 is attached to the diaphragm base member 42 from the rear side of the diaphragm base member 42.

That is, the rails 5810, 5812, 5814, 5816, and 5818 of the diaphragm cover member 58 are made to face the front side and then the straight-moving diaphragm blade driving pins 54D and the first swing diaphragm blade driving pins 54E are inserted into the third insertion portions 5802. In addition, the second swing diaphragm blade driving pins 54F are inserted into the fourth insertion portions 5804.

In addition, the first swing diaphragm blade spindle and the second swing diaphragm blade spindle 66 are inserted into the insertion holes 5822 and 5824.

The engagement claws 5826 are made to engage with the diaphragm base member 42.

Accordingly, the annular plate 54, the fixed diaphragm 70, the partition plate 44, the pair of straight-moving diaphragm blade 46, the pair of first swing diaphragm blades 48, and the pair of second swing diaphragm blades 50, and two spacers 52, which are received in the receiving section 60 and are attached to the diaphragm base member 42, are covered with the diaphragm cover member 58.

Figure 35:
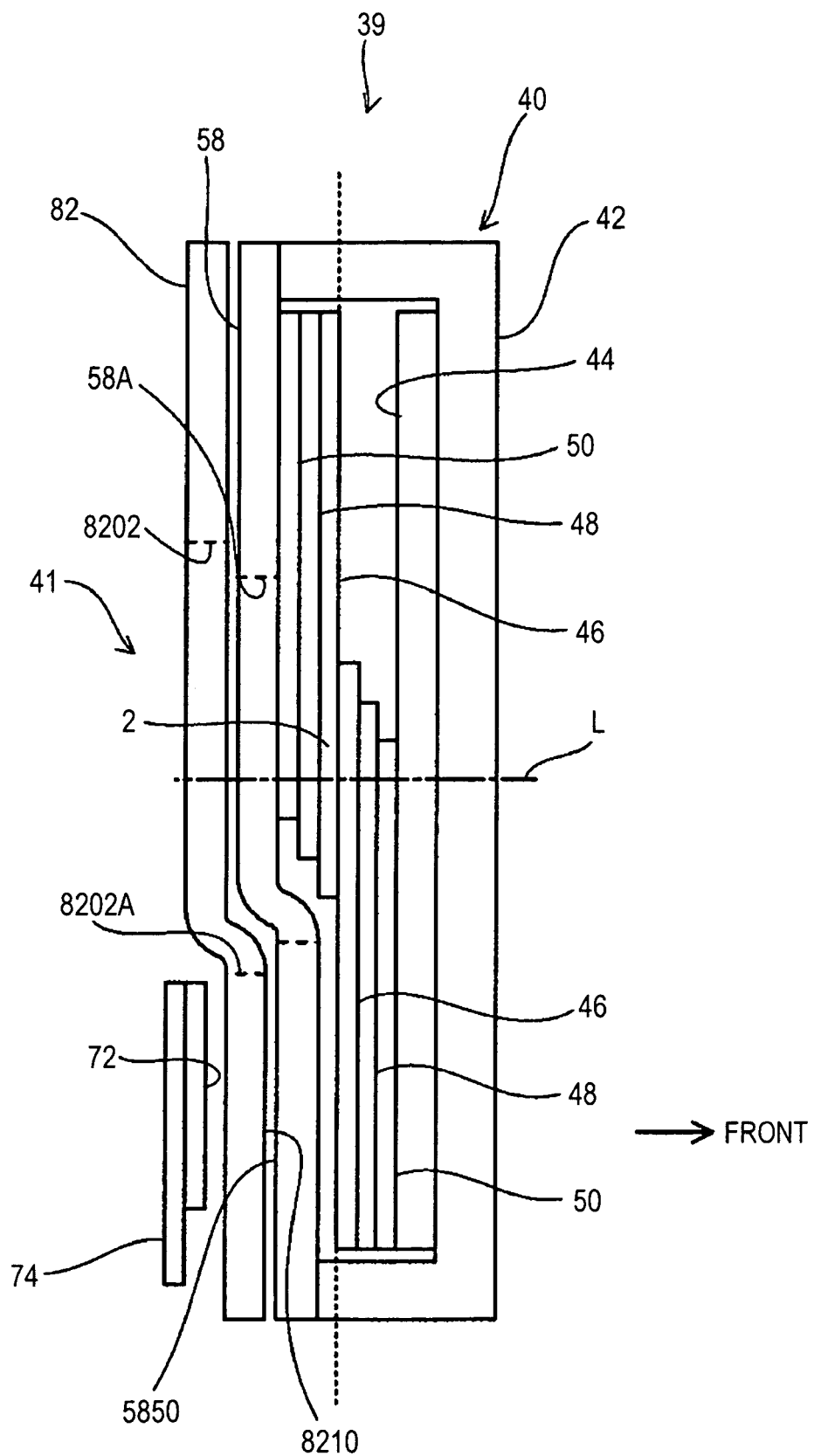
FIG. 35 is a sectional view taken along line AA of FIG. 34 where a retreating position of the ND filter is shown.

As shown in FIGS. 32 and 35, the concave portion 5850 of the diaphragm cover member 58 is disposed lower than the optical axis L.

Therefore, one second swing diaphragm blade 50, one first swing diaphragm blade 48, one straight-moving diaphragm blade 46, the other straight-moving diaphragm blade 46, the other first swing diaphragm blade 48, and the other second swing diaphragm blade 50 overlap with each other in this order on the partition plate 44.

In addition, one spacer 52 is interposed between one straight-moving diaphragm blade 46 and the other first swing diaphragm blade 48, and the other spacer 52 is interposed between one first swing diaphragm blade 48 and the other straight-moving diaphragm blade 46.

One set of swing diaphragm blades 46 and 48 out of two sets of pairs of swing diaphragm blades 46 and 48 are disposed close to the front surface which is one surface of both surfaces where the pair of straight-moving diaphragm blades 46 faces the optical axis direction.

The other set of swing diaphragm blades 46 and 48 out of two sets of pairs of swing diaphragm blades 46 and 48 are disposed close to the rear surface which is the other surface of both surfaces where the pair of straight-moving diaphragm blades 46 faces the optical axis direction.

The pair of straight-moving diaphragm blades 46 is disposed at the opposed positions of the diaphragm opening 2 so as to linearly move in the directions in which they get close to and apart from the optical axis L along the plane perpendicular to the optical axis L.

The pair of first swing diaphragm blades 48 is disposed at the opposed positions of the diaphragm opening 2 so as to swing in the directions in which they get close to and apart from the optical axis L about the axis parallel to the optical axis L.

The pair of second swing diaphragm blades 50 is disposed at the opposed positions of the diaphragm opening 2 so as to swing in the directions in which they get close to and apart from the optical axis L about the axis parallel to the optical axis L.

The diaphragm driving mechanism, which adjusts the size of the diaphragm opening 2 by allowing the straight-moving diaphragm blades 46 to linearly move and allowing the first and second swing diaphragm blades 48 and 50 to swing, includes the diaphragm motor 56, the driving gear 56C, the gear portion 55, and the annular plate 54.

As shown in FIGS. 12 to 15, the edges of the diaphragm opening 2 in the direction where the straight-moving diaphragm blades 46 move linearly is formed by the opening forming edge portions 44A of the straight-moving diaphragm blades 46.

The edges of the diaphragm opening 2 in the direction perpendicular to the direction in which the straight-moving diaphragm blades 46 linearly move are formed by the opening forming edge portions 48A of the first swing diaphragm blades 48 and the opening forming edge portions 50A of the second swing diaphragm blades 50.

As shown in FIGS. 12 to 15, the first swing diaphragm blade spindle 64 (the swing point of the pair of first swing diaphragm blades 48) is located in the extending range of the moving locus of the pair of straight-moving diaphragm blades 46 as viewed in the optical axis direction.

As shown in FIGS. 12 to 15, the second swing diaphragm blade spindle 66 (the swing point of the pair of second swing diaphragm blades 50) is located in the extending range of the moving locus of the pair of straight-moving diaphragm blades 46 as viewed in the optical axis direction.

As shown in FIGS. 12 to 15, the driving mechanism is located in the extending range of the moving locus of the pair of straight-moving diaphragm blades 46 as viewed in the optical axis direction.

The operation of the diaphragm unit 40 will be described now.

As shown in FIG. 12, the case where the diaphragm opening 2 is open will be first described.

The straight-moving diaphragm blade guide pin 62 is located at one end in the longitudinal direction of the linear guide groove 4602 of the straight-moving diaphragm blade 46.

The first swing diaphragm blade driving pin 54E is located at one end in the longitudinal direction of the cam groove 4804 of the first swing diaphragm blade 48 and the second swing diaphragm blade driving pin 54F is located at one end in the longitudinal direction of the cam groove 5004 of the second swing diaphragm blade 50.

In this state, the diaphragm opening 2 is formed in a substantially circular shape by the opening forming edge portions 46A of the pair of straight-moving diaphragm blades 46, the opening forming edge portions 48A of the pair of first swing diaphragm blades 48, and the opening forming edge portions 50A of the pair of second swing diaphragm blades 50.

In this embodiment, the diameter of the diaphragm opening 2 and the diameter of the hole 70A of the fixed diaphragm 70 are equal to each other in the open state.

Here, when the annular plate 54 rotates by a predetermined amount by forwardly rotationally driving the diaphragm motor 56, the straight-moving diaphragm blade driving pins 54D engaging with the cam grooves 4404 of the pair of straight-moving diaphragm blades 46 swing.

Accordingly, the straight-moving diaphragm blades 46 linearly move by a predetermined amount via the guide grooves 4402 and the straight-moving diaphragm blade guide pins 62 engaging with the guide grooves 4402.

As a result, as shown in FIG. 13, the gap between the facing opening forming edge portions 46A of the pair of straight-moving diaphragm blades 46, that is, the diameter of the diaphragm opening 2, is reduced.

When the annular plate 54 rotates by a predetermined amount, the pair of first swing diaphragm blades 48 swings about the first swing diaphragm blade spindle 64 by a predetermined amount via the cam grooves 4604 by the swing of the first swing diaphragm blade driving pins 54E.

Accordingly, as shown in FIG. 13, the gap between the facing opening forming edge portions 48A of the pair of first swing diaphragm blades 48, that is, the diameter of the diaphragm opening 2, is reduced.

When the annular plate 54 rotates by a predetermined amount, the pair of second swing diaphragm blades 50 swings about the second swing diaphragm blade spindle 66 by a predetermined amount via the cam grooves 4804 by the swing of the second swing diaphragm blade driving pins 54F.

Accordingly, as shown in FIG. 13, the gap between the facing opening forming edge portions 50A of the pair of second swing diaphragm blades 50, that is, the diameter of the diaphragm opening 2, is reduced.

At this time, three gaps of the gap between the opening forming edge portions 46A of the pair of straight-moving diaphragm blades 46, the gap between the opening forming edge portions 48A of the pair of first swing diaphragm blades 48, and the gap between the opening forming edge portions 50A of the pair of second swing diaphragm blades 50 have substantially the same size.

In other words, the diameter of diaphragm opening 2 formed by the pair of straight-moving diaphragm blades 46, the diameter of diaphragm opening 2 formed by the pair of first swing diaphragm blades 48, and the diameter of diaphragm opening 2 formed by the pair of second swing diaphragm blades 50 are equal to each other.

As a result, the diaphragm opening 2 formed by the opening forming edge portions 46A of the pair of straight-moving diaphragm blades 46, the opening forming edge portions 48A of the pair of first swing diaphragm blades 48, and the opening forming edge portions 50A of the pair of second swing diaphragm blades 50 is reduced in size.

In FIG. 13, the diaphragm opening 2 is narrowed by one step and the shape of the diaphragm opening 2 becomes a substantially regular hexagonal shape by the opening forming edge portions 46A, 48A, and 50A.

In the course where the diaphragm opening 2 is changed from the open state shown in FIG. 12 to the state narrowed by one step in FIG. 13, the shape of the diaphragm opening 2 is continuously changed from the substantially circular shape to the substantially regular hexagonal shape.

When the diaphragm motor 56 is additionally rotationally driven forward from the state shown in FIG. 13 and the annular plate 54 further rotates, the pair of straight-moving diaphragm blades 46 linearly moves in the above-mentioned operating way. In addition, the pair of first swing diaphragm blades 48 and the pair of second swing diaphragm blades 50 swing.

Accordingly, as shown in FIG. 14, the diaphragm opening 2 formed by the opening forming edge portions 46A of the pair of straight-moving diaphragm blades 46, the opening forming edge portions 48A of the pair of first swing diaphragm blades 48, and the opening forming edge portions 50A of the pair of second swing diaphragm blades 50 is further reduced in size.

In FIG. 14, the diaphragm opening 2 is narrowed by six steps and the shape of the diaphragm opening 2 is changed to a substantially regular hexagonal shape by the opening forming edge portions 46A, 48A, and 50A.

When the diaphragm motor 56 is additionally rotationally driven forward from the state shown in FIG. 14 and the annular plate 54 further rotates, the pair of straight-moving diaphragm blades 46 linearly moves in the above-mentioned operating way. In addition, the first swing diaphragm blades 48 and the second swing diaphragm blades 50 swing.

Accordingly, the diaphragm opening 2 formed by the opening forming edge portions 46A of the pair of straight-moving diaphragm blades 46, the opening forming edge portions 48A of the pair of first swing diaphragm blades 48, and the opening forming edge portions 50A of the pair of second swing diaphragm blades 50 is further reduced in size. Finally, as shown in FIG. 15, the diaphragm opening 2 is completely closed.

In the closed state, the straight-moving diaphragm blade guide pins 62 are located at the outer ends in the longitudinal direction of the guide grooves 4402 of the pair of straight-moving diaphragm blades 46.

The first swing diaphragm blade driving pins 54E are located at the outer ends in the longitudinal direction of the cam grooves 4604 of the pair of first swing diaphragm blades 48, and the second swing diaphragm blade driving pins 54F are located at the outer ends in the longitudinal direction of the cam grooves 4804 of the pair of second swing diaphragm blades 50.

When the diaphragm motor 56 is rotationally driven backward from the closed state shown in FIG. 15 and the annular plate 54 rotates in the reverse direction of the above-mentioned direction, the pair of straight-moving diaphragm blades 46 linearly moves in the reverse direction to the above-mentioned direction and the pair of first swing diaphragm blades 48 and the pair of second swing diaphragm blades 50 swing in the reverse direction of the above-mentioned direction.

Accordingly, the diaphragm opening 2 is formed by the opening forming edge portions 46A of the pair of straight-moving diaphragm blades 46, the opening forming edge portions 48A of the pair of first swing diaphragm blades 48, and the opening forming edge portions 50A of the pair of second swing diaphragm blades 50.

Then, as shown in FIGS. 14 and 13, the diaphragm opening 2 is formed and the diaphragm opening 2 is gradually enlarged by the rotational driving of the diaphragm motor 56 in the reverse direction, and the diaphragm opening 2 is finally completely opened as shown in FIG. 12.

In the course where the diaphragm opening 2 is changed from the state where it is narrowed by one step in FIG. 13 to the state where it is completely opened in FIG. 12, the shape of the diaphragm opening 2 is continuously changed from the substantially regular hexagonal shape to the substantially circular shape.

Therefore, by controlling the rotation direction and the rotation amount of the diaphragm motor 56, the diaphragm opening 2 of the diaphragm unit 40 is adjusted between the open state and the closed state.

The function of the spacers 52 will be described now.

Figure 25:
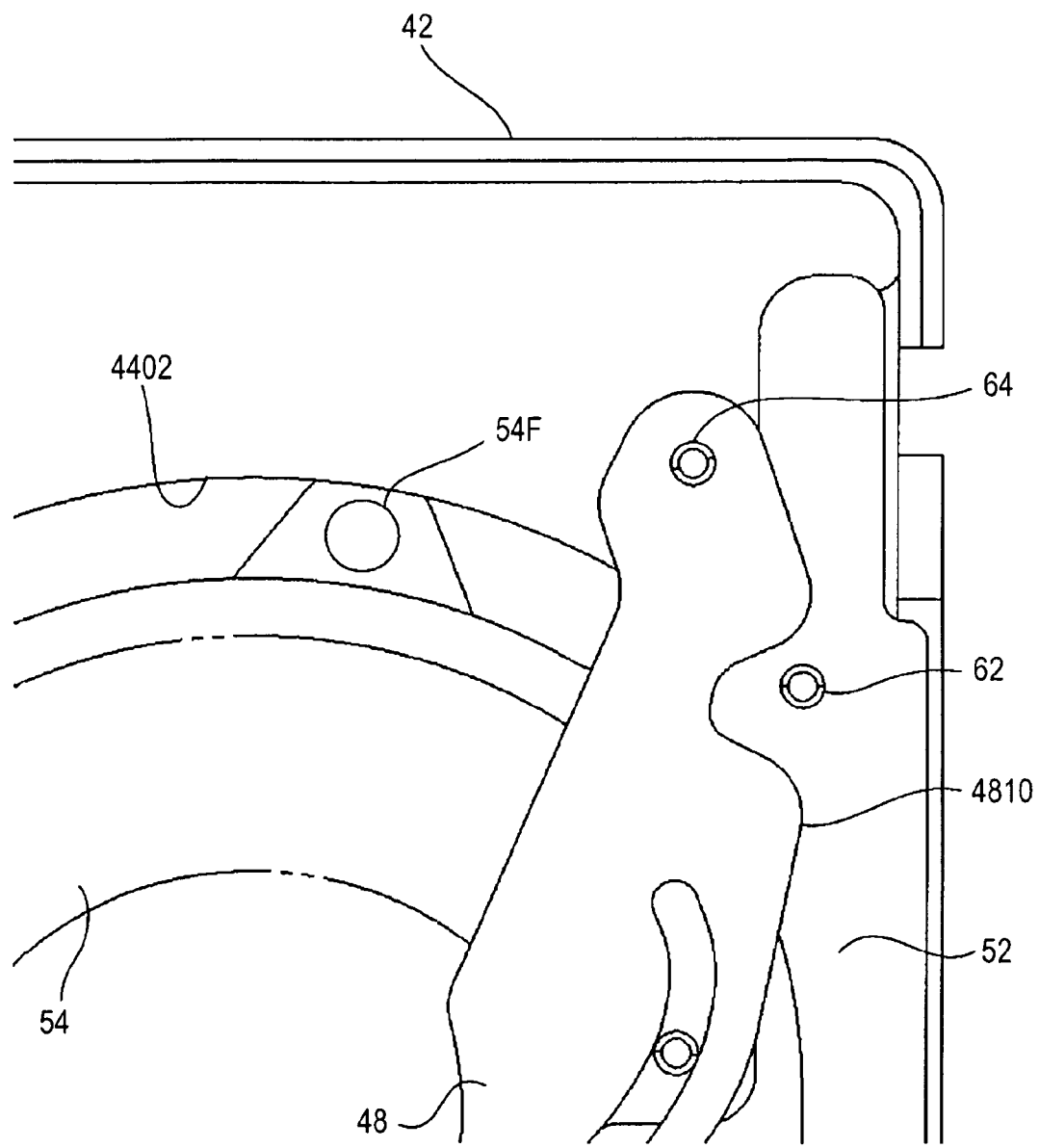
FIG. 25 is an enlarged view illustrating the vicinity of the spacer.
Figure 26:
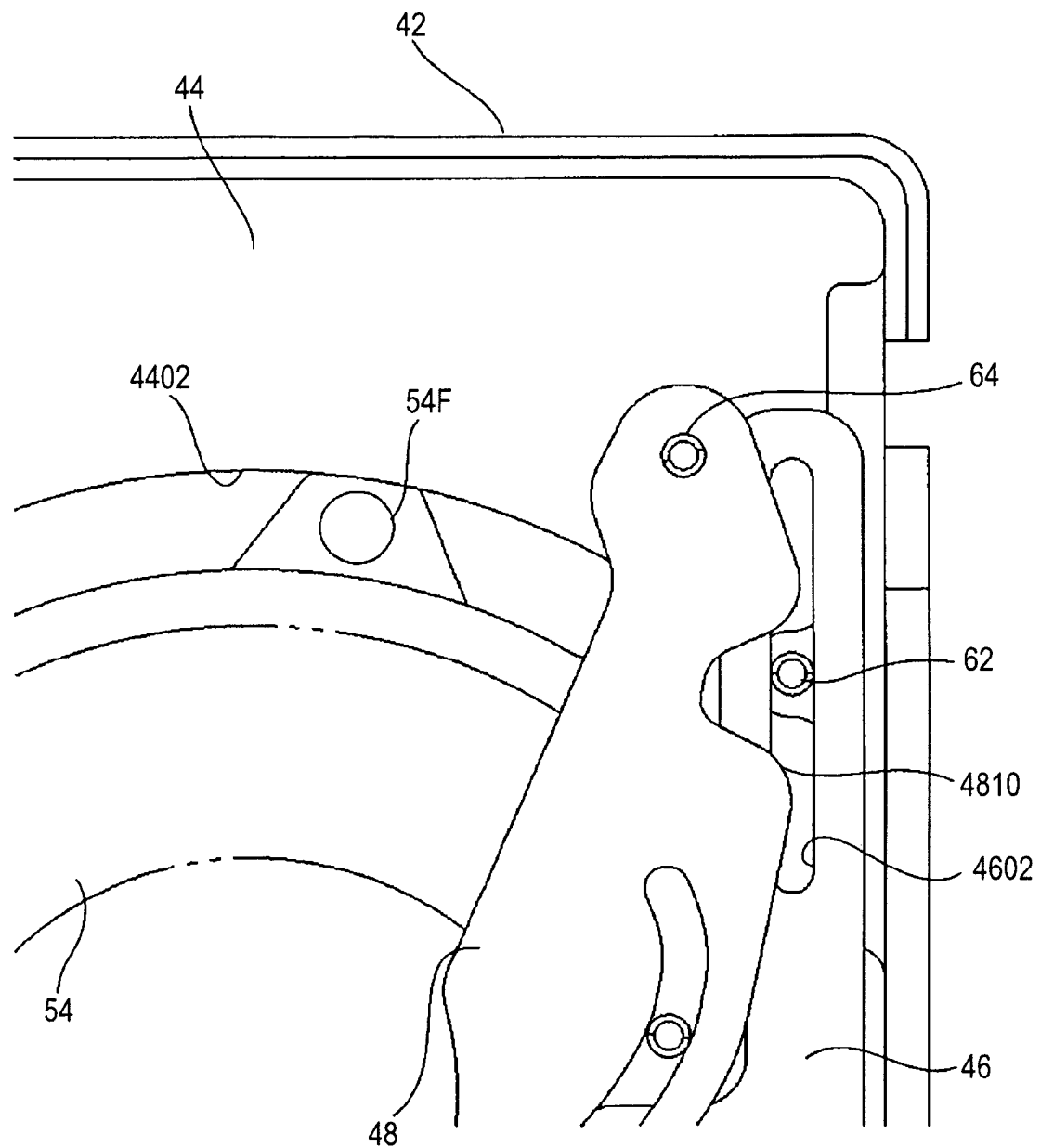
FIG. 26 is an enlarged view where the spacer is removed from FIG. 25.

FIG. 25 is an enlarged view illustrating the vicinity of the spacer 52. FIG. 26 is an enlarged view where the spacer 52 is removed from FIG. 25.

The spacers 52 serve to smooth the swing of a pair of first swing diaphragm blades 48.

That is, as shown in FIG. 26, the edge 4810 of the other first swing diaphragm blade 48 out of two first swing diaphragm blades 48 is located in the linear guide groove 4602 of one straight-moving diaphragm blade 46 out of two straight-moving diaphragm blades 46.

Accordingly, when the edge 4810 swings in the direction getting close to the linear guide groove 4602, the edge 4810 may interfere with the edge of the linear guide groove 4602, thereby hindering the smooth swing of the first swing diaphragm blade 48.

Therefore, in this embodiment, as shown in FIG. 25, the spacer 52 is interposed between the linear guide groove 4602 of one straight-moving diaphragm blade 46 and the edge 4810 of the other first swing diaphragm blade 48. In other words, the straight-moving diaphragm blade 46 and the first swing diaphragm blade 48 are separated in the thickness direction thereof by the spacer 52.

Accordingly, the interference of the edge 4810 with the edge of the linear guide groove 4602 is prevented, thereby smoothing the swing of the other first swing diaphragm blade 48 out of two first swing diaphragm blades 48.

The other spacer 52 out of two spacers 52 is interposed between the linear guide groove 4602 of the other straight-moving diaphragm blade 46 out of two straight-moving diaphragm blades 46 and the edge 4810 of one first swing diaphragm blade 48 out of two first swing diaphragm blades 48.

Accordingly, as described above, the swing of one first swing diaphragm blade 48 out of two first swing diaphragm blades 48 is smoothed.

Figure 16:
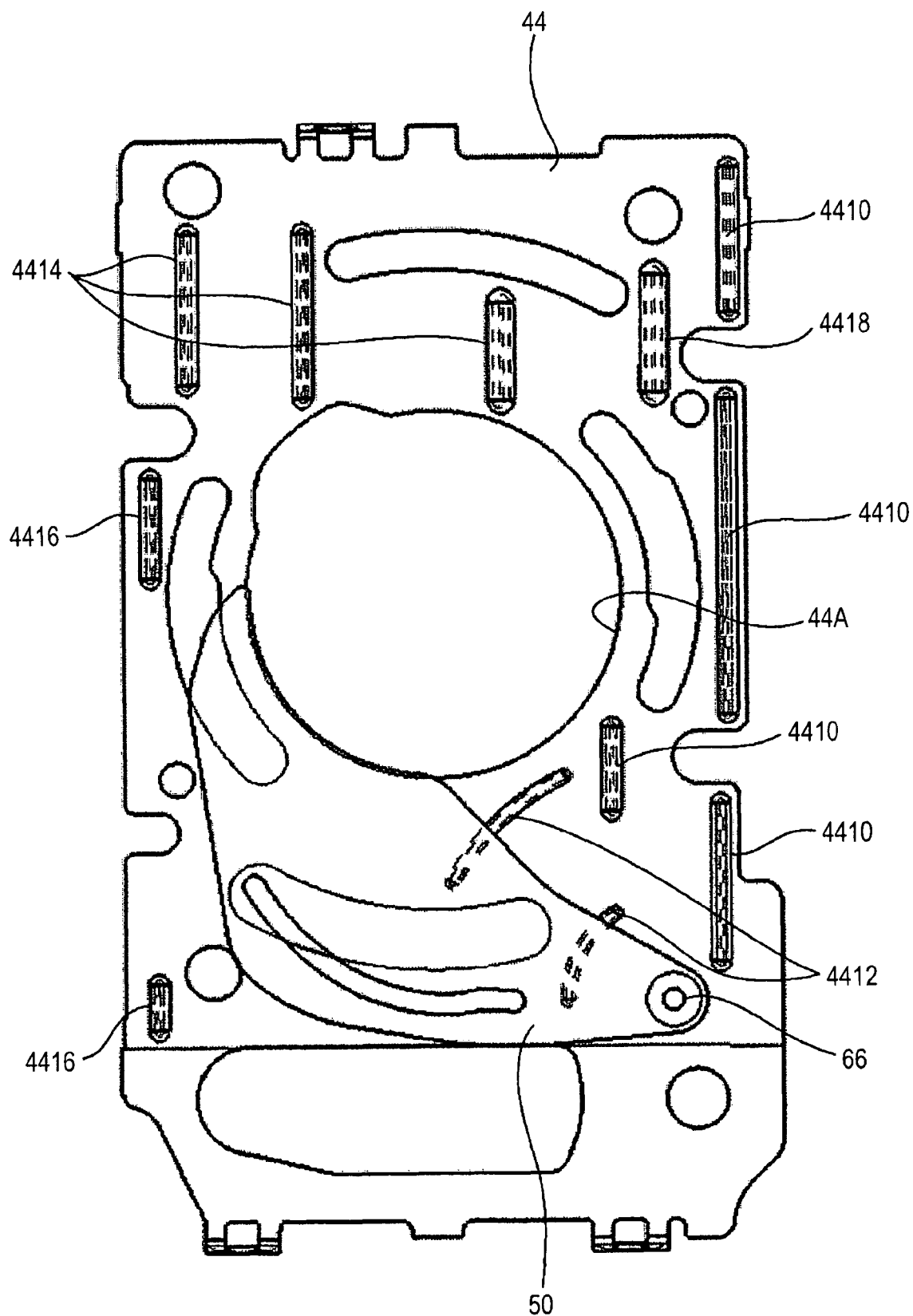
FIG. 16 is a plan view illustrating the position of one second swing diaphragm blade when the diaphragm opening is open.

FIG. 16 is a plan view illustrating the position of one second swing diaphragm blade 50 when the diaphragm opening 2 is open.

Figure 17:
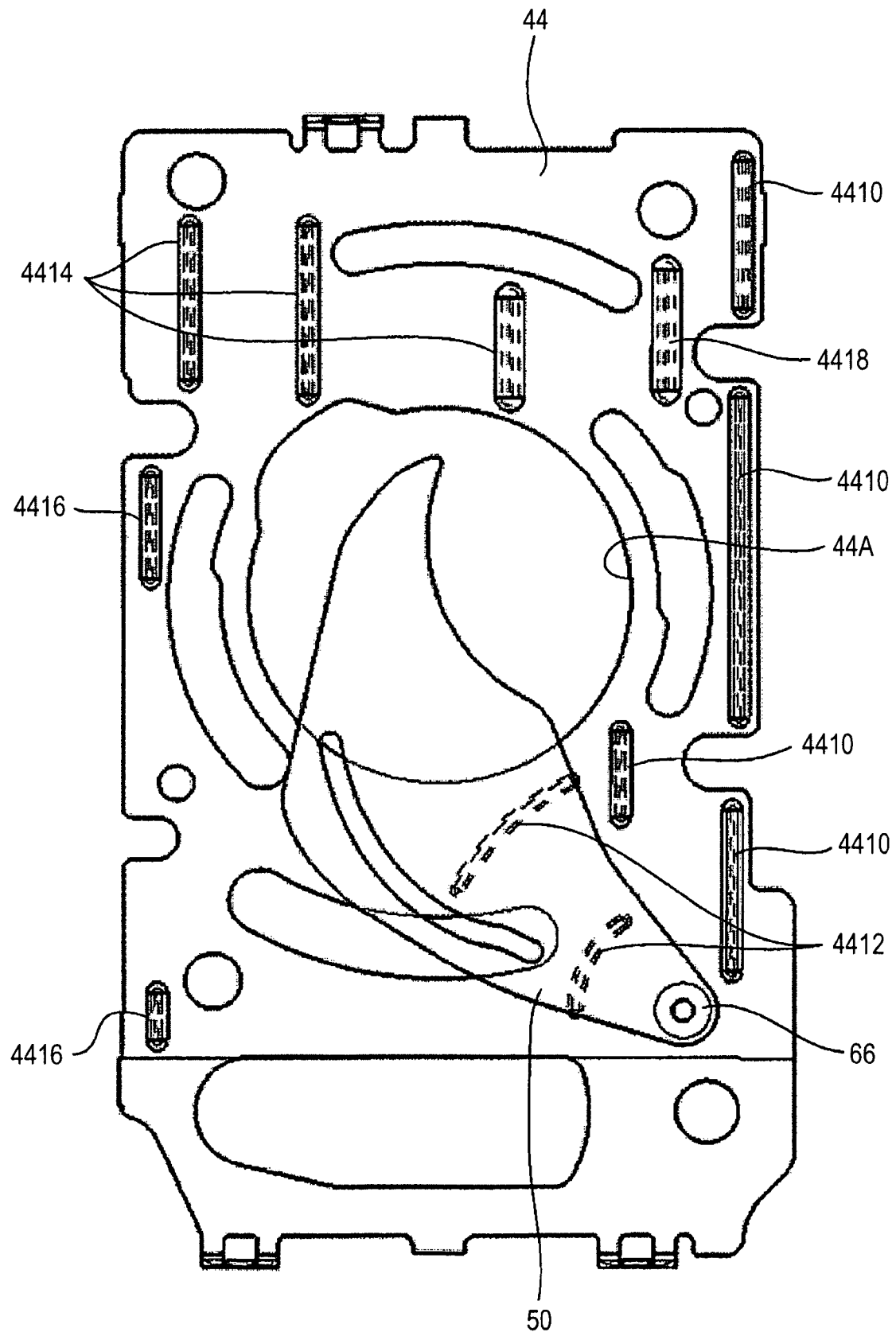
FIG. 17 is a plan view illustrating the position of one second swing diaphragm blade when the diaphragm opening is completely closed.

FIG. 17 is a plan view illustrating the position of one second swing diaphragm blade 50 when the diaphragm opening 2 is completely closed.

Figure 18:
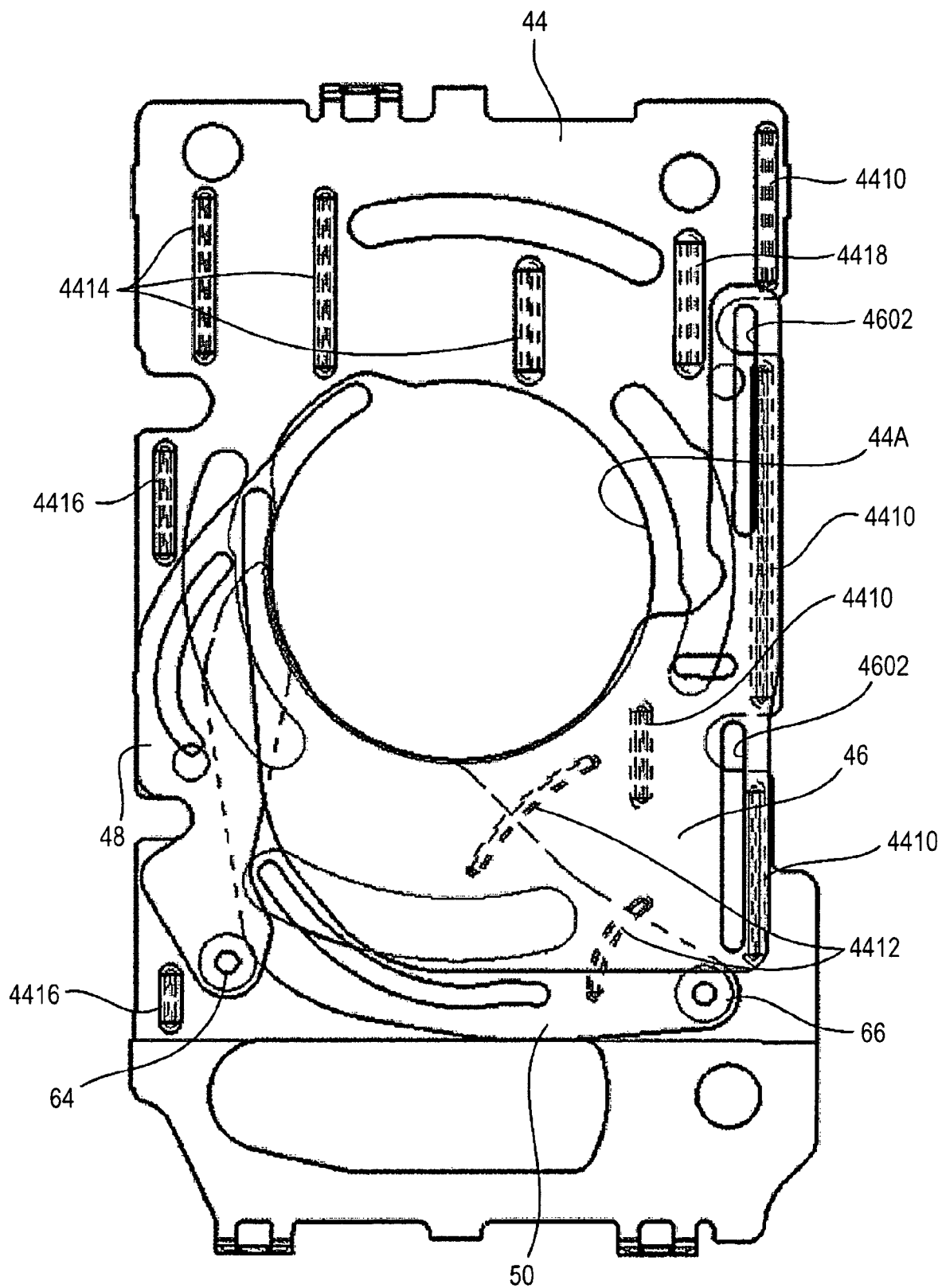
FIG. 18 is a plan view illustrating the positions of one straight-moving diaphragm blade, one first swing diaphragm blade, and one second swing diaphragm blade when the diaphragm opening is open.

FIG. 18 is a plan view illustrating the positions of one straight-moving diaphragm blade 46, one first swing diaphragm blade 48, and one second swing diaphragm blade 50 when the diaphragm opening 2 is open.

Figure 19:
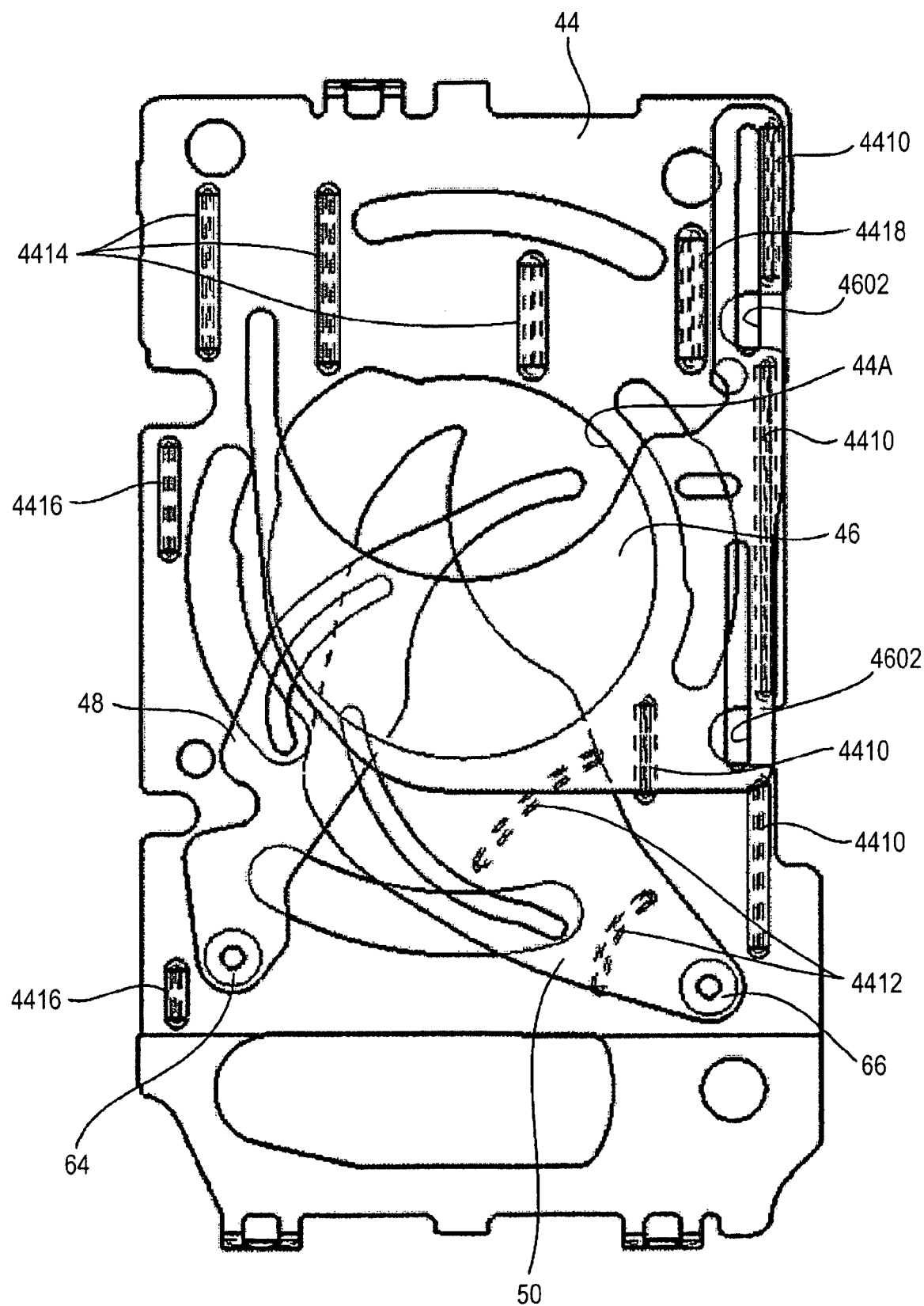
FIG. 19 is a plan view illustrating the positions of one straight-moving diaphragm blade, one first swing diaphragm blade, and one second swing diaphragm blade when the diaphragm opening is completely closed.

FIG. 19 is a plan view illustrating the positions of one straight-moving diaphragm blade 46, one first swing diaphragm blade 48, and one second swing diaphragm blade 50 when the diaphragm opening 2 is completely closed.

Figure 20:
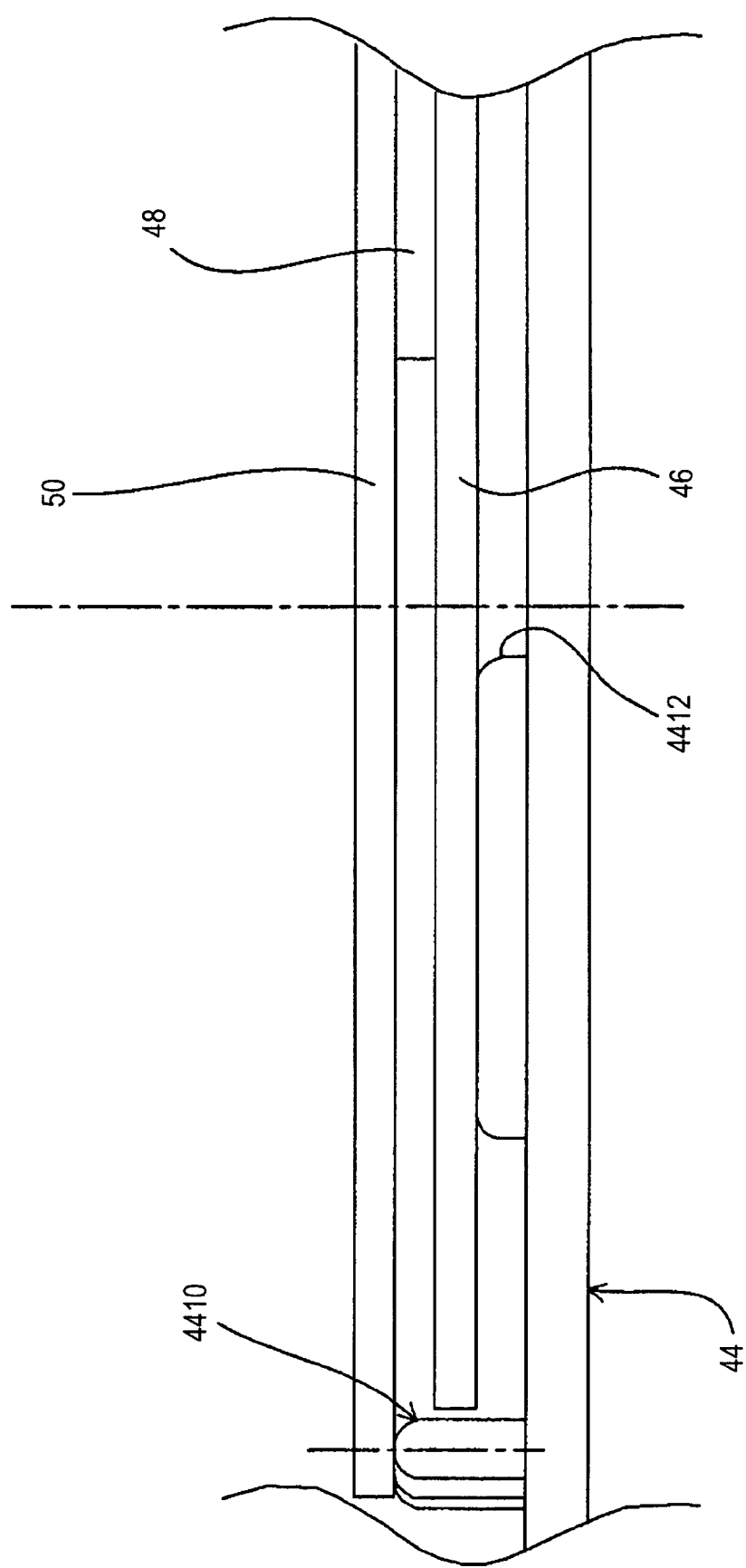
FIG. 20 is a sectional view illustrating the partition plate, one straight-moving diaphragm blade, one first swing diaphragm blade, and one second swing diaphragm blade.

FIG. 20 is a sectional view illustrating the partition plate 44, one straight-moving diaphragm blade 46, one first swing diaphragm blade 48, and one second swing diaphragm blade 50.

The functions of the rails formed in the partition plate 44 will be described in detail now.

As shown in FIG. 20, one second swing diaphragm blade 50 of the pair of second swing diaphragm blades 50, one first swing diaphragm blade 48 of the pair of first swing diaphragm blades 48, and one straight-moving diaphragm blade 46 of the pair of straight-moving diaphragm blades 46 overlap with each other on the partition plate 44 in that order.

As shown in FIGS. 18 and 19, the first rail 4410 guiding one straight-moving diaphragm blade 46 is disposed in the moving locus of one straight-moving diaphragm blade 46 and has a height sufficient to guide one straight-moving diaphragm blade 46.

As shown in FIGS. 16 and 17, the second rail 4412 guiding one second swing diaphragm blade 50 is disposed in the moving locus of one second swing diaphragm blade 50 and has a height sufficient to guide one second swing diaphragm blade 50. The height of the second rail 4412 is different from the height of the first rail 4410.

As shown in FIGS. 16 and 17, the first and second rails 4410 and 4412 are disposed outside the moving locus of the first swing diaphragm blades 48.

As a result, one straight-moving diaphragm blade 46 is smoothly guided by the first rail 4410 without coming in contact with the second rail 4412.

One second swing diaphragm blade 50 is smoothly guided by the second rail 4412 without coming in contact with the first rail 4410.

As shown in FIG. 20, the first swing diaphragm blade 48 swings without coming in contact with the plural rails formed in the partition plate 44 in the state where it is interposed between the straight-moving diaphragm blade 46 and the second swing diaphragm blade 50.

In this embodiment, since one straight-moving diaphragm blade 46 is also guided by the eighth rail 5814 formed in the diaphragm cover member 58 shown in FIG. 11, one straight-moving diaphragm blade 46 can move more smoothly.

As shown in FIG. 11, the functions of the rails formed in the diaphragm cover member 58 are the same as the functions of the rails formed in the partition plate 44.

As shown in FIG. 5, the other straight-moving diaphragm blade 46 of the pair of straight-moving diaphragm blades 46, the other first swing diaphragm blade 48 of the pair of first swing diaphragm blades 48, and the other second swing diaphragm blade 50 of the pair of second swing diaphragm blades 50 overlap with each other on the pair of spacers 52 in that order.

The sixth rail 5810 guiding the other straight-moving diaphragm blade 46 is disposed in the moving locus of the other straight-moving diaphragm blade 46 and has a height sufficient to guide the other straight-moving diaphragm blade 46.

The seventh rail 5812 guiding the other second swing diaphragm blade 50 is disposed in the moving locus of the other second swing diaphragm blade 50 and has a height sufficient to guide the other second swing diaphragm blade 50. The height of the seventh rail 5812 is different from the height of the sixth rail 5810.

The sixth and seventh rails 5810 and 5812 are disposed outside the moving locus of the first swing diaphragm blades 48.

As a result, the other straight-moving diaphragm blade 46 is smoothly guided by the sixth rail 5810 without coming in contact with the seventh rail 5812.

The other second swing diaphragm blade 50 is smoothly guided by the seventh rail 5812 without coming in contact with the sixth rail 5810.

The first swing diaphragm blade 48 swings without coming in contact with the plural rails formed in the partition plate 44 in the state where it is interposed between the straight-moving diaphragm blade 46 and the second swing diaphragm blade 50.

Accordingly, since the other straight-moving diaphragm blade 46 and the other second swing diaphragm blade 50 are smoothly guided by the sixth and seventh rails 5810 and 5812, the movement is stabilized.

Since the other straight-moving diaphragm blade 46, the other first swing diaphragm blade 48, and the other second swing diaphragm blade 50 are separated from the annular plate by the partition plate 44 and do not contact with the annular plate 54, the frictional load is reduced.

In this embodiment, since the other straight-moving diaphragm blade 46 is also guided by the third rail 4414 formed in the partition plate 44 shown in FIG. 10, the other straight-moving diaphragm blade 46 can move more smoothly.

According to this diaphragm unit 40, as shown in FIGS. 32 and 35, since the concave portion 5850 is disposed in the diaphragm cover member 58, it is possible to reduce the size of the lens barrel in the direction of the optical axis L by receiving and arranging another optical device or a part thereof, or an optical member or a part thereof in the concave portion 5850. Therefore, it is advantageous for the decrease in size of the imaging apparatus.

Alternatively, by receiving another optical device or a part thereof in the concave portion 5850, it is possible to reduce the sizes of the devices. Accordingly, it is possible to guarantee the great strokes of the movable lenses such as a zoom lens and a focus lens without an increase in length of the lens barrel.

Accordingly, since it is possible to guarantee the zoom ratio or to guarantee a great focus adjusting range, thereby improving the optical performance of the lens barrel.

Since it is possible to guarantee the great strokes of the movable lenses such as a zoom lens and a focus lens without an increase in length of the lens barrel, an inexpensive lens with a relatively small refractive index and a large thickness can be used as the movable lens, thereby decreasing the cost of the imaging apparatus.

A specific example where a part of the ND filter unit 41 is received in the concave portion 5850 of the diaphragm cover member 58 to reduce the size of the diaphragm unit 40 and the ND filter unit 41 in the direction of the optical axis L will be described now.

Figure 27:
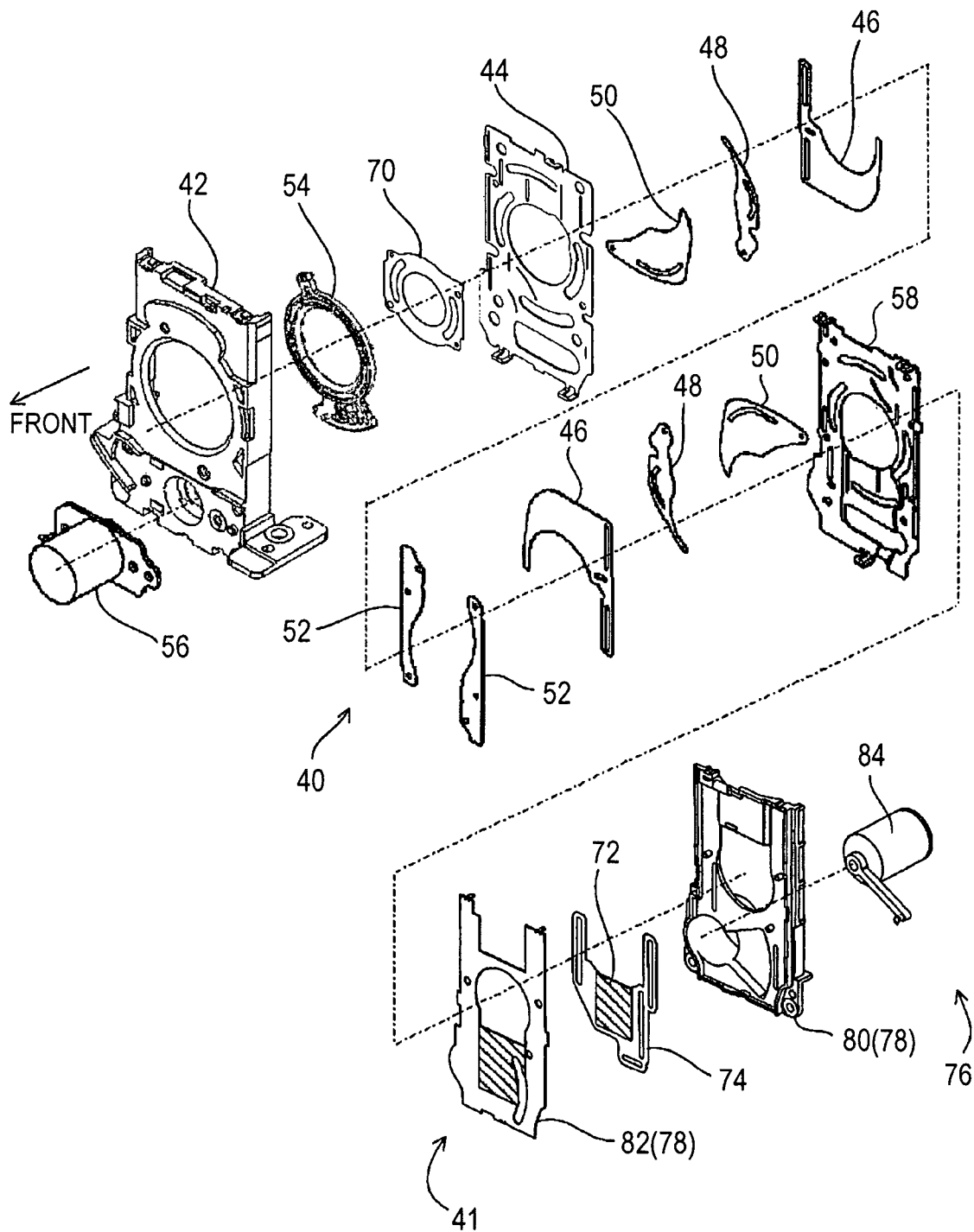
FIG. 27 is an exploded perspective view of a light intensity adjusting device.
Figure 28:
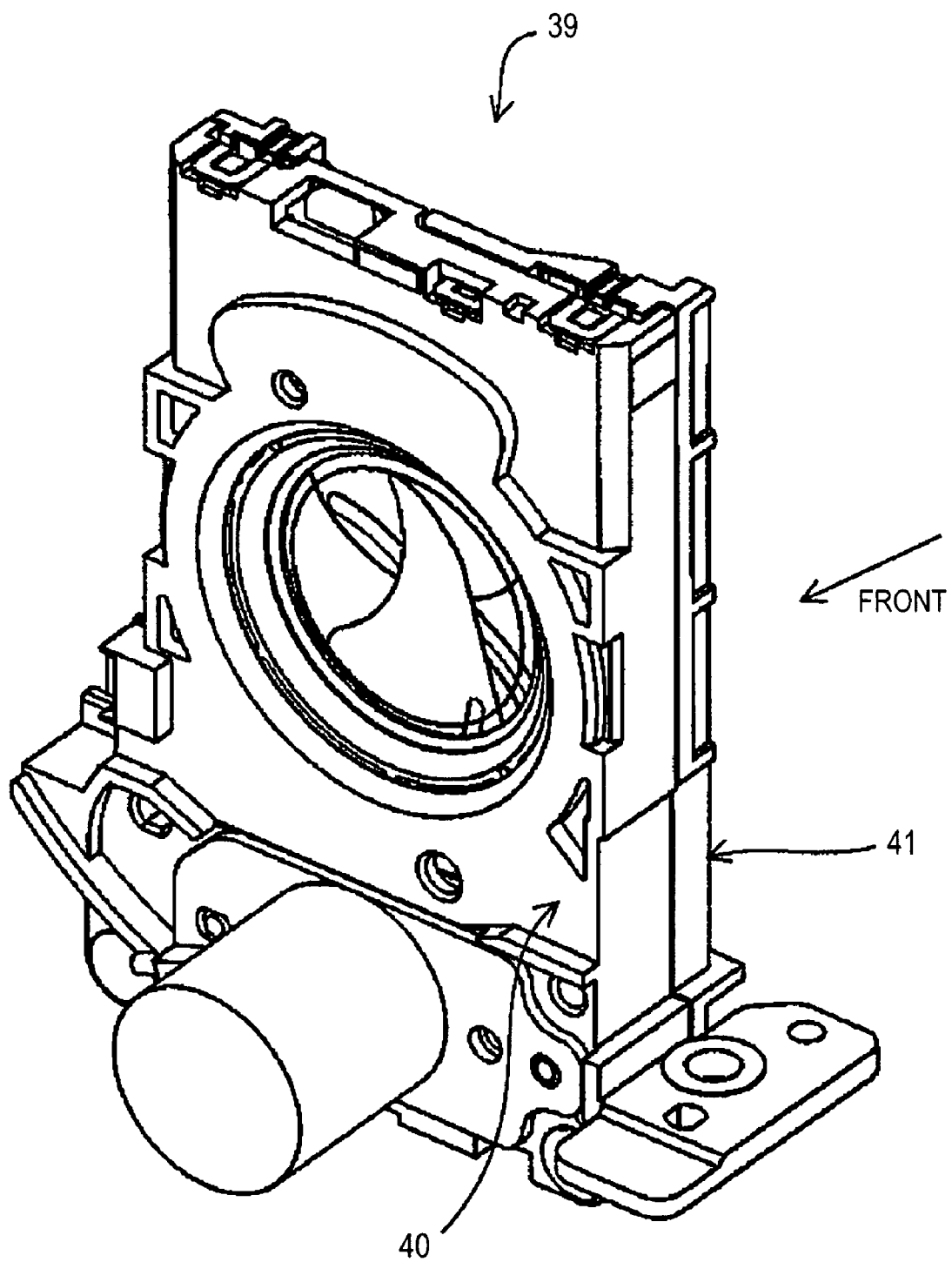
FIG. 28 is a perspective view of the light intensity adjusting device as viewed from the front side.

FIG. 27 is an exploded perspective view of the light intensity adjusting device 39. FIG. 28 is a perspective view of the light intensity adjusting device 39 as viewed from the front side.

Figure 29:
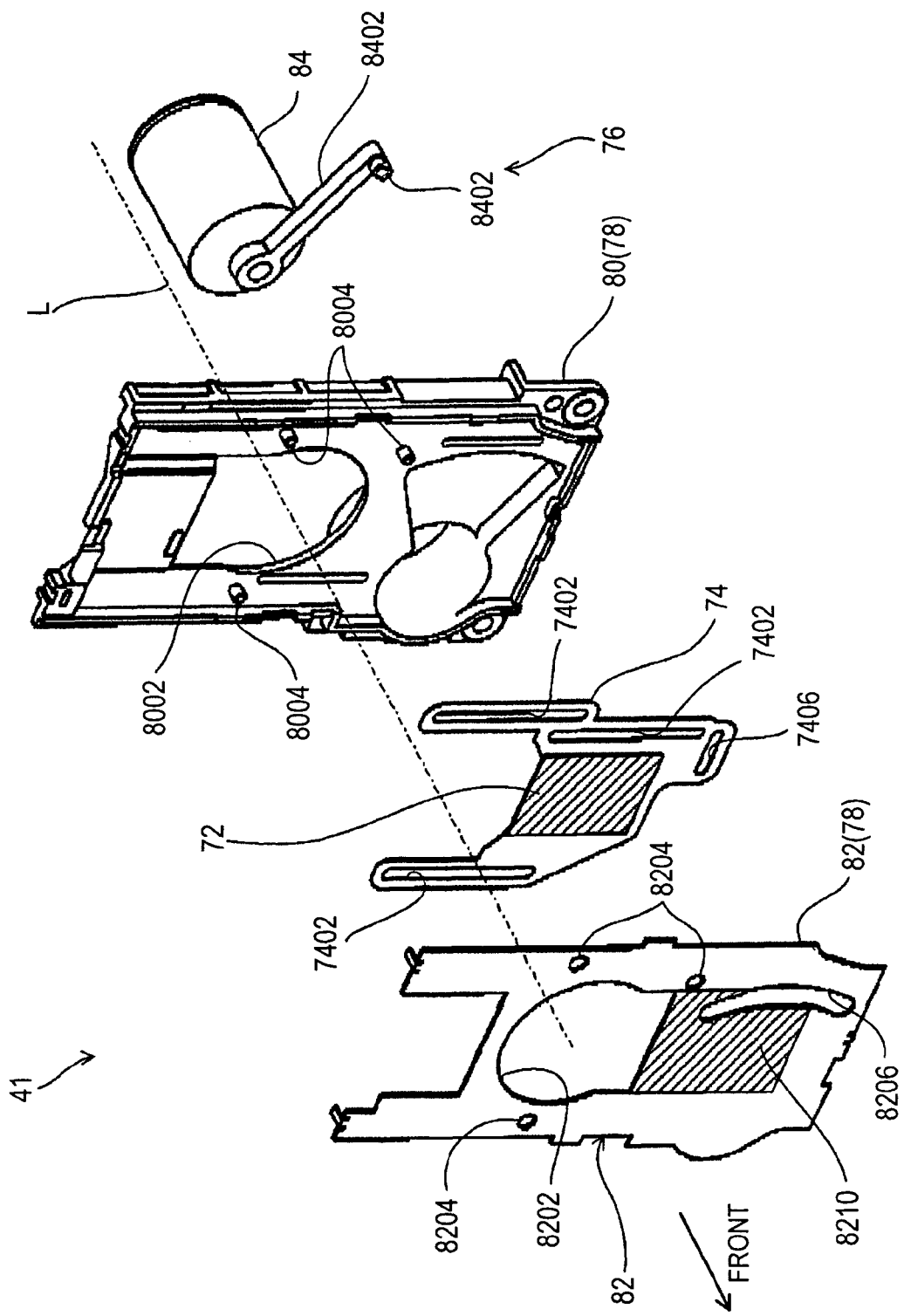
FIG. 29 is an exploded perspective view of an ND filter unit.
Figure 30:
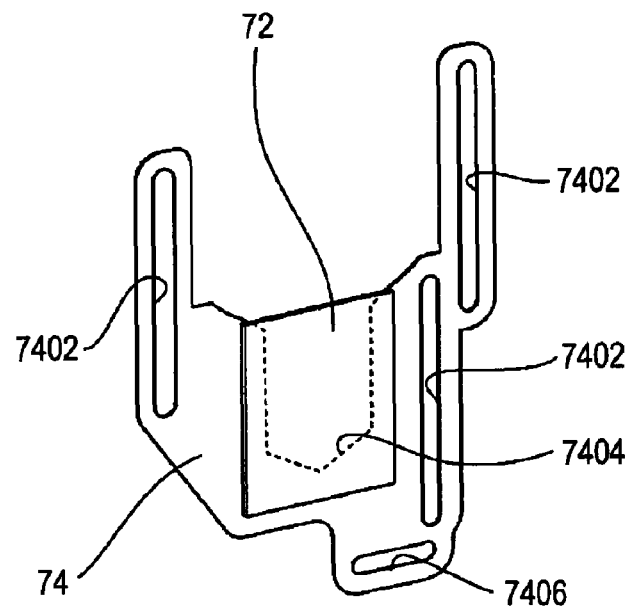
FIG. 30 is a perspective view of a filter support member to which an ND filter is attached.

FIG. 29 is an exploded perspective view of the ND filter unit 41. FIG. 30 is a perspective view of the filter support member 74 to which the ND filter 72 is attached.

FIG. 31 is a perspective view of the diaphragm unit from which the diaphragm cover member 58 is detached as viewed from the rear side. FIG. 32 is a perspective view of the diaphragm unit 40 to which the diaphragm cover member 58 is attached as viewed from the rear side.

Figure 33:
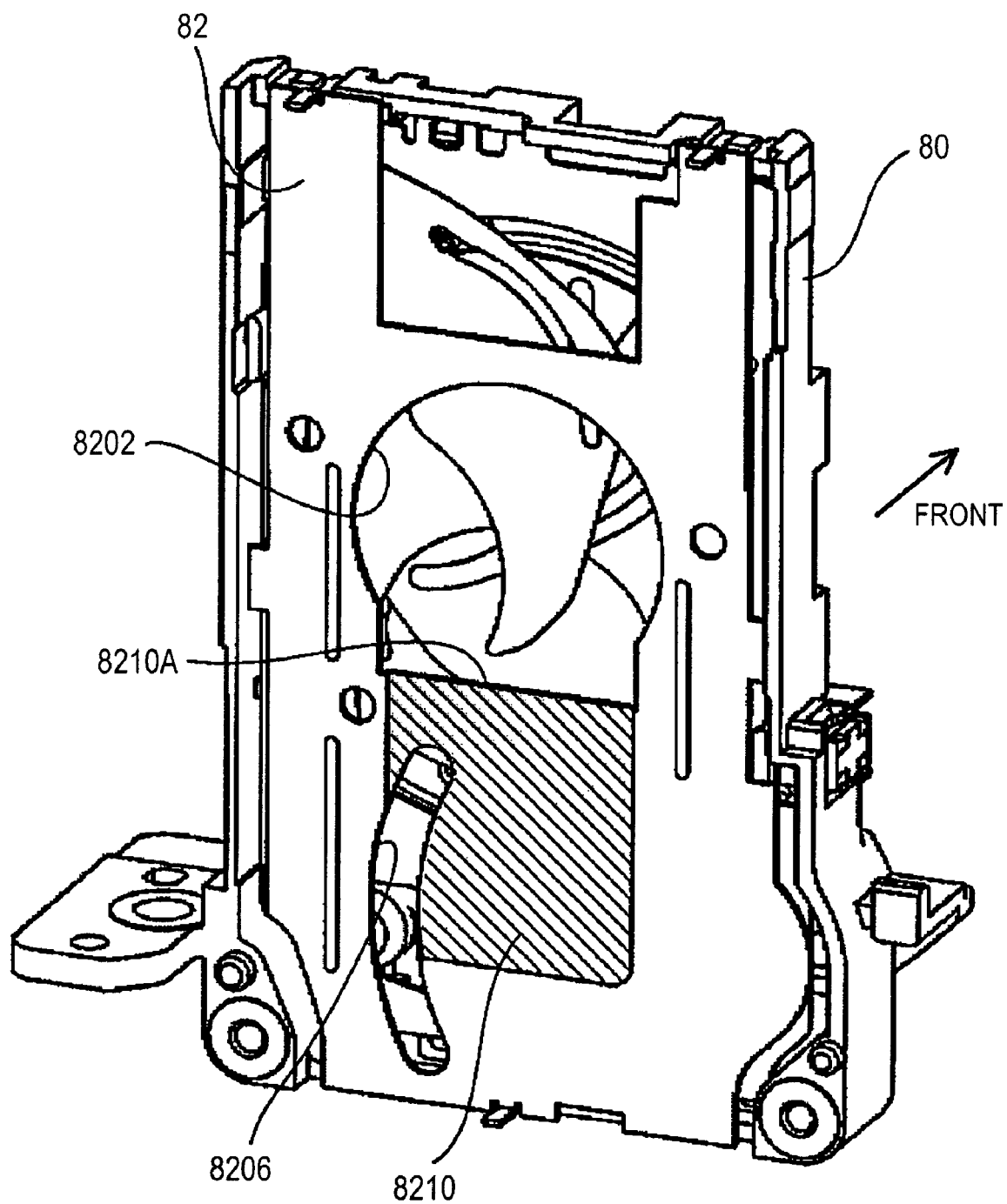
FIG. 33 is a perspective view illustrating a state where a filter cover member is attached to the diaphragm unit.
Figure 34:
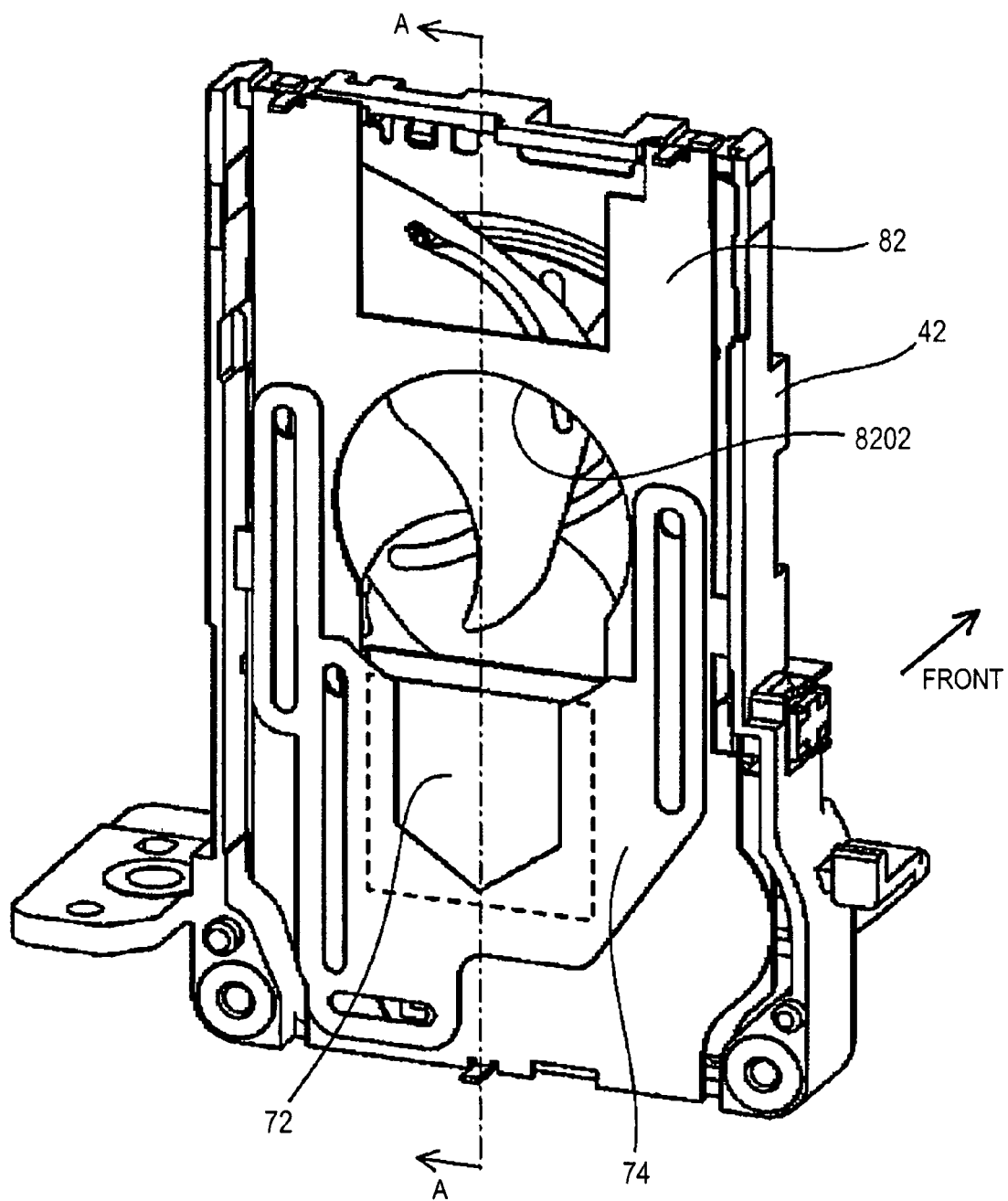
FIG. 34 is a perspective view illustrating a state where the ND filter and the filter support member are attached to the assembly shown in FIG. 33.

FIG. 33 is a perspective view illustrating a state where the filter cover member 82 is attached to the diaphragm unit 40. FIG. 34 is a perspective view illustrating a state where the filter cover member 82 is attached to the filter support member 74 in FIG. 33.

Figure 36:
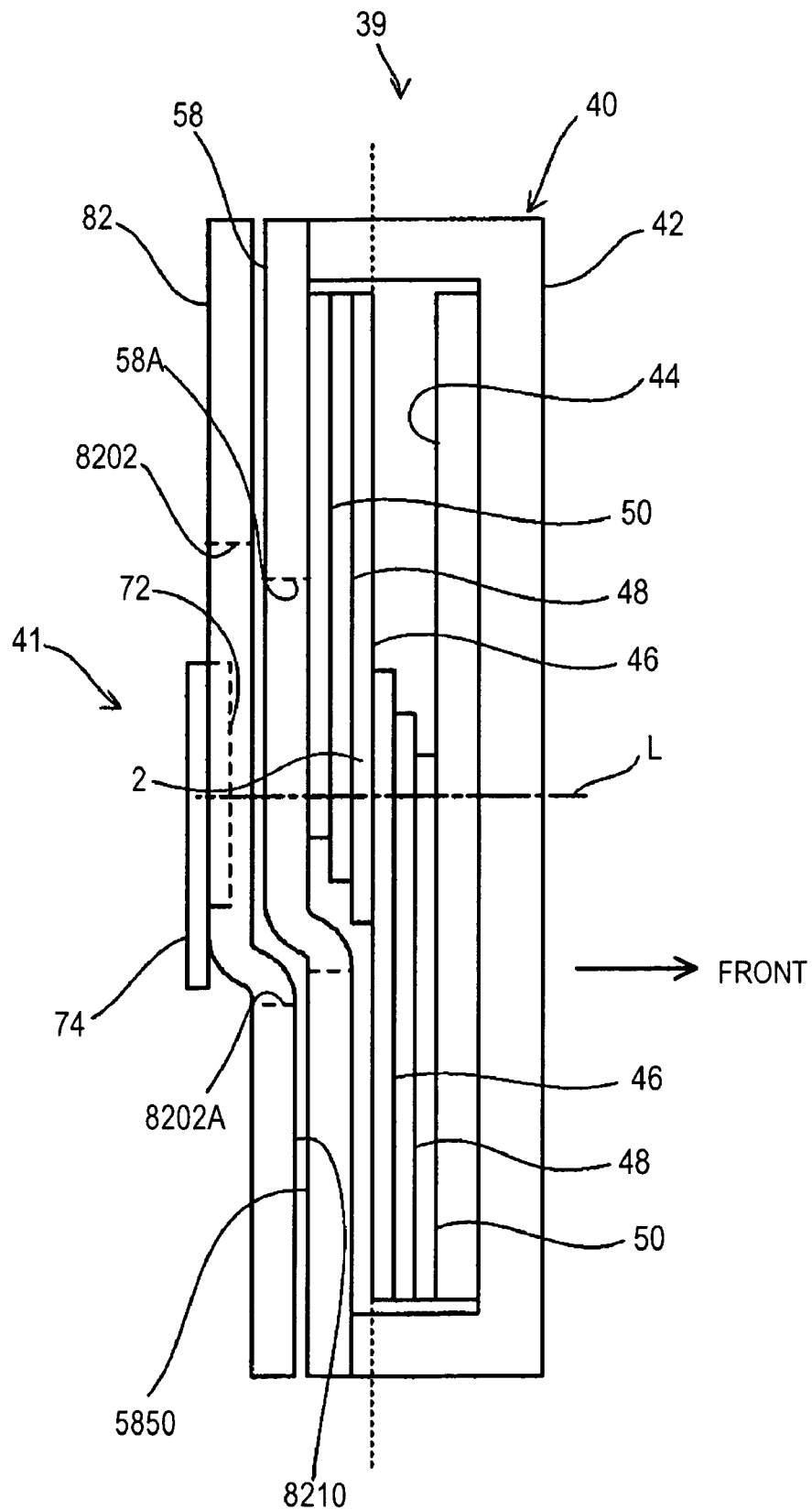
FIG. 36 is a sectional view taken along line AA of FIG. 34 where an in-use position of the ND filter is shown.

FIG. 35 is a sectional view taken along line AA of FIG. 34 where the ND filter 72 is located at the retreating position. FIG. 36 is a sectional view taken along line AA of FIG. 34 where the ND filter 72 is located at the in-use position.

Figure 37:
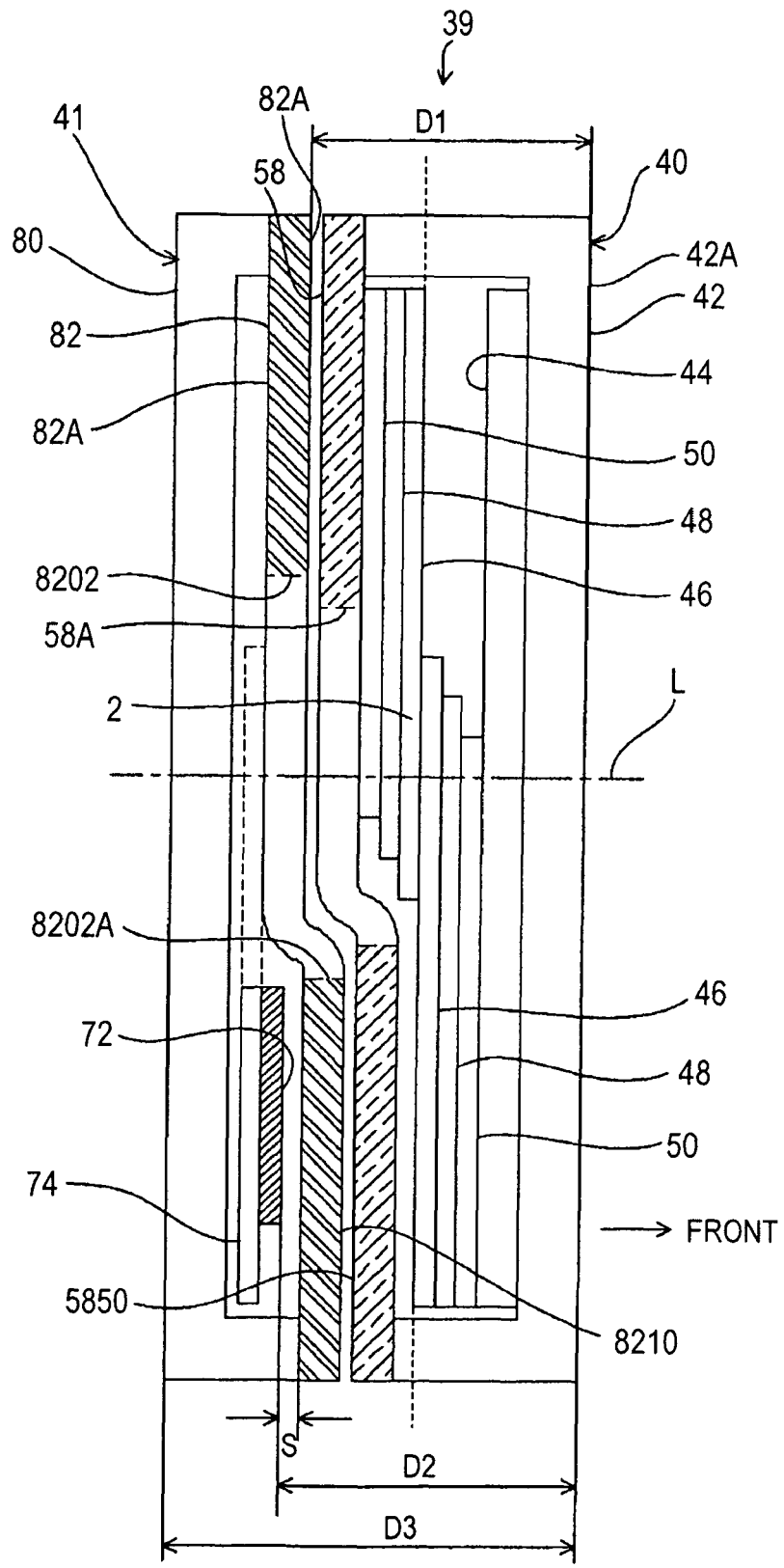
FIG. 37 is a sectional view of the light intensity adjusting device where the retreating position of the ND filter is shown.

FIG. 37 is a sectional view of the light intensity adjusting device 39 where the ND filter 72 is located at the retreating position.

As shown in FIGS. 27 and 29, the ND filter unit 41 includes an ND filter 72, a filter support member 74, a filter driving mechanism 76, and a case 78.

The case 78 includes a filter base member 80 and a filter cover member 82.

As shown in FIGS. 35, 36, and 37, the ND filter unit 41 is disposed to overlap with the diaphragm cover member 58.

The ND filter 72 is a filter for reducing the transmitted light intensity without changing the waveform components of the incident light and as shown in FIGS. 35 and 36, moves between an in-use position inside the diaphragm opening 2 and a retreating position outside the diaphragm opening 2 as viewed in the direction of the optical axis L.

As shown in FIGS. 30 and 34, the filter support member 74 serves to support the ND filter 72.

The filter support member 74 is formed of a flat thin plate of a synthetic resin not transmitting light.

Both sides of the filter support member 74 are provided with a guide portion 7402 formed of a longitudinal groove and guided to be movable in the up-down directions by the filter base member 80 (FIG. 29).

The filter support member 74 includes an optical path forming cutout 7404. The edges of the ND filter 72 are attached to overlap with the edges of the cutout 7404 with an adhesive. Accordingly, the ND filter 72 is disposed in the filter support member 74 to cover the cutout 7404.

A cam groove 7406 for allowing the filter support member 74 to linearly move in the up-down directions is formed in the lower part of the filter support member 74.

Therefore, as shown in FIG. 29, the ND filter 72 protrudes from the filter support member 74 to the filter cover member 82 as viewed in the thickness direction of the filter support member 74.

The filter base member 80 is formed in a plate shape out of a synthetic resin as shown in FIG. 29.

An optical path opening 8002 is formed in the filter base member 80.

A filter motor 84 is attached to a position of the filter base member 80 opposed to the diaphragm unit 40 below the optical path opening 8002.

The filter motor 84 serves to rotationally drive the driving gear 56C forward and backward on the basis of the driving current supplied from the motor driver 43 (see FIG. 3).

The filter motor 84 includes an arm 8402 connected to the output shaft of the filter motor 84 and a pin 8404 at the end of the arm 8402 engages with the cam groove 7406 of the filter support member 74.

With the forward and backward rotation of the filter motor 84, the filter support member 74 is made to move up and down by the arm 8402, thereby allowing the ND filter 72 to protrude into the diaphragm opening 2.

Guide pins 8004, which engage with the longitudinal grooves of the guide portions 7402 of the filter support member 74 and guide the filter support member 74 to linearly move in the up-down directions, protrude from the positions of the filter base member 80 facing the filter support member 74 on both lateral sides of the optical path opening 8002.

In this embodiment, the filter driving mechanism 76 includes the filter motor 84, the arm 8402, the pins 8404, the cam groove 7406, the guide pins 8004, and the guide portions 7402.

The filter cover member 82 is attached to the filter base member 80 to cover the filter support member 74, as shown in FIGS. 29 and 37.

The filter cover member 82 is formed of a synthetic-resin thin plate.

The optical path opening 8202 is formed in the filter cover member 82. Locking holes 8204 locked to the guide pins 8004 are formed on both lateral sides of the optical path opening 8202.

A longitudinal groove 8206 for guaranteeing the swing of the pin 8404 is formed in the filter cover member 82.

The filter cover member 82 is disposed to overlap with the diaphragm cover member 58.

A protruding portion 8210 which protrudes to the diaphragm cover member 58 and receives the ND filter 72 at the retreating position is formed in the filter cover member 82.

As indicated by the hatched part in FIG. 33, the protruding portion 8210 includes an end portion 8202A of the optical path opening 8202 in a direction getting apart from the optical axis L.

The ND filter unit 41 is attached to the diaphragm base member 42 of the diaphragm unit 40 by receiving the protruding portion 8210 in the concave portion 5850, as shown in FIG. 37.

The operation of the light intensity adjusting device 39 including the ND filter unit 41 will be described now.

As shown in FIGS. 35 and 37, the case where the ND filter 72 is located at the retreating position will be first described.

That is, the ND filter 72 is located outside the diaphragm opening 2 as viewed in the direction of the optical axis L.

Here, by controlling the rotation direction and the rotation amount of the diaphragm motor 56 as described above, the diaphragm opening 2 of the diaphragm device 40 is adjusted between the open state and the closed state, and the beam of light narrowed by the diaphragm opening 2 formed by the diaphragm unit 40 reaches the imaging device 18.

As the diaphragm opening 2 of the diaphragm unit 40 decreases in size, the light intensity of the beam of light forming a subject image passing through the diaphragm unit 40 can be reduced. However, when the diaphragm opening 2 becomes too small, the diffraction occurs in the diaphragm opening 2, thereby badly influencing the image quality imaged by the imaging device 18.

Accordingly, the lower limit (minimum diaphragm) in size of the diaphragm opening 2 of the diaphragm unit 40 should be set not to cause the diffraction, and the ND filter 72 is used to further reduce the light intensity.

When the ND filter 72 is used and the arm 8402 swings by a predetermined amount by rotationally driving the filter motor 84 forward by a predetermined amount, the filter support member 74 is made to linearly move by a predetermined amount by the pin 8404 of the arm 8402.

As a result, as shown in FIG. 36, the ND filter 72 is located inside the diaphragm opening 2 as viewed in the direction of the optical axis L. That is, the ND filter 72 is located at the in-use position.

The ND filter 72 is located in the inside in the radial direction of the optical path opening 8202 at the in-use position as viewed in the direction of the optical axis L, and is located at the position overlapping with the thickness range of the filter cover member 82 as viewed in the direction perpendicular to the optical axis L.

By positioning the ND filter 72 at the in-use position, the beam of light narrowed by the diaphragm opening 2 of the diaphragm unit 40 decreases in light intensity while passing through the ND filter 72 and then reaches the imaging device 18. Accordingly, the imaging device 18 can perform an imaging operation without any influence of the diffraction.

By rotationally driving the filter motor 84 backward by a predetermined amount, as shown in FIGS. 35 and 37, the ND filter 72 is returned to the retreating position.

As described above, according to this embodiment, since the protruding portion 8210 of the filter cover member is received in the concave portion 5850 disposed in the diaphragm cover member 58 and the ND filter 72 located at the retreating position is received in the protruding portion 8210, it is possible to reduce the size of the light intensity adjusting device 39 in the direction of the optical axis L. Therefore, it is possible to reduce the size of the lens barrel, thereby reducing the size of the imaging apparatus.

Alternatively, by reducing the size of the light intensity adjusting device 39 in the direction of the optical axis L, it is possible to guarantee the strokes of the movable lenses as described above, thereby improving the optical performance of the lens barrel. Since an inexpensive lens with a relatively small refractive index and a great thickness can be used as the movable lens, it is possible to reduce the cost of the imaging apparatus.

Figure 39:
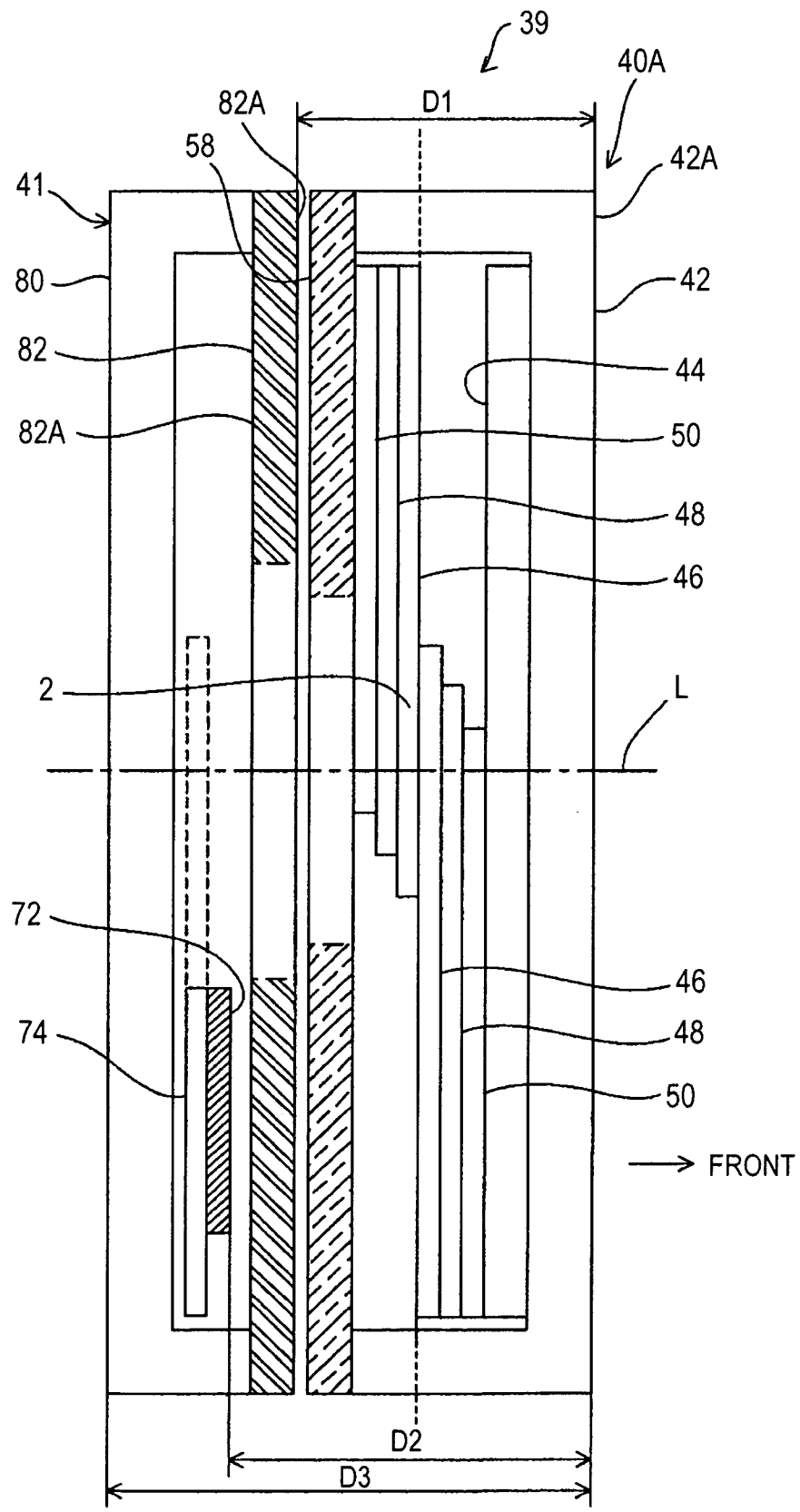
FIG. 39 is a sectional view of a diaphragm unit according to Comparative Example 1.
Figure 40:
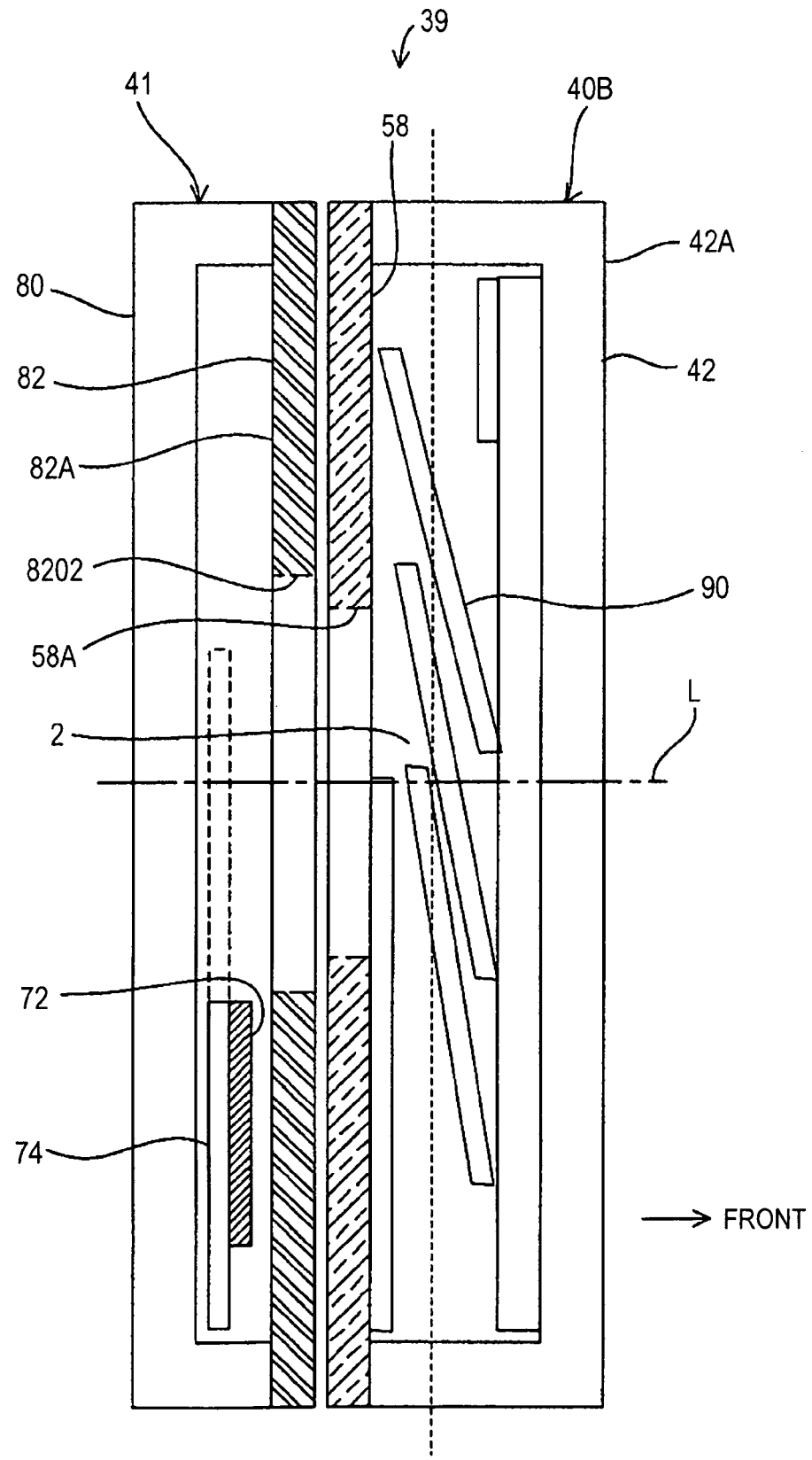
FIG. 40 is a sectional view of a diaphragm unit according to Comparative Example 2.
Figure 41:
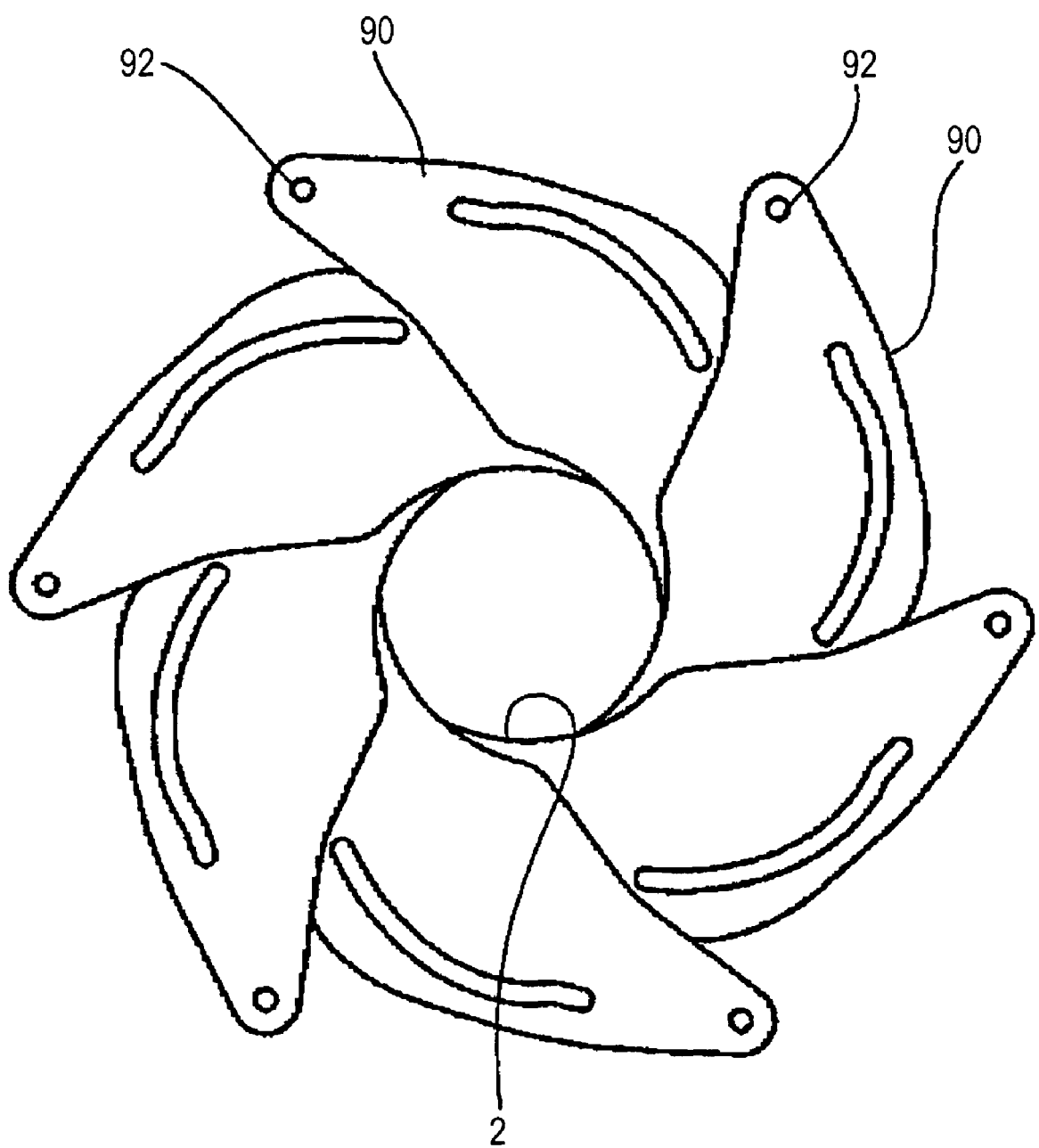
FIG. 41 is a plan view of diaphragm blades according to Comparative Example 2.

The embodiment of the invention will be now compared with comparative examples with reference to FIGS. 39 to 41.

FIG. 39 is a sectional view of a diaphragm unit 40A according to Comparative Example 1.

FIG. 40 is a sectional view of a diaphragm unit 40B according to Comparative Example 2. FIG. 41 is a plan view of diaphragm blades according to Comparative Example 2.

The same elements and members of Comparative Examples 1 and 2 as the embodiment of the invention are referenced and described by the same reference numerals and signs.

Comparative Example 1 relates to a diaphragm unit 40A in which the concave portion 5850 is not formed in the diaphragm cover member 58 and the configurations of the diaphragm blades are the same as the above-mentioned embodiment.

The diaphragm unit 40A is formed in a flat plate shape in which the diaphragm cover member 58 does not include the concave portion 5850.

To correspond to this configuration, the filter cover member 82 of the ND filter unit 41 is formed in a flat plate shape.

In this embodiment, as shown in FIG. 37, a space S is secured between the ND filter 72 and the filter cover member 82 at the retreating position of the ND filter 72. The space S serves to prevent the contact of the ND filter 72 with the filter cover member 82.

On the other hand, in the diaphragm unit 40A, as shown in FIG. 39, a space S is secured between the ND filter 72 and the entire region of the filter cover member 82.

Therefore, in the upper half of FIG. 37 and the upper half of FIG. 39, the distance D1 from the front surface 42A of the diaphragm base member 42 to the front surface 82A of the filter cover member 82 is constant.

However, in this embodiment, the distance D2 from the front surface 42A to the front surface of the ND filter 72 is smaller than that of Comparative example 1 by the depth of the concave portion 5850.

In this embodiment, the distance D3 from the front surface 42A to the rear surface of the filter base member 80 is smaller than that of Comparative Example 1 by the depth of the concave portion 5850.

Therefore, according to this embodiment, it is possible to reduce the size of the light intensity adjusting device 39 in the optical axis direction in comparison with Comparative Example 1.

This embodiment will be compared with Comparative Example 2.

The diaphragm unit 40B according to Comparative Example 2 employs the iris diaphragm shown in FIG. 41.

The iris diaphragm serves to expand or contract the diaphragm opening 2 by allowing the plural diaphragm blades 90 overlapping with each other on the circumference centered on the optical axis to swing around the shaft 92 parallel to the optical axis.

As shown in FIG. 40, the diaphragm unit 40B should guarantee a space for allowing the plural diaphragm blades 92 to swing in the overlapping state along the circumference centered on the optical axis L.

In consideration of this structure, it is not possible to form the concave portion 5850 in the diaphragm cover member 58.

Therefore, in Comparative Example 2, similarly to Comparative Example 1, it is difficult to reduce the size of the light intensity adjusting device 39 in the direction of the optical axis L, compared with this embodiment.

Second Embodiment

A second embodiment of the invention will be described now.

Figure 38:
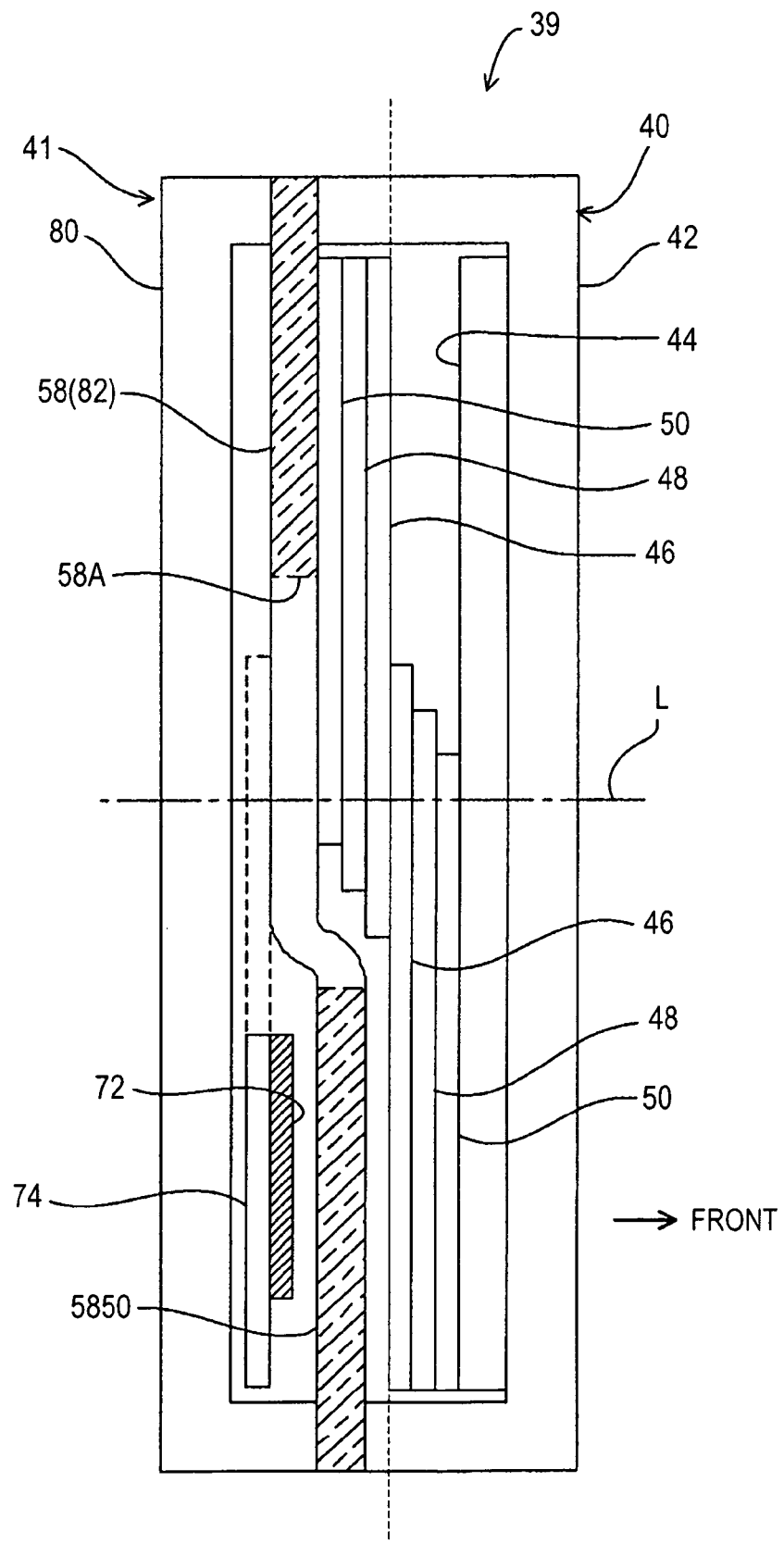
FIG. 38 is a sectional view of a light intensity adjusting device according to a second embodiment of the invention.

FIG. 38 is a sectional view of a light intensity adjusting device 39 according to the second embodiment of the invention.

The second embodiment is different from the first embodiment, in that the filter cover member 82 and the diaphragm cover member 58 are formed of a single member, as shown in FIG. 38.

When it is considered that the filter cover member serves as the diaphragm cover member 58 of the diaphragm unit 40, the concave portion 5850 is formed in the filter cover member 82.

When it is considered that the filter cover member 82 serves as the filter cover member 82 of the ND filter unit 41, the convex portion 8210 is formed in the filter cover member 82.

According to the second embodiment, since the filter cover member 82 and the diaphragm cover member 58 are formed of a single member, it is possible to reduce the size of the light intensity adjusting device 39 in the direction of the optical axis by the thickness of one cover member.

Although it has been described in this embodiment that the diaphragm unit 40 has six diaphragm blades of a pair of straight-moving diaphragm blades 46, a pair of first swing diaphragm blades 48, and a pair of second swing diaphragm blades 50, the diaphragm unit 40 may have a pair of straight-moving diaphragm blades and a pair of swing diaphragm blades. In this case, plural sets of swing diaphragm blades may be provided as the pair of swing diaphragm blades, the number of diaphragm blades may be four or eight or more.

Although it has been described in this embodiment that the imaging apparatus is a video camera, the invention can be widely applied to image apparatuses such as a digital still camera, a camera-mounted mobile phone, and a monitoring camera.

Although it has been described in this embodiment that the diaphragm unit is applied to the imaging apparatus, the invention is not limited to this configuration, but the diaphragm unit according to the embodiment of the invention may be used, for example, as a diaphragm unit of a light source in a projector.

It should be understood by those skilled in the art that various modifications, combinations, sub-combinations and alterations may occur depending on design requirements and other factors insofar as they are within the scope of the appended claims or the equivalents thereof.

What is claimed is:

1. A diaphragm unit comprising:
    a pair of straight-moving diaphragm blades and a pair of swing diaphragm blades overlapping with each other in an optical axis direction of an optical system and forming a diaphragm opening centered on the optical axis by moving in directions in which the diaphragm blades get close to and apart from the optical axis along a plane perpendicular to the optical axis;
    a receiving member receiving the pair of straight-moving diaphragm blades and the pair of swing diaphragm blades; and
    a diaphragm driving mechanism adjusting the size of the diaphragm opening by moving the diaphragm blades,
    wherein the receiving member has a pair of side surfaces facing each other in the optical axis direction,
    wherein one of the pair of straight-moving diaphragm blades and one of the pair of swing diaphragm blades are disposed on one of the pair of side surfaces,
    wherein the other of the pair of straight-moving diaphragm blades and the other of the pair of swing diaphragm blades are disposed on the other of the pair of side surfaces, and
    wherein a concave portion which is concave toward the other of the pair of side surfaces is disposed on one of the pair of side surfaces outside the moving locus of one of the pair of straight-moving diaphragm blades and one of the pair of swing diaphragm blades in a state where a space is secured in the optical axis direction between the other of the pair of straight-moving diaphragm blades and the other of the pair of swing diaphragm blades.

2. The diaphragm unit according to claim 1, wherein the receiving member includes a diaphragm base member and a diaphragm cover member,
    wherein the diaphragm base member is formed of a synthetic resin plate and has a receiving section receiving the pair of straight-moving diaphragm blades and the pair of swing diaphragm blades,
    wherein the diaphragm cover member is formed of a steel plate and is attached to the diaphragm base member to cover the pair of straight-moving diaphragm blades and the pair of swing diaphragm blades received in the receiving section,
    wherein one of the pair of side surfaces is formed of the diaphragm cover member, and
    wherein the other of the pair of side surfaces is formed of the diaphragm base member.

3. A light intensity adjusting device comprising:
    a diaphragm unit adjusting the size of a diaphragm opening centered on an optical axis of an optical system; and
    an ND filter unit reducing the light intensity passing through the diaphragm opening,
    wherein the diaphragm unit includes
    a pair of straight-moving diaphragm blades and a pair of swing diaphragm blades overlapping with each other in the optical axis direction of the optical system and forming the diaphragm opening centered on the optical axis by moving in directions in which the diaphragm blades get close to and apart from the optical axis along a plane perpendicular to the optical axis,
    a diaphragm base member having a receiving section receiving the pair of straight-moving diaphragm blades and the pair of swing diaphragm blades,
    a diaphragm cover member covering the pair of straight-moving diaphragm blades and the pair of swing diaphragm blades received in the receiving section, and
    a diaphragm driving mechanism adjusting the size of the diaphragm opening by moving the diaphragm blades,
    wherein one of the pair of straight-moving diaphragm blades and one of the pair of swing diaphragm blades are disposed close to the diaphragm cover member,
    wherein the other of the pair of straight-moving diaphragm blades and the other of the pair of swing diaphragm blades are disposed close to the diaphragm base member,
    wherein a concave portion which is concave toward the other of the pair of side surfaces is disposed close to the diaphragm base member outside the moving locus of one of the pair of straight-moving diaphragm blades and one of the pair of swing diaphragm blades in a state where a space is secured in the optical axis direction between the other of the pair of straight-moving diaphragm blades and the other of the pair of swing diaphragm blades,
    wherein the ND filter unit includes
    an ND filter moving between an in-use position located inside the diaphragm opening and a retreating position located outside the diaphragm opening as viewed in the optical axis direction, and
    a case receiving the ND filter,
    wherein the case has a side surface overlapping with the diaphragm cover member,
    wherein a convex portion protruding to the side surface of the diaphragm cover member and receiving the ND filter at the retreating position is formed on the side surface, and
    wherein the convex portion is received in the concave portion.

4. A lens barrel comprising a diaphragm unit, wherein the diaphragm unit includes:
    a pair of straight-moving diaphragm blades and a pair of swing diaphragm blades overlapping with each other in an optical axis direction of an optical system and forming a diaphragm opening centered on the optical axis by moving in directions in which the diaphragm blades get close to and apart from the optical axis along a plane perpendicular to the optical axis;
    a receiving member receiving the pair of straight-moving diaphragm blades and the pair of swing diaphragm blades; and
    a diaphragm driving mechanism adjusting the size of the diaphragm opening by moving the diaphragm blades,
    wherein the receiving member has a pair of side surfaces facing each other in the optical axis direction,
    wherein one of the pair of straight-moving diaphragm blades and one of the pair of swing diaphragm blades are disposed on one of the pair of side surfaces, wherein the other of the pair of straight-moving diaphragm blades and the other of the pair of swing diaphragm blades are disposed on the other of the pair of side surfaces, and wherein a concave portion which is concave toward the other of the pair of side surfaces is disposed on one of the pair of side surfaces outside the moving locus of one of the pair of straight-moving diaphragm blades and one of the pair of swing diaphragm blades in a state where a space is secured in the optical axis direction between the other of the pair of straight-moving diaphragm blades and the other of the pair of swing diaphragm blades.

5. A lens barrel comprising a light intensity adjusting device adjusting the light intensity passing through an optical system, wherein the light intensity adjusting device includes:
  a diaphragm unit adjusting the size of a diaphragm opening centered on an optical axis of the optical system; and
  an ND filter unit reducing the light intensity passing through the diaphragm opening,
  wherein the diaphragm unit includes
  a pair of straight-moving diaphragm blades and a pair of swing diaphragm blades overlapping with each other in the optical axis direction of the optical system and forming the diaphragm opening centered on the optical axis by moving in directions in which the diaphragm blades get close to and apart from the optical axis along a plane perpendicular to the optical axis,
  a diaphragm base member having a receiving section receiving the pair of straight-moving diaphragm blades and the pair of swing diaphragm blades,
  a diaphragm cover member covering the pair of straight-moving diaphragm blades and the pair of swing diaphragm blades received in the receiving section, and
  a diaphragm driving mechanism adjusting the size of the diaphragm opening by moving the diaphragm blades,
  wherein one of the pair of straight-moving diaphragm blades and one of the pair of swing diaphragm blades are disposed close to the diaphragm cover member,
  wherein the other of the pair of straight-moving diaphragm blades and the other of the pair of swing diaphragm blades are disposed close to the diaphragm base member,
  wherein a concave portion which is concave toward the other of the pair of side surfaces is disposed close to the diaphragm base member outside the moving locus of one of the pair of straight-moving diaphragm blades and one of the pair of swing diaphragm blades in a state where a space is secured in the optical axis direction between the other of the pair of straight-moving diaphragm blades and the other of the pair of swing diaphragm blades,
  wherein the ND filter unit includes
  an ND filter moving between an in-use position located inside the diaphragm opening and a retreating position located outside the diaphragm opening as viewed in the optical axis direction, and
  a case receiving the ND filter,
  wherein the case has a side surface overlapping with the diaphragm cover member,
  wherein a convex portion protruding to the side surface of the diaphragm cover member and receiving the ND filter at the retreating position is formed on the side surface, and
  wherein the convex portion is received in the concave portion.

6. The lens barrel according to claim 5, wherein the ND filter unit includes:
  a filter support member to which the ND filter is attached;
  a filter base member supporting the filter support member to be movable in directions getting close to and apart from the optical axis along the plane perpendicular to the optical axis;
  a filter cover member attached to the filter base member to cover the filter support member attached to the filter base member; and
  a filter driving mechanism moving the filter support member so that the ND filter is located at the in-use position or at the retreating position,
  wherein the case includes the filter base member and the filter cover member,
  wherein the filter base member is located at a position apart from the diaphragm cover member in the optical axis direction,
  wherein the filter cover member is disposed to overlap with the diaphragm cover member, and
  wherein the convex portion is formed in the filter cover member.

7. The lens barrel according to claim 6, wherein the filter cover member and the diaphragm cover member are formed of a single member.

8. The lens barrel according to claim 6, wherein the filter cover member has an opening with an outline larger than the ND filter at a position including the optical axis,
  wherein the convex portion includes an end of the opening in the direction apart from the optical axis direction, and
  wherein the ND filter at the in-use position is located in the inside in the radial direction of the opening as viewed in the optical axis direction and at a position overlapping with the thickness range of the filter cover member as viewed in the direction perpendicular to the optical axis.

9. The lens barrel according to claim 8, wherein an optical path forming cutout is formed in the filter support member,
  wherein the ND filter is attached to the filter support member in an overlapping manner to cover the cutout, and
  wherein the ND filter is located closer to the side surface of the filter cover member than the filter support member in the optical axis direction.

10. An imaging apparatus comprising a lens barrel mounted with a diaphragm unit, wherein the diaphragm unit includes:
  a pair of straight-moving diaphragm blades and a pair of swing diaphragm blades overlapping with each other in an optical axis direction of an optical system and forming a diaphragm opening centered on the optical axis by moving in directions in which the diaphragm blades get close to and apart from the optical axis along a plane perpendicular to the optical axis;
  a receiving member receiving the pair of straight-moving diaphragm blades and the pair of swing diaphragm blades; and
  a diaphragm driving mechanism adjusting the size of the diaphragm opening by moving the diaphragm blades,
  wherein the receiving member has a pair of side surfaces facing each other in the optical axis direction,
  wherein one of the pair of straight-moving diaphragm blades and one of the pair of swing diaphragm blades are disposed on one of the pair of side surfaces,
  wherein the other of the pair of straight-moving diaphragm blades and the other of the pair of swing diaphragm blades are disposed on the other of the pair of side surfaces, and
  wherein a concave portion which is concave toward the other of the pair of side surfaces is disposed on one of the pair of side surfaces outside the moving locus of one of the pair of straight-moving diaphragm blades and one of the pair of swing diaphragm blades in a state where a space is secured in the optical axis direction between the other of the pair of straight-moving diaphragm blades and the other of the pair of swing diaphragm blades.

11. An imaging apparatus comprising a lens barrel mounted with a light intensity adjusting device, wherein the light intensity adjusting device includes:

a diaphragm unit adjusting the size of a diaphragm opening centered on an optical axis of the optical system; and an ND filter unit reducing the light intensity passing through the diaphragm opening, wherein the diaphragm unit includes a pair of straight-moving diaphragm blades and a pair of swing diaphragm blades overlapping with each other in the optical axis direction of the optical system and forming the diaphragm opening centered on the optical axis by moving in directions in which the diaphragm blades get close to and apart from the optical axis along a plane perpendicular to the optical axis, a diaphragm base member having a receiving section receiving the pair of straight-moving diaphragm blades and the pair of swing diaphragm blades, a diaphragm cover member covering the pair of straight-moving diaphragm blades and the pair of swing diaphragm blades received in the receiving section, and a diaphragm driving mechanism adjusting the size of the diaphragm opening by moving the diaphragm blades, wherein one of the pair of straight-moving diaphragm blades and one of the pair of swing diaphragm blades are disposed close to the diaphragm cover member, wherein the other of the pair of straight-moving diaphragm blades and the other of the pair of swing diaphragm blades are disposed close to the diaphragm base member, wherein a concave portion which is concave toward the other of the pair of side surfaces is disposed close to the diaphragm base member outside the moving locus of one of the pair of straight-moving diaphragm blades and one of the pair of swing diaphragm blades in a state where a space is secured in the optical axis direction between the other of the pair of straight-moving diaphragm blades and the other of the pair of swing diaphragm blades, wherein the ND filter unit includes an ND filter moving between an in-use position located inside the diaphragm opening and a retreating position located outside the diaphragm opening as viewed in the optical axis direction, and a case receiving the ND filter, wherein the case has a side surface overlapping with the diaphragm cover member, wherein a convex portion protruding to the side surface of the diaphragm cover member and receiving the ND filter at the retreating position is formed on the side surface, and wherein the convex portion is received in the concave portion.

* * * * *